US005628004A

United States Patent [19]
Gormley et al.

[11] Patent Number: 5,628,004
[45] Date of Patent: May 6, 1997

[54] SYSTEM FOR MANAGING DATABASE OF COMMUNICATION OF RECIPIENTS

[75] Inventors: Michael Gormley, Washington, D.C.; Kevin Potter, Vienna, Va.; Jennifer Kelly, Washington, D.C.

[73] Assignee: Optima Direct, Inc., Vienna, Va.

[21] Appl. No.: 343,976

[22] Filed: Nov. 18, 1994

Related U.S. Application Data

[63] Continuation-in-part of Ser. No. 334,127, Nov. 4, 1994, abandoned.

[51] Int. Cl.$^6$ .............................. G06F 7/20; G06F 17/30
[52] U.S. Cl. .................... 395/615; 395/800; 395/650; 395/575; 364/DIG. 1; 364/DIG. 2
[58] Field of Search ................................ 395/600, 575, 395/200, 275, 700; 364/DIG. 1

[56] References Cited

U.S. PATENT DOCUMENTS

| | | | |
|---|---|---|---|
| 4,209,845 | 6/1980 | Berger et al. | 364/900 |
| 4,649,513 | 3/1987 | Martin et al. | 364/900 |
| 4,800,505 | 1/1989 | Axelrod et al. | 364/478 |
| 4,881,261 | 11/1989 | Oliphant et al. | 379/215 |
| 4,908,761 | 3/1990 | Tai | 364/401 |
| 4,970,681 | 11/1990 | Bennett | 364/900 |
| 5,089,956 | 2/1992 | MacPhail | 395/600 |
| 5,099,422 | 3/1992 | Foresman et al. | 364/401 |
| 5,222,125 | 6/1993 | Creswell et al. | 379/67 |
| 5,247,661 | 9/1993 | Hager et al. | 395/600 |
| 5,261,091 | 11/1993 | Yuyama | 395/600 |
| 5,267,047 | 11/1993 | Argenta et al. | 358/400 |
| 5,276,869 | 1/1994 | Forrest et al. | 395/600 |
| 5,295,261 | 3/1994 | Simonetti | 395/600 |
| 5,297,245 | 3/1994 | Kitamura et al. | 395/149 |
| 5,303,149 | 4/1994 | Janigian | 364/408 |
| 5,317,733 | 5/1994 | Murdock | 395/600 |
| 5,327,508 | 7/1994 | Deaton et al. | 382/7 |
| 5,329,581 | 7/1994 | Friedes et al. | 379/92 |
| 5,369,508 | 11/1994 | Lech et al. | 358/442 |

FOREIGN PATENT DOCUMENTS

| | | |
|---|---|---|
| 58-151636 | 9/1983 | Japan. |
| 60-173665 | 9/1985 | Japan. |

OTHER PUBLICATIONS

Capital Advantage Product Catalog, pp. 8, 10 and 11, No date.

*Primary Examiner*—Thomas G. Black
*Assistant Examiner*—C. Pham
*Attorney, Agent, or Firm*—Roylance, Abrams, Berdo & Goodman, L.L.P.

[57] ABSTRACT

A computer system for creating and managing a database of communication recipients which processes queries and otherwise operates in accordance with user commands to perform telemarketing, mass mailing, direct mailing and other communication functions. The computer is programmed to create automatic salutations, to automatically generate lists of carbon copy recipients, and to export data from the database to word processing systems for merging with text. In addition, the computer is programmed to analyze new records to ensure they are not duplicates of existing records. A user is provided with options to keep one or both records, or to combine both records into a new record. The computer is programmed to retrieve records on the basis of queries using one or more defined codes which can be ANDed and ORed together in accordance with Boolean logic, among other functions.

16 Claims, 38 Drawing Sheets

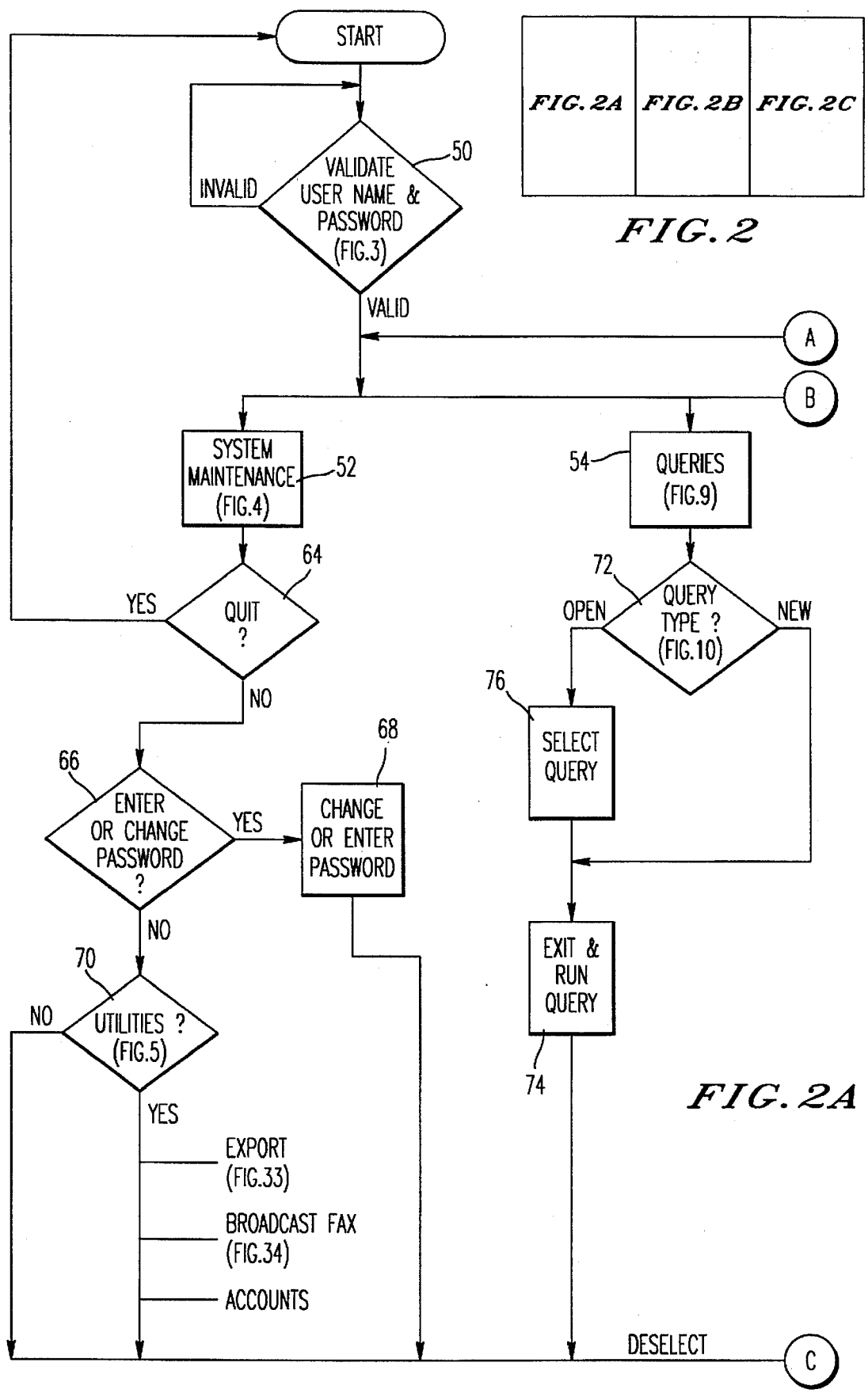

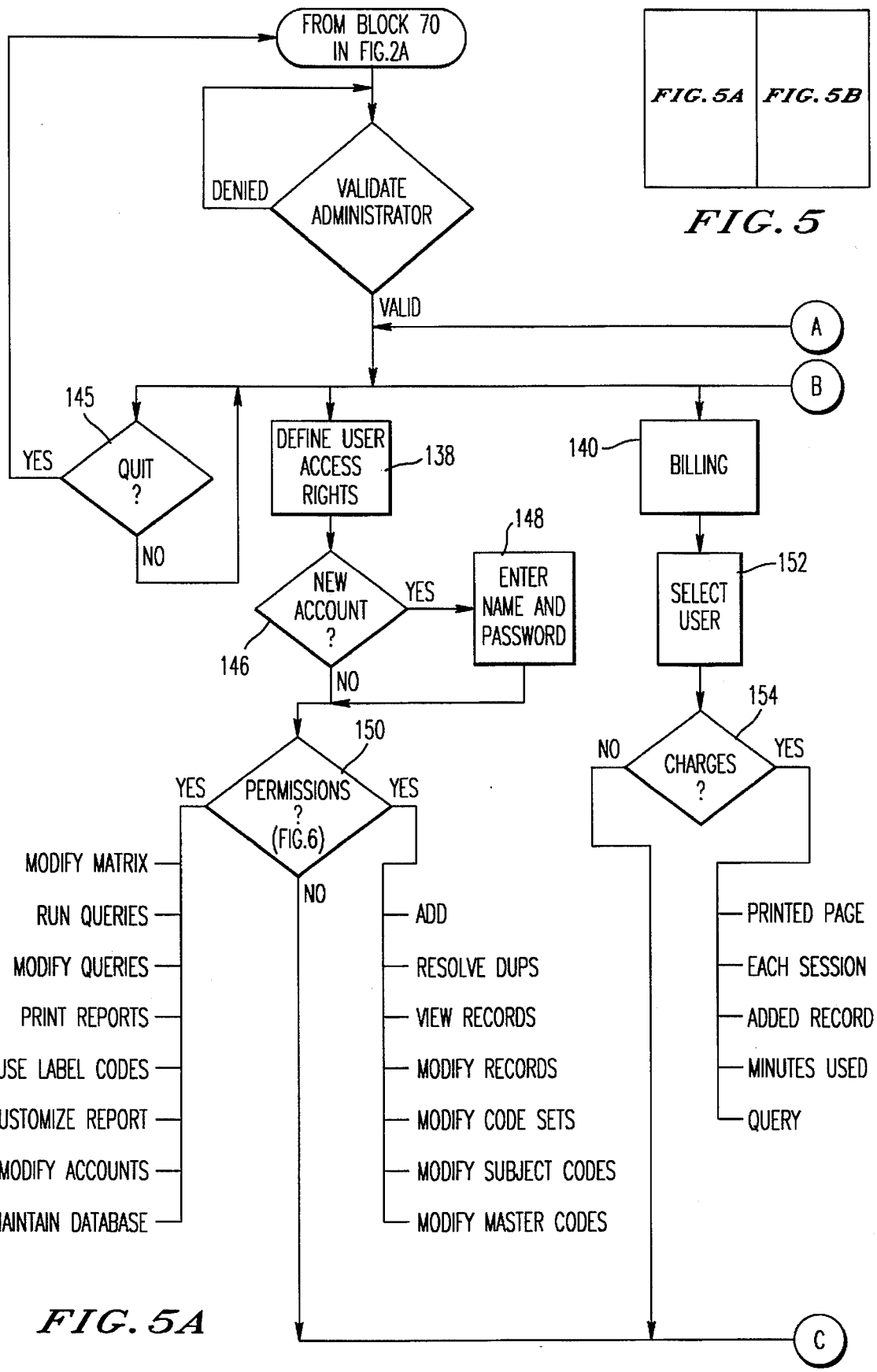
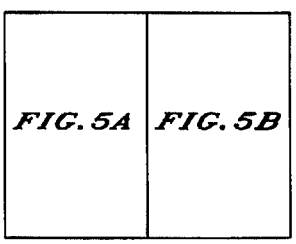
FIG. 5
FIG. 5A

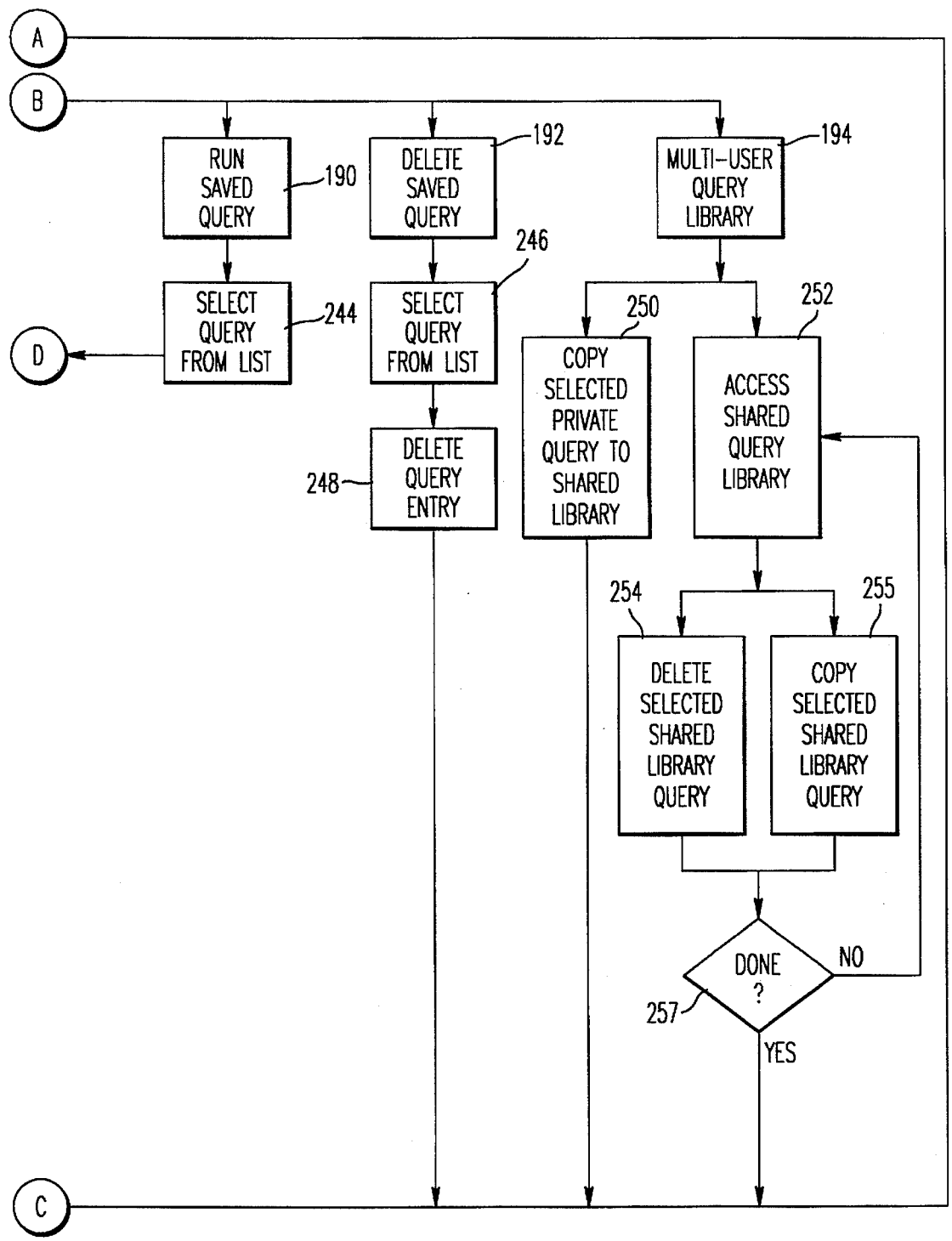

Query Edit Screen
— Complex Code Query —

| GROUP 1 | OR | GROUP 2 | OR | GROUP 3 | OR | GROUP 4 | OR |
| Active | | Inactive | | Inactive | | Inactive | |
| GROUP 5 | OR | GROUP 6 | OR | GROUP 7 | OR | GROUP 8 | OR |
| Inactive | | Inactive | | Inactive | | Inactive | |
| GROUP 9 | OR | GROUP 10 | OR | GROUP 11 | OR | GROUP 12 | |
| Inactive | | Inactive | | Inactive | | Inactive | |

OK

Complex Code Query Equations Can Be Defined Here

FIG. 14

System   Edit   Query

— Query Edit Screen —

Query Name: Query 11/10/94 14:47:19
    Order by: Name

Title: [    ]   ID: [  ]   [ORDER] [QUERY] [OK] [CANCEL]
[ ] First Na: [    ] M: [ ]   L: [    ]        Date — Query Results —

Query Name: Query 11/10/94 14:47:19
Number of Records Found:      148
    Seconds Elapsed:           12         [CANCEL]

(X = Nonexact) [ ] Only include records with FAX numbers

Districts
ADVANCED  Source  Issue  Activity  Response Cong. House Senate
EQUATION  6000           2000_
Inactive  130

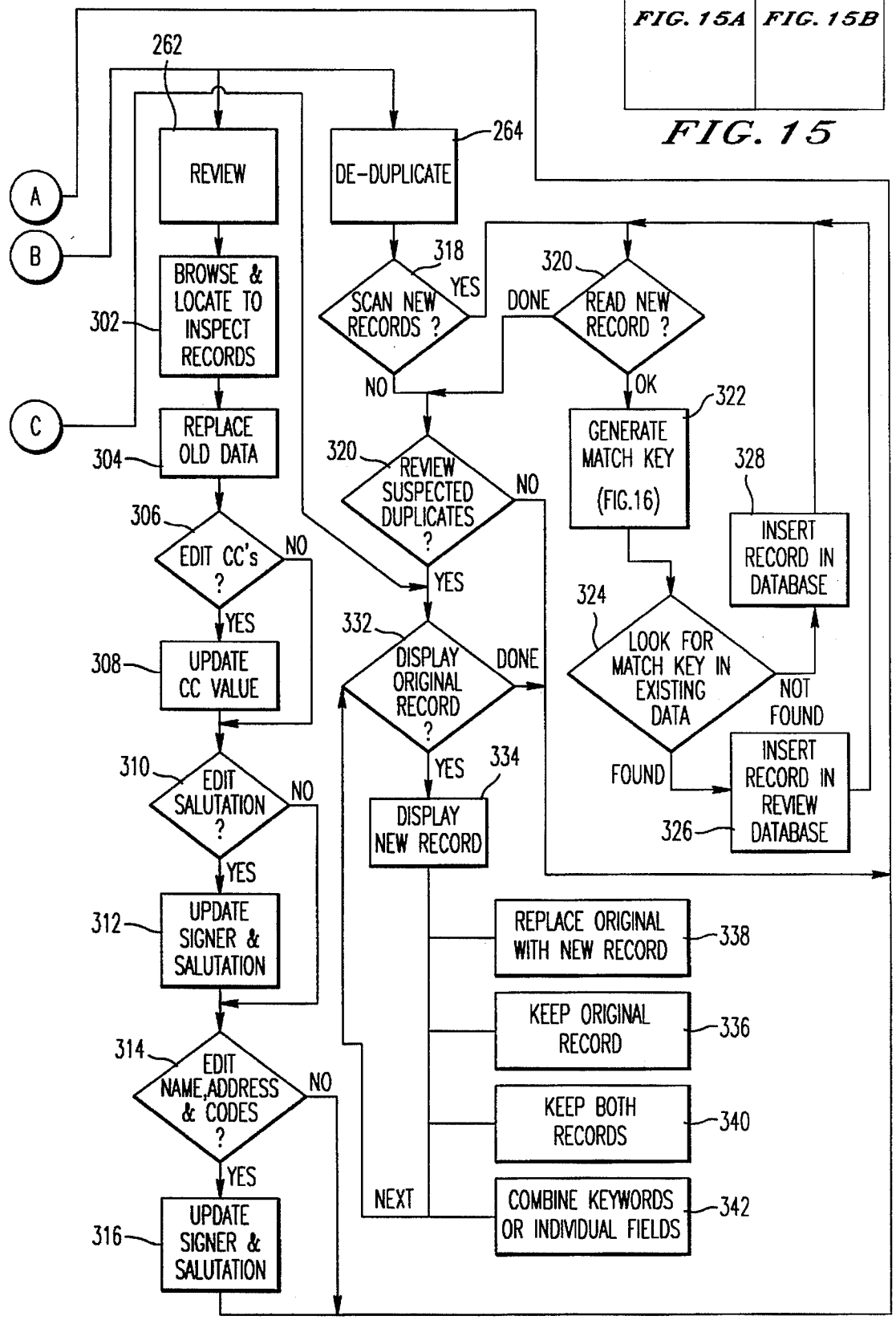

```
System   Edit   Dedupe
```
─────── Duplicate Review Screen ───────

Title: Mr.                         On-Line DeDupe
   First Name: Glenn                    Phone: (202)-8422400
  Middle Name:                            Fax: (202)-8420992
    Last Name: Lebowitz
     Subtitle:
     Position:
 Organization: Optima Direct Inc.

Address: 1000 Vermont Avenue, N.W.
               Suite 700
         City: Washington        State: DC   Zip: 20005
 Address Type:                        Liaison: Kevin Potter
    Ethnicity:               Elected Official: N
                                     Deceased: N    Cong. Dist:  01
                             Special Handling: N    House Dist: 007
 Last Contact:   /   /               Gender: M      Senate Dist: 002

Source ▷2000      Issue ▷         Activity ▷003      Response ▷30010
   Add:     801      Add:            Add:      2000     Add:

*FIG. 21*

```
System   Edit   Dedupe
```

Title: Mr.                         On-Line DeDupe
   First Name: Glenn
  Middle Name:                            Phone: (202)-8422400
    Last Name: Le┌──── Duplicate Choice Screen ────┐ 8420992
     Subtitle:   │ Save...                         │
     Position:   │                                 │
 Organization: Op│    (*) New                      │
      Address: 10│    ( ) Original                 │────341
               Su│    ( ) Both                     │
         City: Wa│                                 │
 Address Type:   │ [X] Combine Keywords            │
    Ethnicity:   │   < OK >         < CANCEL >     │ Dist:
                 └─────────────────────────────────┘
                             Special Handling: N   House Dist:
 Contact Date:   /   /               Gender:       Senate Dist:

Source ▷2000      Issue ▷         Activity ▷003      Response ▷30010
   Add:     801      Add:            Add:      2000     Add:

*FIG. 22*

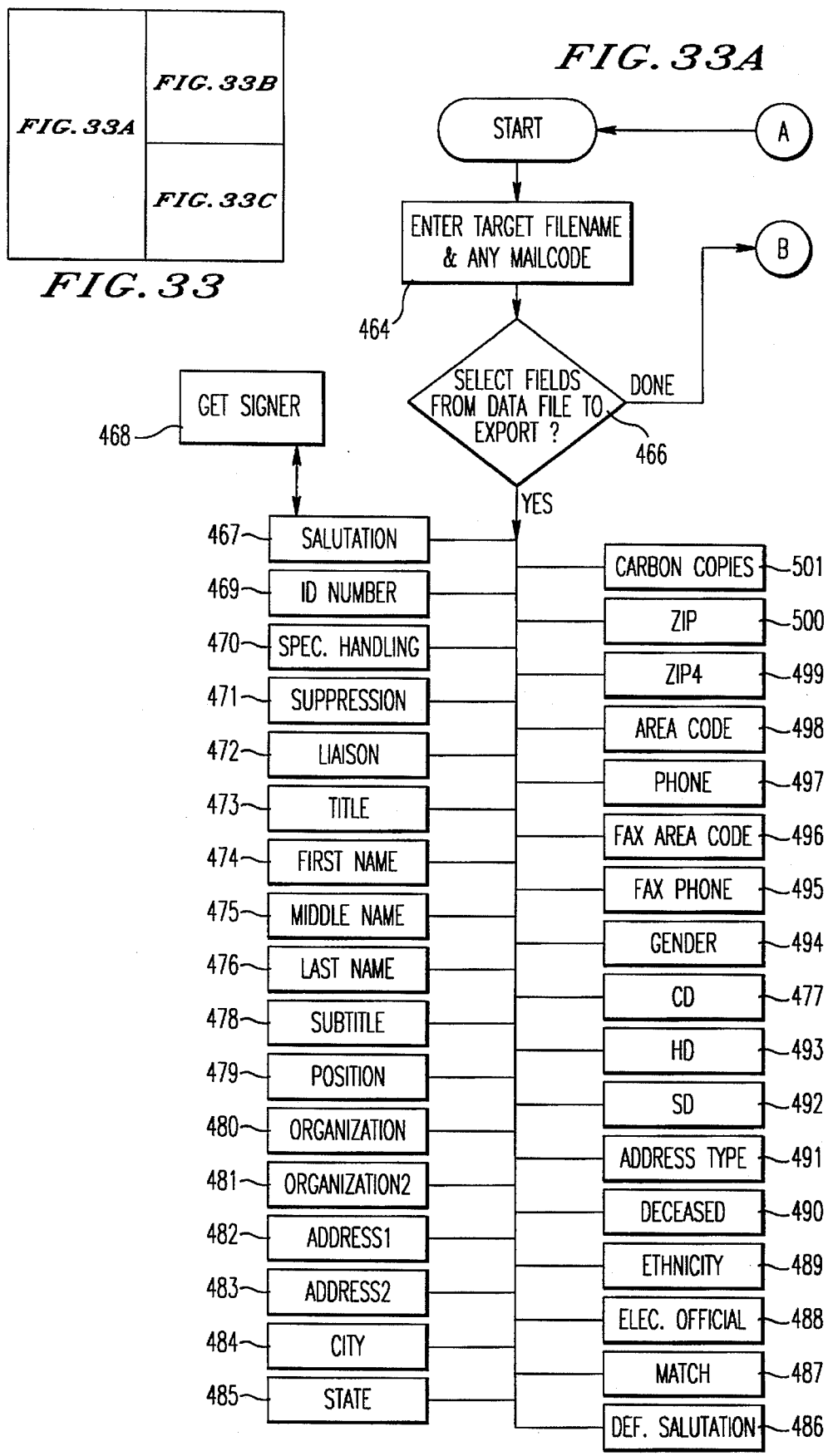

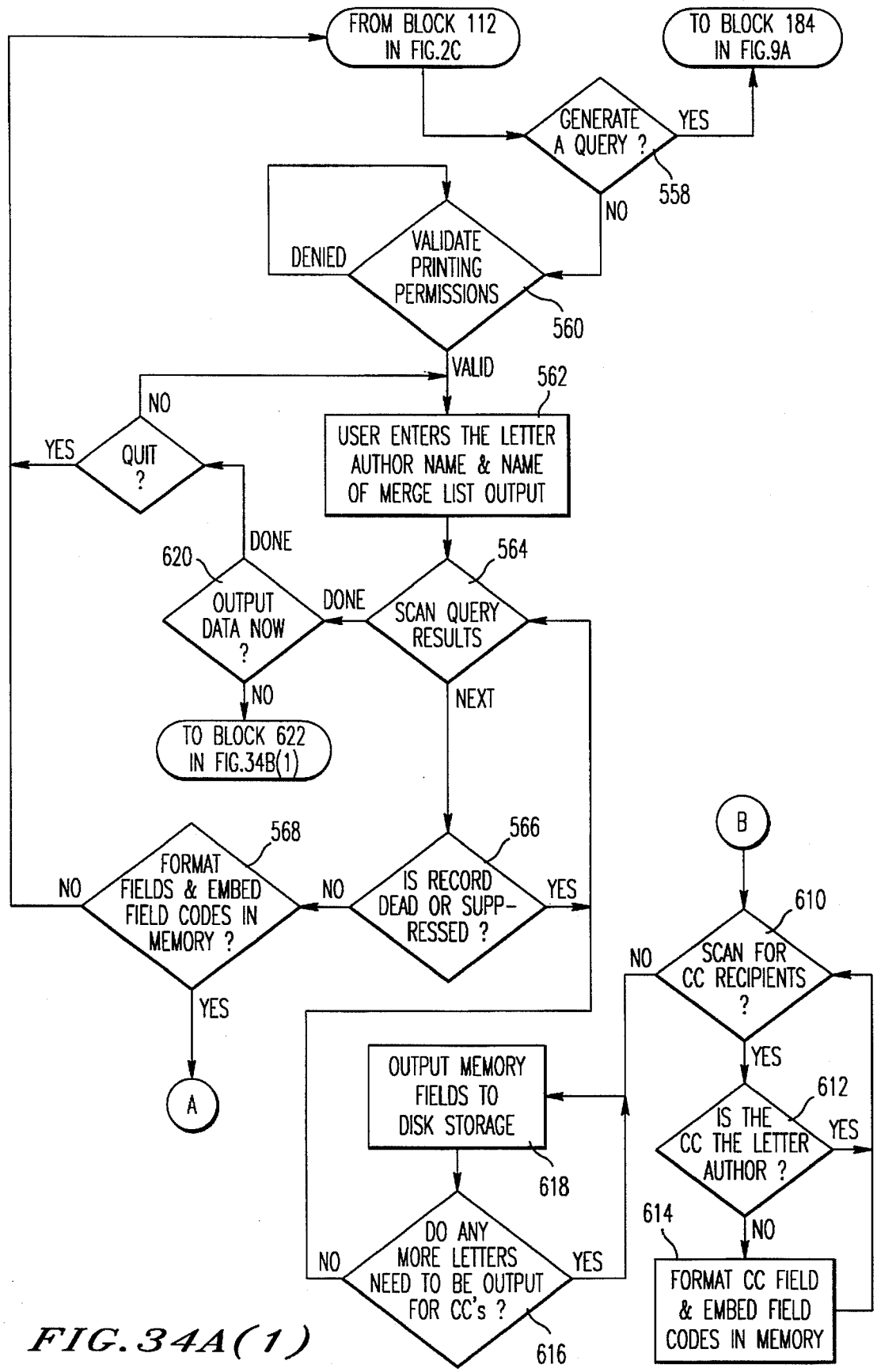
FIG.34A(1)

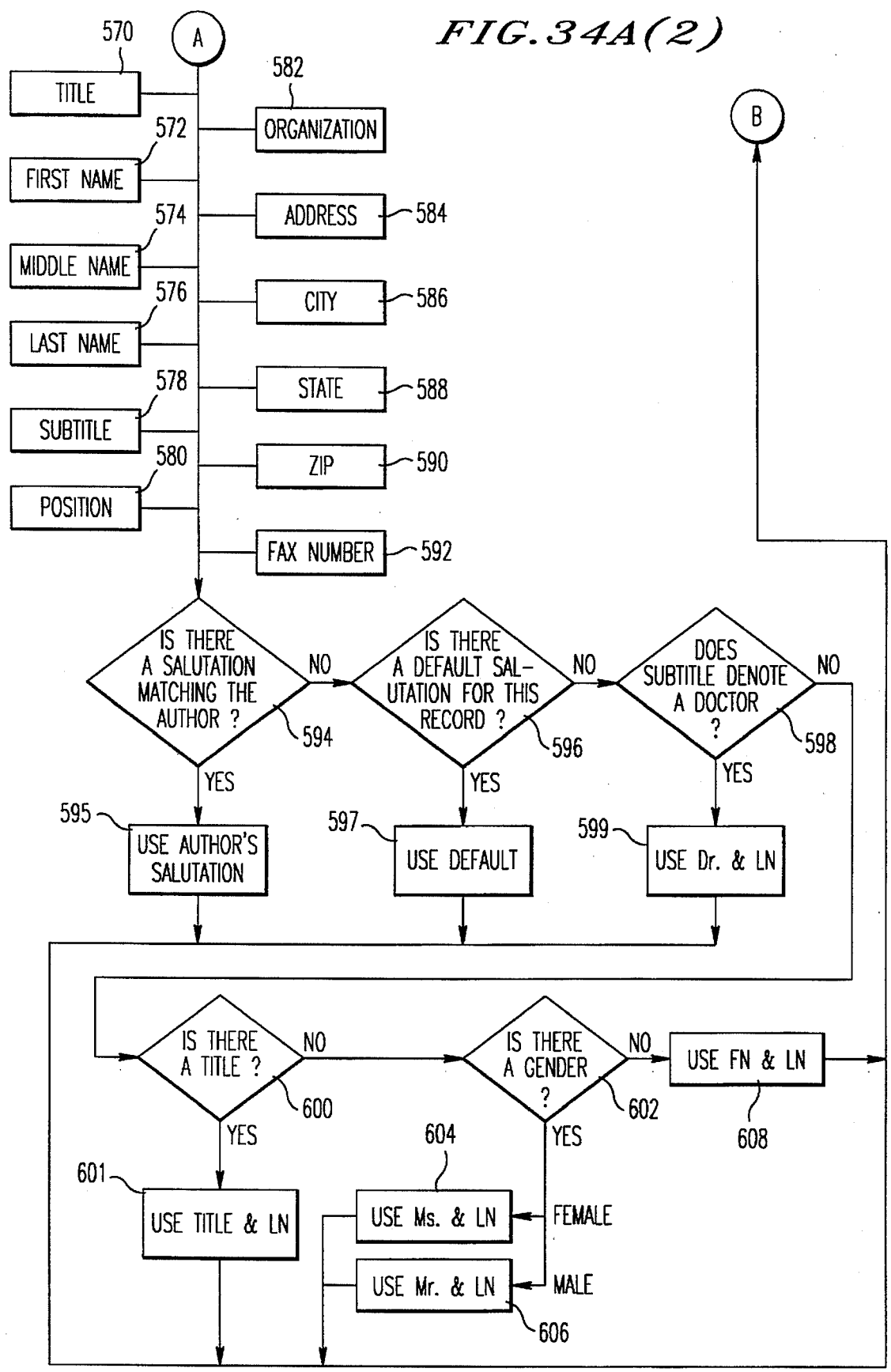
FIG. 34A(2)

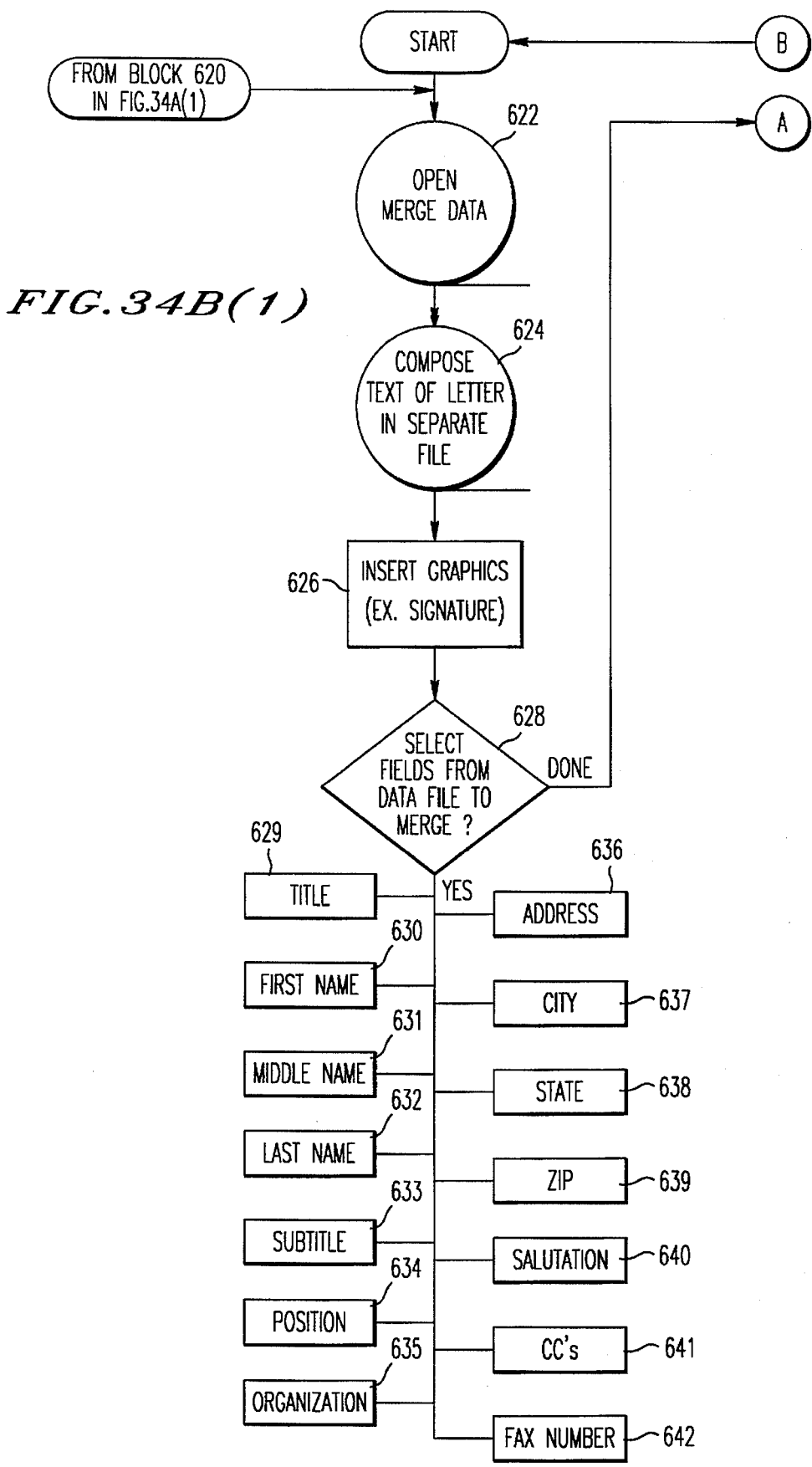
FIG.34B(1)

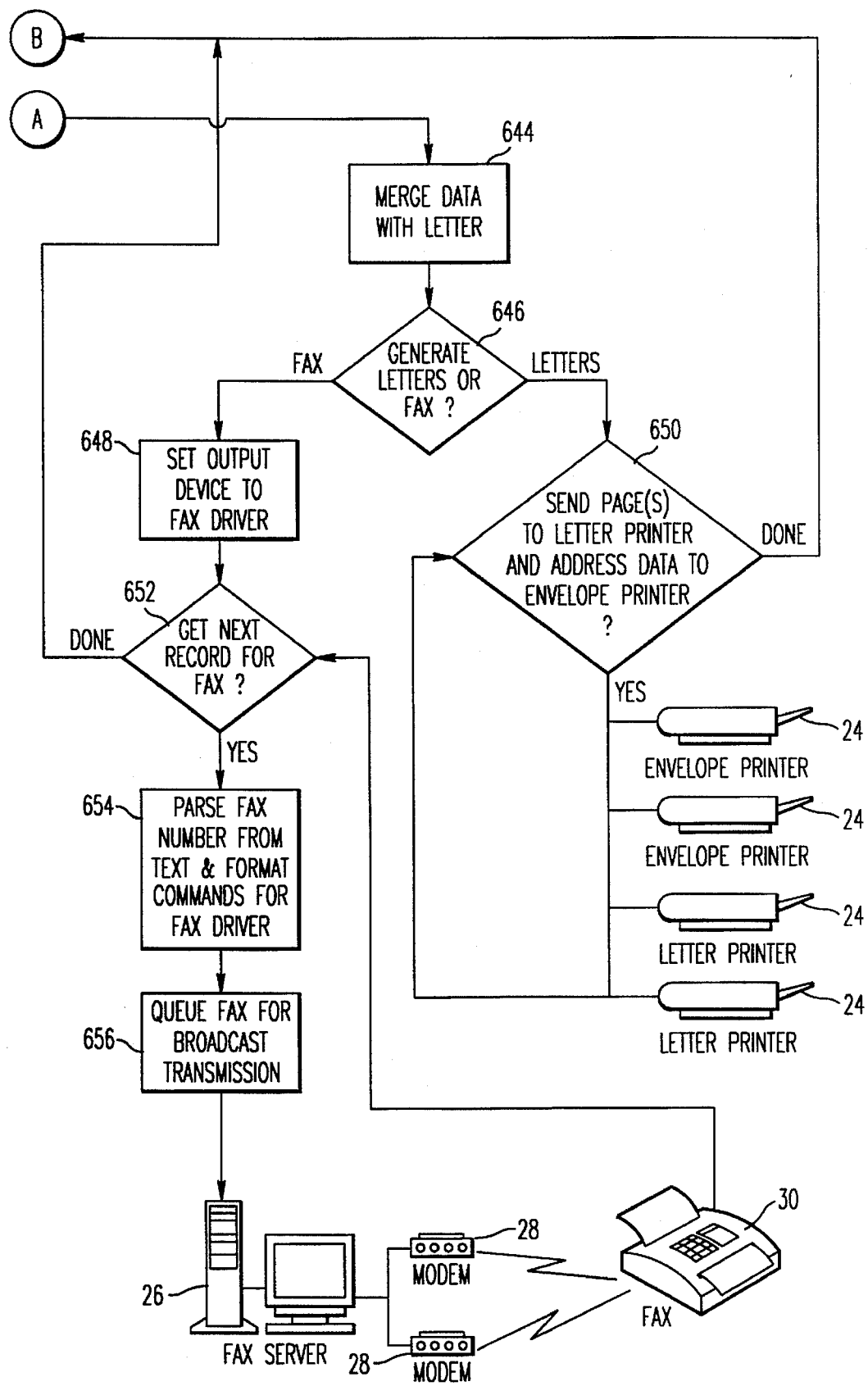
FIG.34B(2)

SYSTEM FOR MANAGING DATABASE OF COMMUNICATION OF RECIPIENTS

CROSS-REFERENCE TO RELATED APPLICATION

This application is a continuation-in-part of U.S. patent application Ser. No. 08/334,127 of Gormley et al., filed Nov. 4, 1994 and now abandoned, the entire subject matter of which is hereby incorporated herein by reference for all purposes.

FIELD OF THE INVENTION

The invention relates to a computer system for creating and managing a database of records relating to communication recipients. The invention also relates to a computerized system and database which processes queries and otherwise operates in accordance with user commands to perform telemarketing, mass mailing, direct mailing and other communication functions.

BACKGROUND OF THE INVENTION

Businesses and organizations are becoming increasingly reliant on computers to facilitate lobbying, membership roster building, telemarketing, and other processes which require accumulation of data regarding large numbers of people, as well as communication with them. Databases have been created to store, for example, information on particular consumers' habits and personal tastes when purchasing services and goods. The information is subsequently used by retailers and marketing businesses to identify consumers who may be interested in receiving advertisements on a particular product or service, or may welcome a telephone call from a salesperson for that item. Membership drives and lobbying also require accumulation of data on various persons in order to selectively contact certain people by telephone or mail to join a particular organization or to support a particular political cause or candidate.

Computers such as mainframe computers and personal computers and software programs are presently being used to create databases for storing the information described above and to manipulate it for various purposes. For example, U.S. Pat. No. 4,209,845 to Berger et al. discloses a file qualifying and sorting system which can be used to retrieve names, addresses and variable text from a memory device. The retrieved information is then automatically merged with form letter text. U.S. Pat. No. 5,297,245 to Kitamura et al. discloses an address data management system for reducing key operation and the likelihood of erroneously imputing data into a database. If a record to be entered into the database is suspected of being similar to an entered record immediately preceding it, the operator can press a button to recall the preceding record to a display screen. The operator then need only enter the information that differs between the two records. Also, records from the database can be searched and retrieved from the database if they satisfy one or more selected conditions.

SUMMARY OF THE INVENTION

In accordance with the present invention, a database is created which comprises individual records containing names, addresses and other information relating to prospective communication recipients. A computer operating in accordance with program code processes these records to create calling lists, as well as other types of lists and reports, and completed mailings (i.e., letters with addressed envelopes) in response to a user's input queries, which define desired characteristics of list entries or letter recipients.

In accordance with one aspect of the present invention, the computer is programmed to perform an automatic salutation function wherein the proper title for a letter recipient is selected based on information in the record and printed in the appropriate places in a letter and on an envelope. The salutations can vary depending on the title of the recipient, the desired formality of the greeting, and the identity of the signor, among other factors.

In accordance with another aspect of the invention, the computer is programmed to perform a carbon copy function, that is, to automatically prepare copies of letters for delivery to designated contacts of the recipient.

In accordance with another aspect of the invention, export functions are provided to export various data from records to another location via modem, or to send mail mergeable data (e.g., a list of names and addresses) into a word processing software program.

In accordance with yet another aspect of the invention, the computer is programmed to perform a "deduplication" function to prevent duplicate records, erroneous records (e.g., misspelled name or incorrect address), and records for deceased persons from being used for communication purposes. The deduplication process allows a user's intervention via a batch or on-line process to decide which record to maintain as an active record. The system of the present invention maintains the erroneous records, the duplicate records and the records of the deceased as inactive or suppressed records from which to make future deduplication comparisons. A user can create an active record from the correct portions of one or more inaccurate records. A record matching algorithm uses consonants and then, if necessary, vowels throughout the entire name field and zip codes to locate records duplicated due to a misspelling.

In accordance with still another aspect of the invention, the computer is programmable to search and retrieve records on the basis of queries containing one or more codes (e.g., source, issue, activity and response codes). Master codes can be created which combine several different codes to set up a hierarchy of codes. Codes can also be combined with AND and OR Boolean logic functions.

In accordance with another aspect of the invention, a field for entering a matrix heading is generated whenever a code is assigned to a record. The matrix heading identifies a collection of codes and is therefore useful for generating matrix reports.

In accordance with still another aspect of the invention, the computer is programmed to generate different kinds of flags which connote gender, deceased, enemy, bad address, among other categories. When records in the database are reviewed, flags are used to suppress, but not to delete, records, thereby leaving the suppressed records in the database for deduplication purposes.

In accordance with another aspect of the invention, records retrieved from the database can be exported, at least in part, to another data processing system or transmitted by broadcast facsimile machine.

In accordance with yet another aspect of the invention, mail mergeable data (i.e., data formatted for word processing systems such as WordPerfect) in records retrieved from the database can, at least in part, be provided to a word processing system.

In accordance with another aspect of the invention, each record comprises a liaison field, in which a person's name can be optionally entered. This person is a representative person within an organization to whom communication should be directed, if different from the addressee.

BRIEF DESCRIPTION OF THE DRAWINGS

These and other features and advantages of the present invention will be more readily apprehended from the following detailed description when read in connection with the appended drawings, which form a part of this application, and wherein:

FIGS. 2A, 2B and 2C are a flow chart depicting the overall sequence of operations for maintaining, querying, adding, reviewing and reporting from the database, among other processes, in accordance with a preferred embodiment of the present invention;

FIGS. 5A and 5B are a flow chart depicting the sequence of operations for performing system functions such as setting up accounts, billing database users, updating legislator 10 data and exporting data, in accordance with a preferred embodiment of the present invention;

FIGS. 9A and 9B are a flow chart depicting the sequence of operations for performing queries on the database, in accordance with a preferred embodiment of the present invention;

FIG. 11 depicts a query edit screen in which search criteria are provided by a user, in accordance with a preferred embodiment of the present invention;

FIGS. 12 and 13 depict complex code query screens for ANDing and ORing various codes, respectively, in accordance with a preferred embodiment of the present invention;

FIG. 14 depicts a query results screen overlaid on a query edit screen, in accordance with a preferred embodiment of the present invention;

FIGS. 15A and 15B are a flow chart depicting the sequence of events for adding new records to the database and performing a deduplication process on them, in accordance with a preferred embodiment of the present invention;

FIG. 21 depicts a duplicate record review screen, in accordance with a preferred embodiment of the present invention;

FIG. 22 depicts a duplicate record choice screen, in accordance with a preferred embodiment of the present invention;

FIGS. 33A, 33B and 33C are a flow chart depicting the sequence of operations for exporting data from the database, in accordance with a preferred embodiment of the present invention;

FIGS. 34A(1), 34A(2), 34B(1) and 34B(2) are a flow chart depicting the sequence of operations for merging data from the database with optional text using a word processing system, in accordance with a preferred embodiment of the present invention;

DETAILED DESCRIPTION OF THE PREFERRED EMBODIMENT

Figure 1:
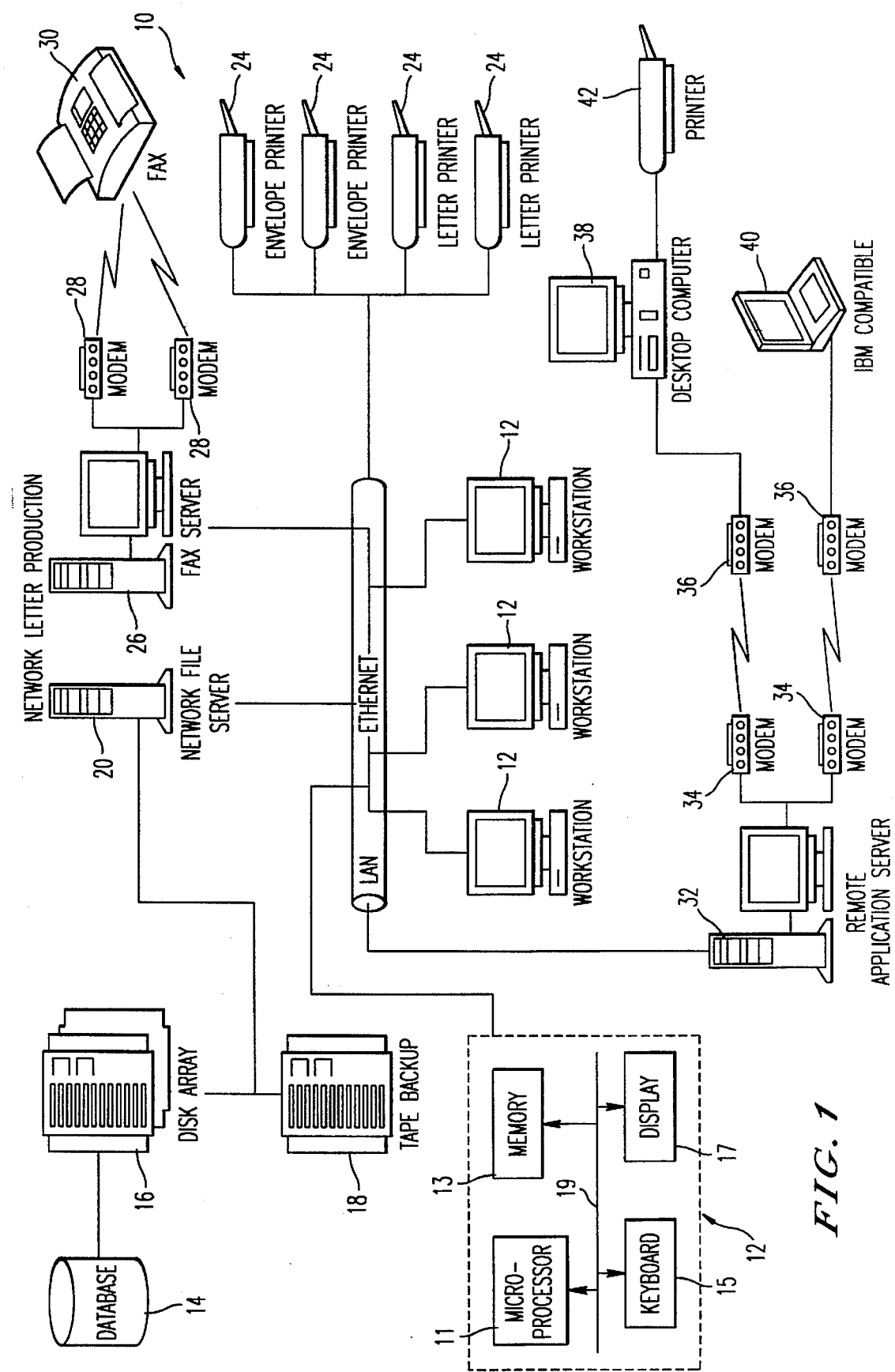
FIG. 1 is a schematic diagram of a database management system in accordance with a preferred embodiment of the present invention.

With reference to FIG. 1, a database management system 10 in accordance with a preferred embodiment of the present invention comprises one or more work stations or personal computers 12 which are connected to a conventional local area network (LAN) 22 using, for example, the EtherNet hardware standard of Xerox or Novell. Computer hardware comprises a microprocessor 11, a memory device 13 (e.g., a random access memory (RAM) and a read-only memory (ROM)), a keyboard or other input device 15, and a display 17, all of which are interconnected by a bus system 19. Computer software comprises a conventional operating system (e.g., MS-DOS developed by Microsoft Corporation, Redland, Wash.) and a database management system. The database management system is preferably FoxPro, a relational database management system developed by Microsoft for use with an IBM or IBM-compatible personal computer with an MS-DOS operating system. As will be described in further detail below, the computers 12 operate in accordance with application programs created using FoxPro software, which are interpreted into machine language, to perform various functions.

With continued reference to FIG. 1, the database management system 10 further comprises data storage devices such as a magnetic disk drive 14 and a disk array 16 with a tape back-up device 18 for storing records. Records input at the work stations are transmitted to and from the data storage devices via a network file server 20.

As shown in FIG. 1, a number of printers 24 are connected to the LAN 22 for printing documents such as reports, letters and envelopes. A fax server 26 connects the LAN 22 to modems 28 for transmitting letters to a remote facsimile machine 30. Another server 32 is provided to connect the LAN via modems 34 to remote computers 38 and 40 via their corresponding modems 36. A printer 42 is connected to a remote computer 38 to generate reports comprising data retrieved from the database 14.

The invention is not limited to the hardware configuration described in connection with FIG. 1. Other types of computers such as a mainframe computer with mainframe terminals, a minicomputer, or an Apple or Macintosh personal computer can be employed. Other operating systems such as the operating system developed by Apple Computer, Cupertino, Calif. for use with Apple or Mackintosh computers can be employed. Further, other types of local area networks can be employed besides an EtherNet.

A number of application programs control the computers 12 to generate screens and menus which guide a user when entering database records, reviewing and editing records, retrieving selected records and generating different types of reports containing retrieved records. These application programs, in general, are created using a number of power tools available in the FoxPro software program. Power tools allow a programmer to design screens, menus, queries, reports and labels without performing actual line programming. These power tools comprise the Project Manager, the Screen Builder and the Menu Builder.

A programmer uses the Screen Builder and the Menu Builder to create screens and menus that are to be presented to the user of an application program. The screens and menus are designed in a WINDOWS-type environment and then compiled into the appropriate code for regenerating them. The programmer therefore need not encode the location and content of each field or heading on a screen or menu. A project comprises the location in memory of all programs, screens, menus and reports of an application. Any files in a project which can be executed (e.g., programs, screens, and menus) are combined as part of the application code. Other types of files are included as part of the application program in read-only form unless specifically excluded by the application programmer.

The programmer writes application program code which calls various files and manipulates the responses to the screens and menus generated thereby to achieve the objectives of the application. When screens are designed with power tools, the screens operate as shells for the programmer to insert structured computer language commands to give the application a logical path through the intended process. This programming language is a full featured language with control structures for evaluation and iteration, a set of operators for forming expressions, and data types to model the process that is the focus of the application. The language has corresponding features of language elements found in other programming languages such as C and PASCAL. Such code is used extensively as attached to built screens and menus. It can also be called from within the program from a collected library. The library is coded to perform functions such as default salutation creation, mail merge field code positioning, permission verification, custom report generation, and code/field validation. A number of other functions are coded in this manner as well.

Other database management software can be used in accordance with the present invention. For example, custom-developed software or another commercially available software program, such as FileMaker Pro developed by Apple Corporation, can be used to create screens, menus and program code for an application.

Figure 2B:
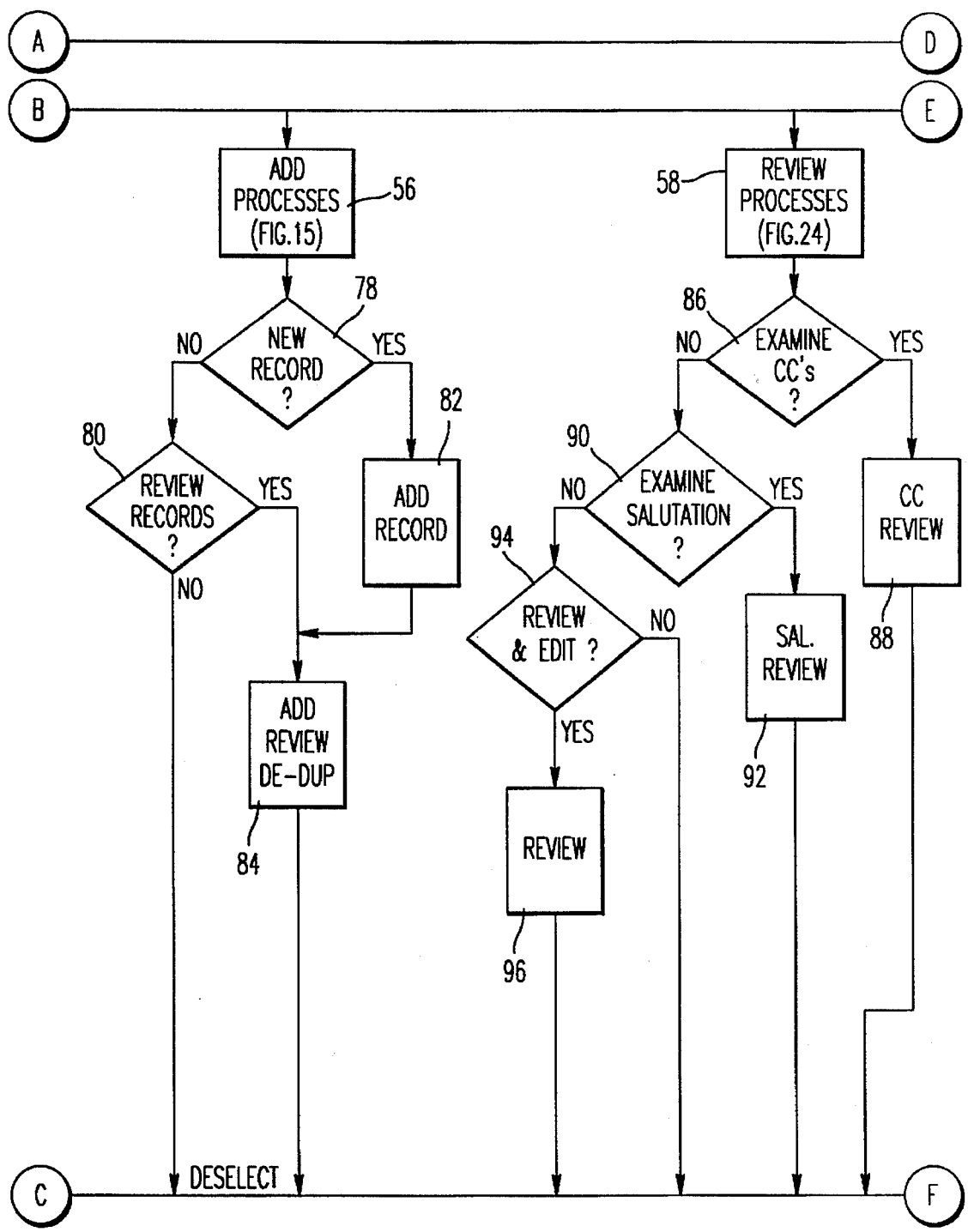
Figure 2C:
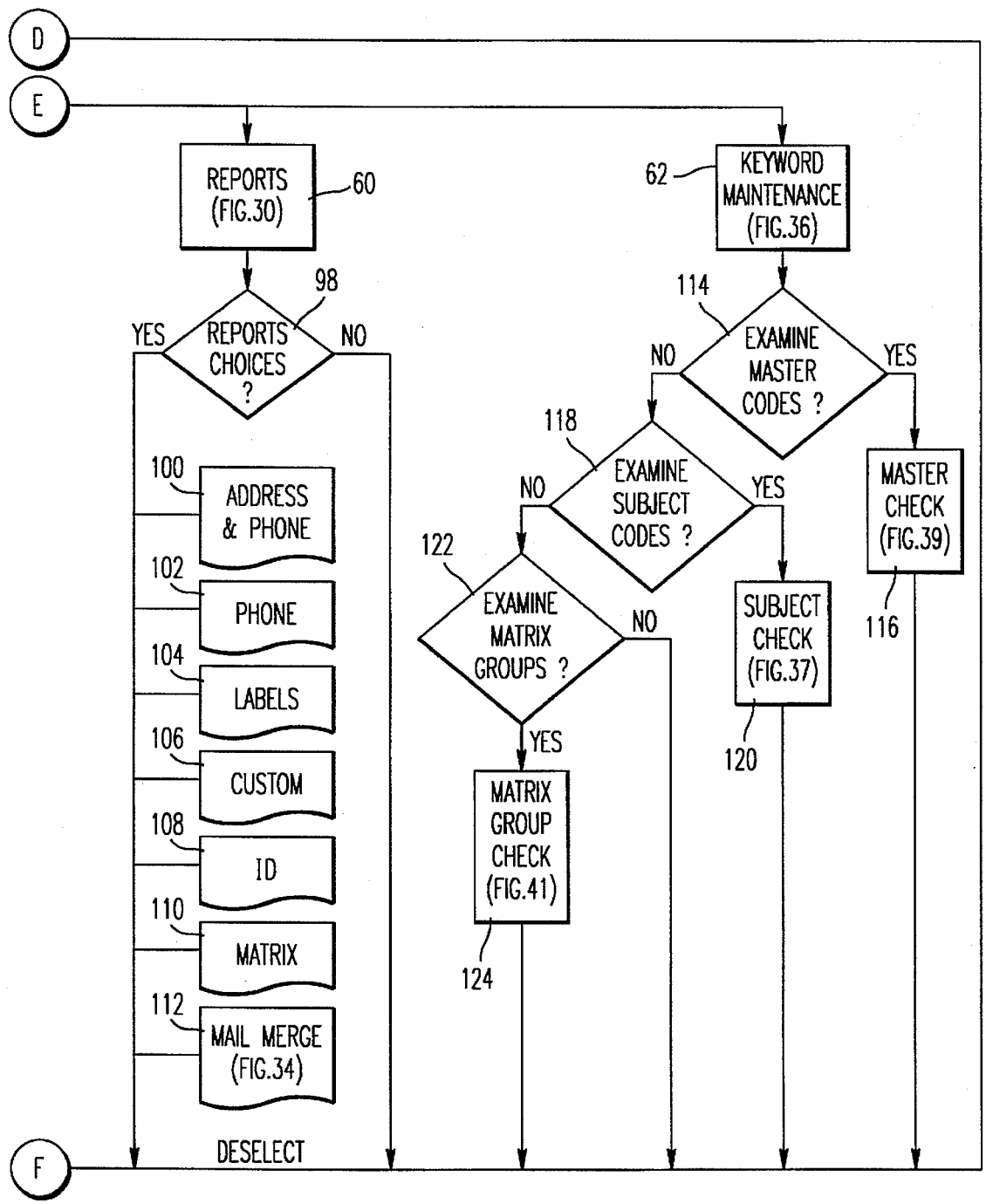
Figure 3:
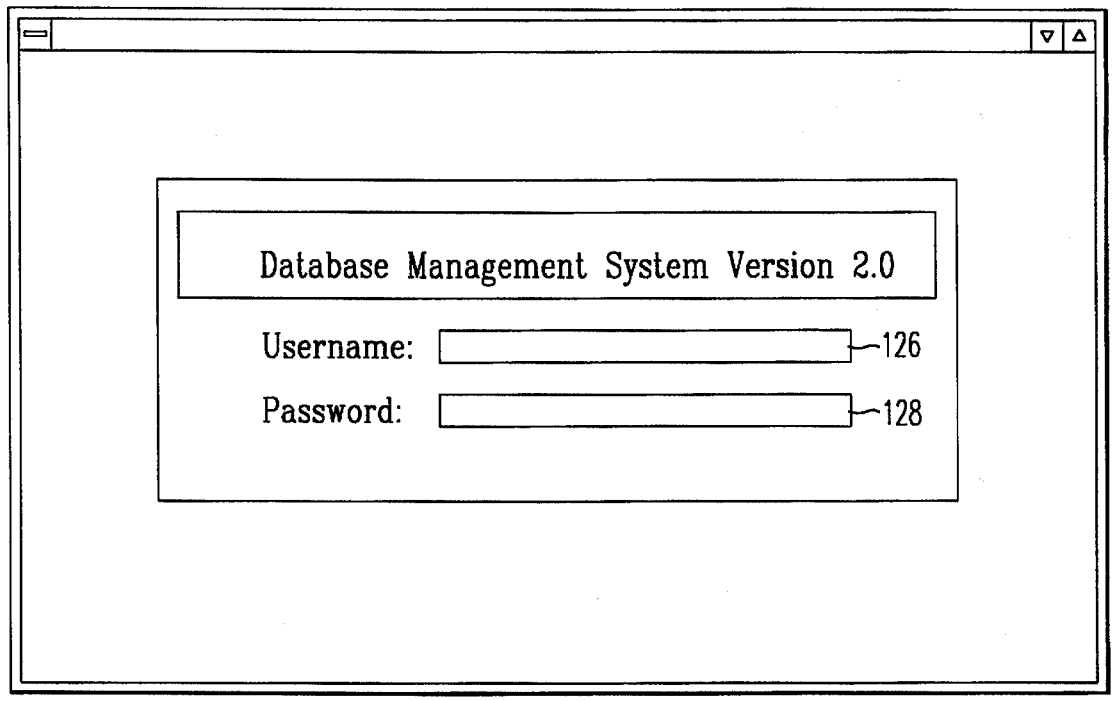
FIG. 3 depicts a log-on screen, in accordance with a preferred embodiment of the present invention.
Figure 4:
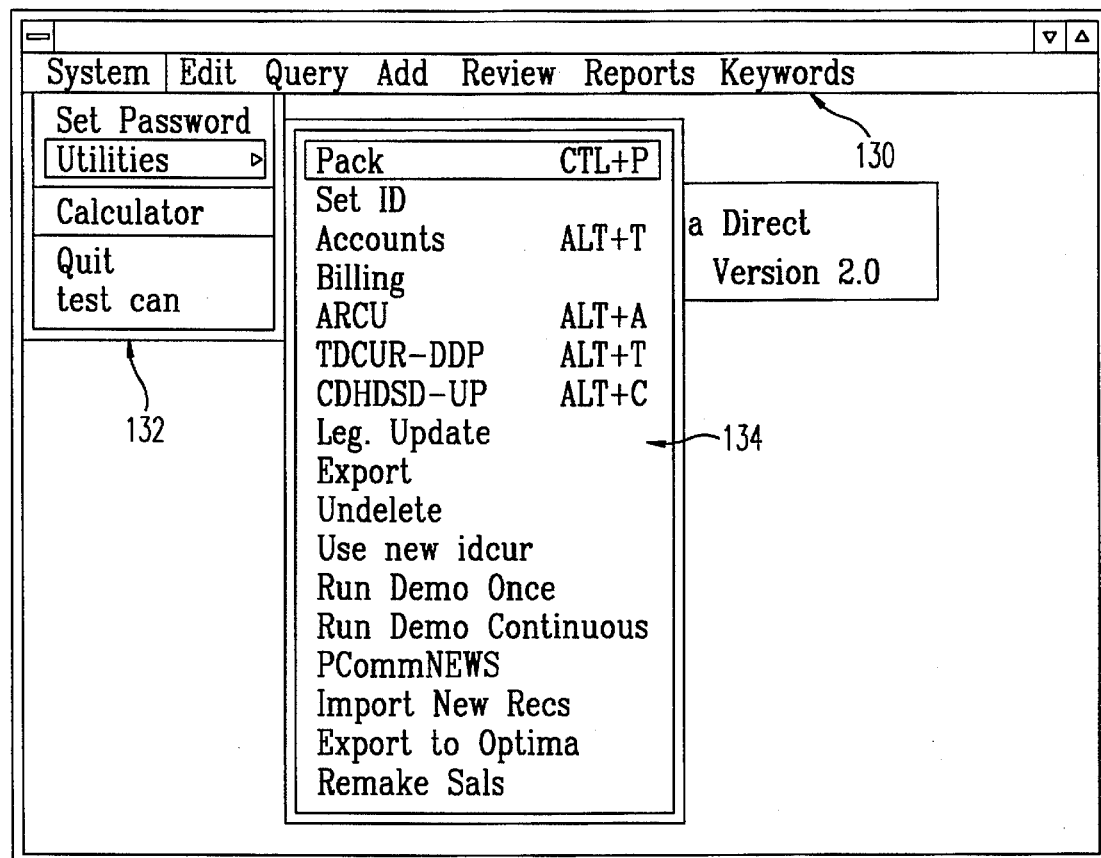
FIG. 4 depicts a screen for selecting various system maintenance options such as utilities, as well as options within the utilities menu option, in accordance with a preferred embodiment of the present invention.

The overall operation of the database management system 10 is illustrated in FIGS. 2A, 2B and 2C. With reference to block 50 of FIG. 2A and to the screen illustrated in FIG. 3, a user of the database management system 10 is prompted by the computer 12 to enter a user name (field 126) and password (field 128). If the password is valid, the computer 12 is programmed to generate a screen such as the one depicted in FIG. 4. The screen in FIG. 4 provides a user with a menu pad 130 at the top thereof. The menu pad provides the user with a number of options including System, Edit, Query, Add, Review, Reports and Keywords. A user selects from among these menu pad options by depressing a key on the keyboard or by using a mouse. When an option is selected, the computer 12 is programmed to provide a menu pop-up, such as the pop-up 132 shown in FIG. 4, providing options within each of the menu pad options. Several layers of menu pop-ups can be provided under each menu pad 130 option, as illustrated by the pop-up 134.

With reference to block 52 of FIG. 2A, if the System option is selected from the menu pad 130, the user is given the option to quit the database management system (block 64), to set or change a password for a particular user (blocks 66 and 68), or to select from a number of system utilities (block 70), which are listed in the menu pop-up 134 in FIG. 4. For example, system utilities comprise packing the database (e.g., consolidating the location of records within the database 14), defining identification (ID) numbers unique to each record, performing account management and billing functions, performing legislator updating, and exporting data in a number of output formats, as will be described in further detail below in connection with FIG. 5. Account management functions include, among other functions, the ability to define user permissions. System administrative and utility functions are preferably only performed by users who are system administrators. Users who are not system administrators can only perform various input and/or output operations on database records as defined by their user permissions.

With reference to block 54 of FIG. 2A, the user can retrieve various records from the database 14 (block 72) by forming a query (block 74), or by selecting from among a plurality of previously used and stored queries (block 76).

With reference to block 56 of FIG. 2A, a user selects the Add option to add new records to the database 14 (block 78). Once records have been entered (block 82), they are stored in a temporary memory space and not as permanent records in the database 14 until they have been reviewed in accordance with a deduplication process (block 84). With reference to block 80, records can be entered into this temporary memory space and reviewed for deduplication purposes during a later batch processing time or can be examined for deduplication purposes immediately after each new record is entered. The deduplication function insures that two duplicate records which differ only in that one record is erroneous (e.g., contains a misspelled name or address) are not stored in the database 14.

A user selects the Review option from the menu pad 130 to review and, if necessary, edit records which are semi-permanently stored in the database 14 (i.e., have undergone deduplication), as shown in block 58 of FIG. 2A. With reference to blocks 86 and 88, the user can examine the carbon copy field in each record stored in the database to change, if necessary, the carbon copy recipients listed therein. Further, the user can examine the salutation field in a particular record, as shown in blocks 90 and 92, to add or modify a personal salutation. With reference to blocks 94 and 96, other fields within the database records can be reviewed and edited.

With reference to block 60 in FIG. 2A, the user can prepare reports of records retrieved from the database 14 in accordance with, for example, a query. The report can be generated in one of many report formats, as indicated by the affirmative branch of block 98. For example, the user can simply print the address and phone numbers of a selected list of recipients (block 100), or simply their phone numbers (block 102). These lists can be used for a mass mailing or as a calling list for telemarketers. The user can also create labels for use on envelopes (block 104), or custom reports (block 106). Records within the database can be printed in accordance with their unique identification numbers (block 108). As will be described in further detail below, a user can compile and print database information using one or more matrices of codes (block 110). This information is particularly useful for identifying concentrations of recipients in the database 14 having similar characteristics, e.g., such as an interest in the same political issue. Finally, the user can create reports in mail mergeable form (block 112) for transmitting the data to, for example, another data processing device such as a word processing system. The word processing system in turn merges the data with a body of text such as a letter. The letter can be mailed or transmitted via broadcast facsimile.

With reference to block 62 of FIG. 2A, a user can create master codes (blocks 114 and 116) and subject codes (blocks 118 and 120) for retrieving selected groups of records in addition to using matrix codes (blocks 122 and 124). Finally, the Edit option on menu pad 130 is described below in connection with the screen depicted in FIG. 27.

The System option (block 52 in FIG. 2A) will now be described in further detail. Briefly, users are required to log in and provide a password in order to use the database management system 10. There are fifteen different classes of actions that can be granted for each user account such as adding, retrieving records, printing, and so on. Users who are system administrators can set up rates and usage units for printing, session usage, records added, connect time and record query by billing period. A legislative districting function periodically refreshes the congressional district, state house district and state senate district fields of each record in the entire database.

With reference to blocks 138 and 140 of FIG. 5A, the system administrator can select Accounts and Billing options from the Utilities pop-up 134 (FIG. 4) to define user access rights within the System option on the menu pad 130. The system administrator can also use the Utilities option on the menu pop-up 132 to perform legislator update functions (block 142) and export data and broadcast facsimile functions (block 144). The database management system 10 is configured to accommodate each different client or groups of users by allowing a system administrator to assign account names, as indicated in blocks 146 and 148, and to define various permissions, that is, operations the client can perform on the database 14. The permissions (block 150) include adding records and resolving duplicate records, if any, reviewing and modifying records, creating, editing and running queries, and printing reports, among other functions. The computer of the present invention is programmed to generate an Account Control System screen, as shown in FIG. 6, to guide a system administrator in assigning a password for each user and selecting those functions the user is permitted to perform. For example, the user whose screen is shown in FIG. 6 is permitted to review records and run queries; however, this particular user is not permitted to add records or modify code sets and matrices.

The computer is programmed to monitor each of the users' sessions on the database management system and to tabulate the number of minutes spent using the database, queries made, records added, as well as the number of pages printed. As shown in blocks 152 and 154, a system administrator can type the name of a selected user on a billing screen (not shown) and the computer responds with a tabulation of each of these system charges.

The data management system 10 is configured to manage data on federal and state legislators and the names of associated contact persons who can be contacted by telephone, letter or facsimile regarding a particular issue. The database 14 comprises at least one file with federal and state legislator information stored therein which can be updated, as indicated in blocks 156 and 158 of FIG. 5B. Current legislator (e.g., congressional district (CD), state House district (HD) and state Senate district (SD)) data can be imported from another data processing system or manually input into the database 14 to replace old data with current legislator data.

Figure 18:
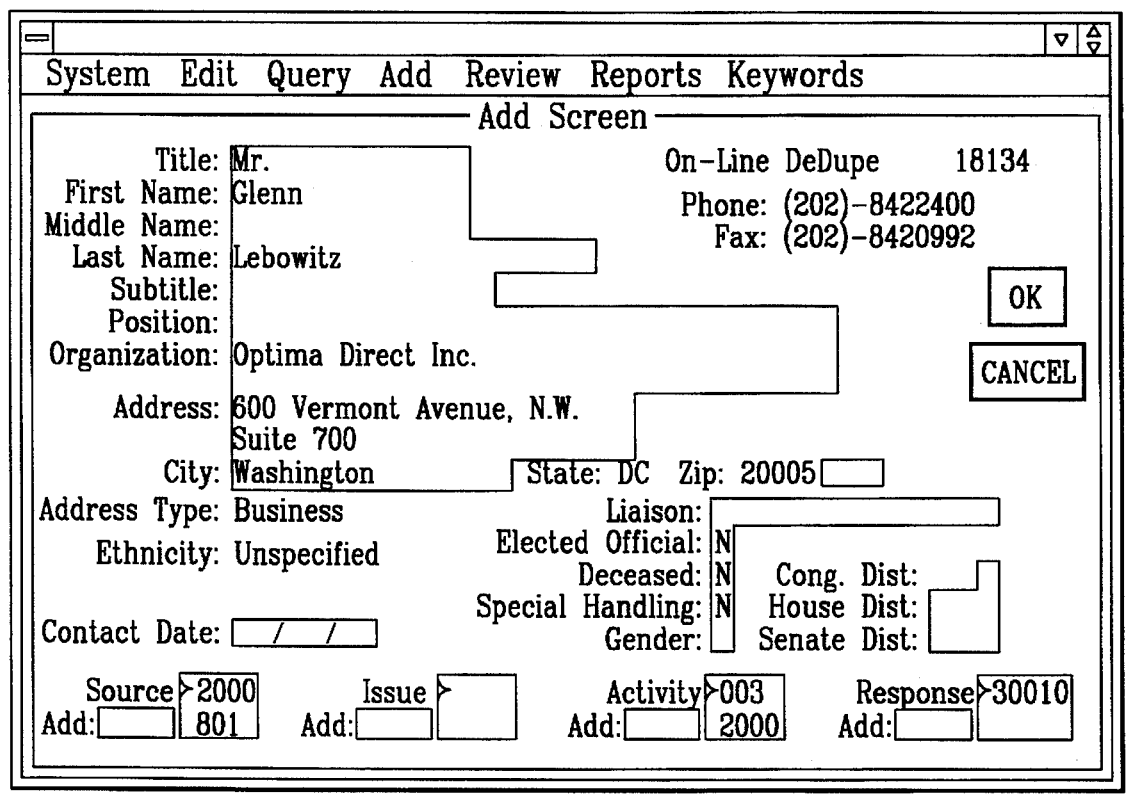
FIG. 18 depicts a screen for adding records to the database, in accordance with a preferred embodiment of the present invention.

Legislative districting data is preferably assigned codes. These codes are provided in the lower right hand corner of each record (as shown in FIG. 18). This legislative districting data is useful for querying the database for the names of persons who may be contacted to seek the support of their congressional and state legislative leaders on various issues.

Figure 5B:
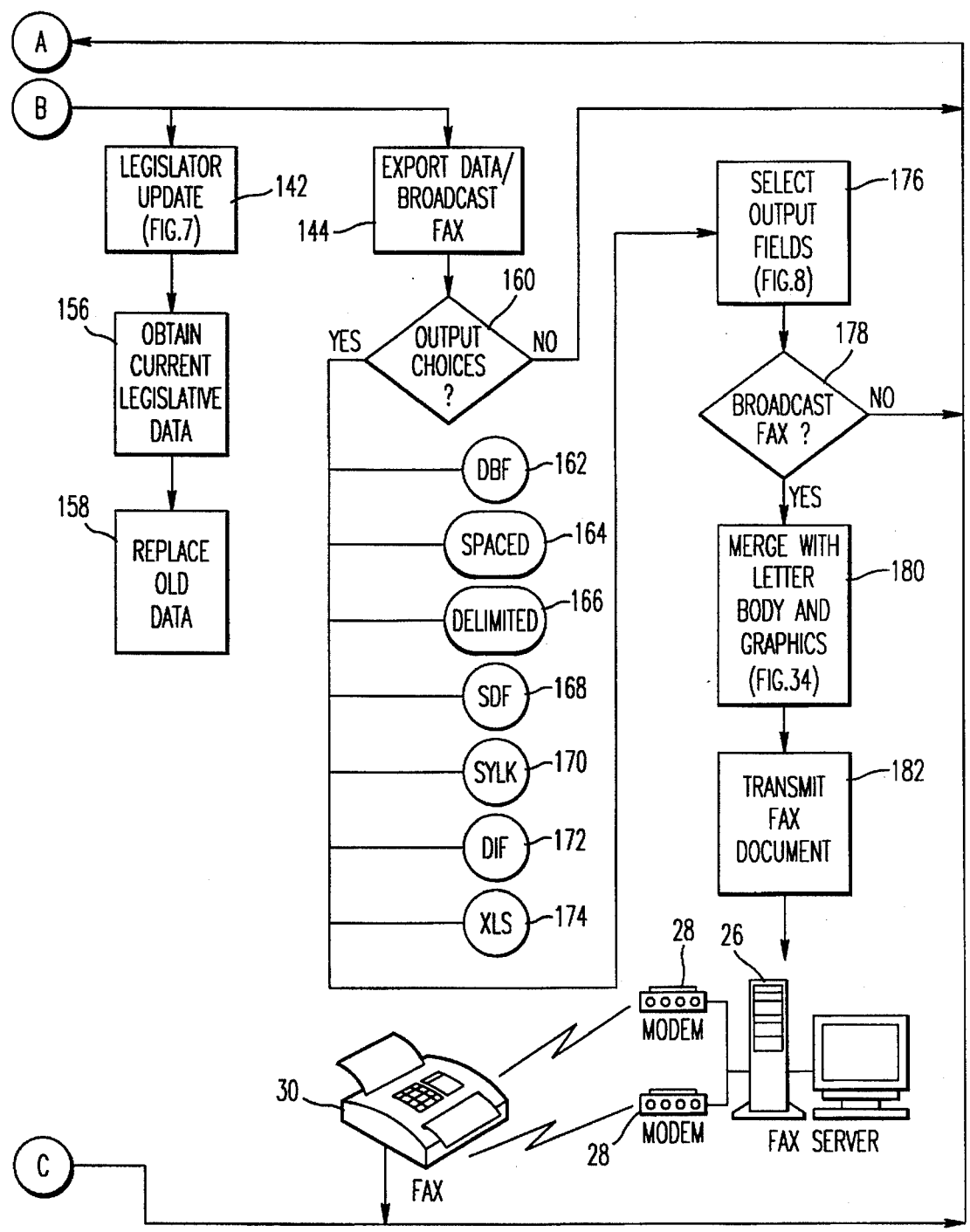
Figure 6:
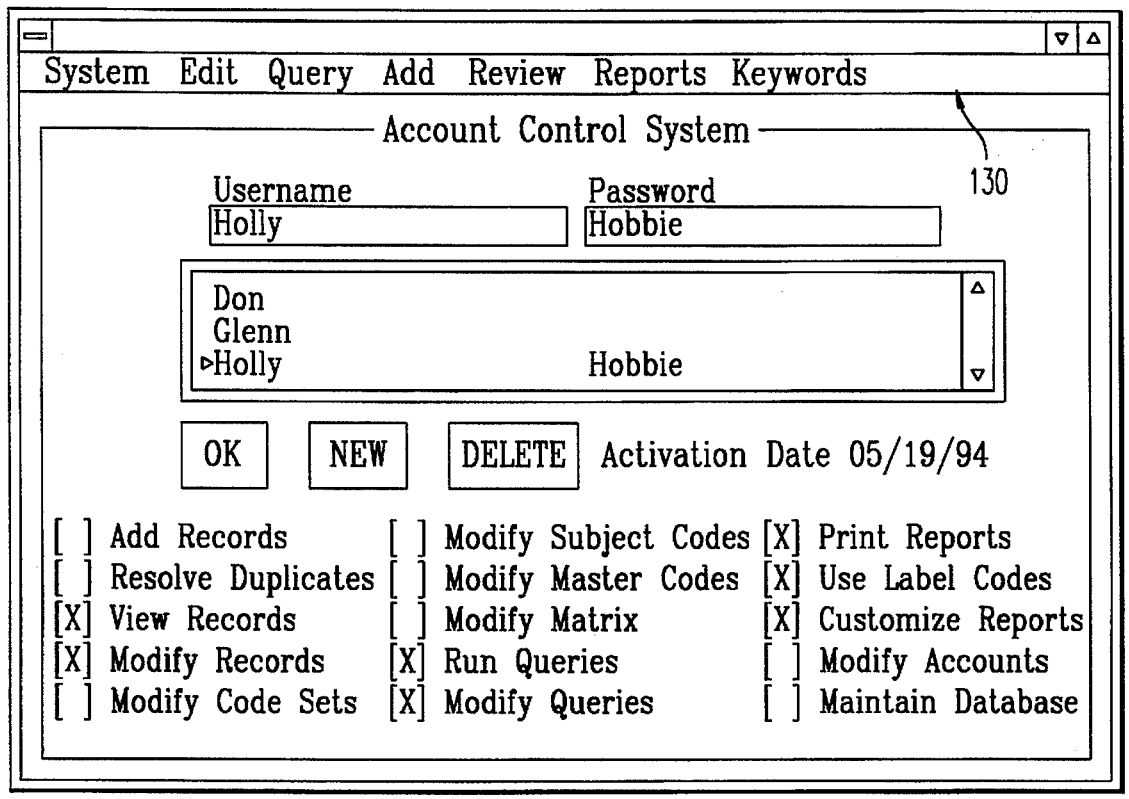
FIG. 6 depicts an account control system screen, in accordance with a preferred embodiment of the present invention.
Figure 8:
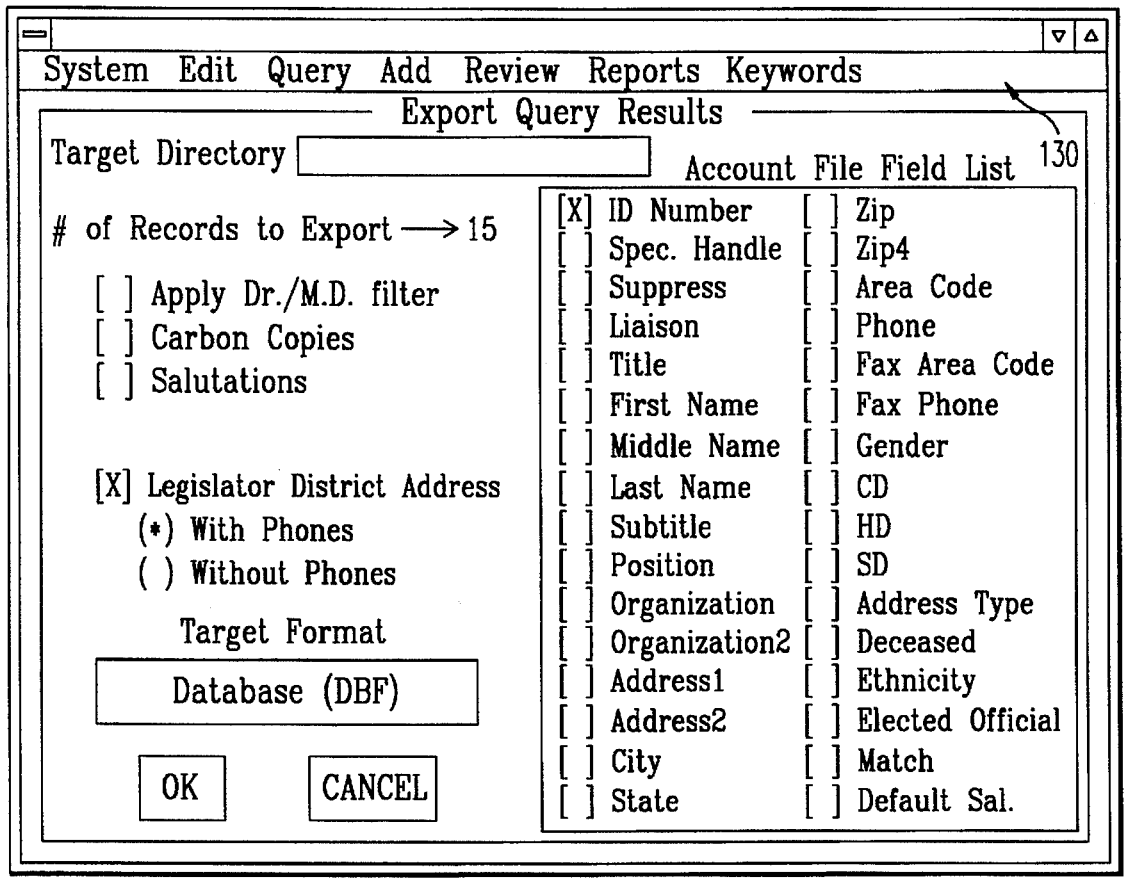
FIG. 8 depicts a screen for exporting query results, in accordance with a preferred embodiment of the present invention.

With continued reference to FIG. 5B, records which have been retrieved from the database 14 (e.g., as a result of a database query) can be formatted for output in a number of different ways, as indicated by blocks 160, 162, 164, 166, 168, 170, 172, 174, 176, and 178. The output formats are discussed below in connection with FIG. 33A, 33B and 33C. With reference to FIG. 8, the computer is programmed to create a screen for prompting a user to select different fields from each retrieved record (block 176) for exportation to another data processing system, for example, via a modem. Database information can also be broadcast to a number of remote facsimile machines, as indicated by block 178. Name and address data from selected retrieved records can be merged with the text of a letter and various graphics, as indicated in block 180, and transmitted to a remote facsimile machine, as indicated in block 182. The merged database data and letter can also be transmitted to a printer 24. The mail merge process is described below in connection with FIG. 34A(1), 34A(2), 34B(1) and 34B(2).

Figure 10:
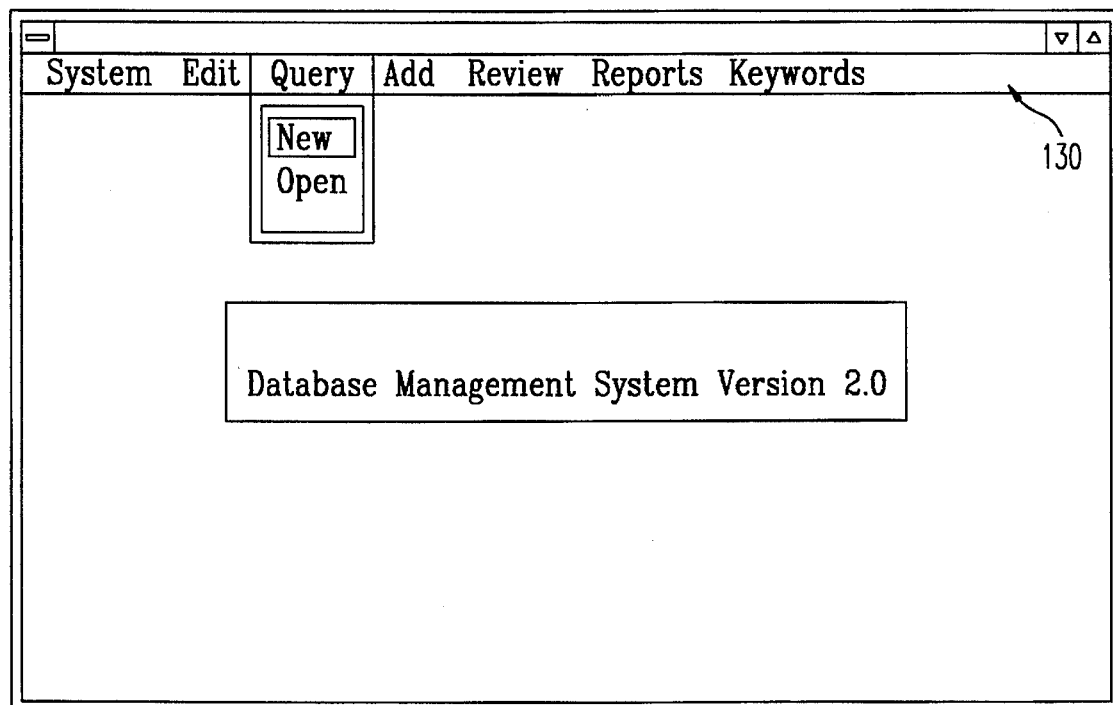
FIG. 10 depicts a screen which provides a user with the option of creating a new query or using an existing query, in accordance with a preferred embodiment of the present invention.
Figure 9A:
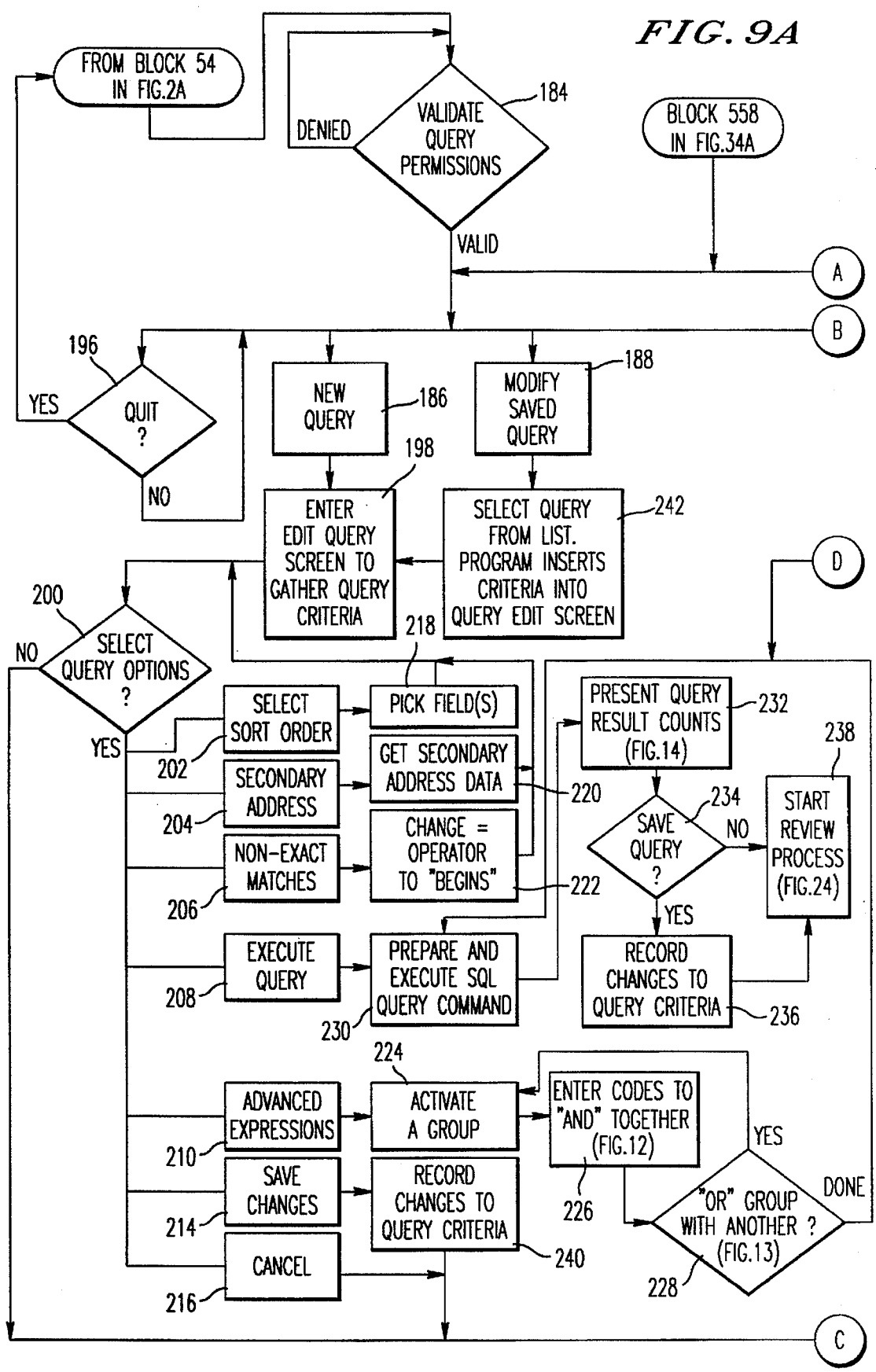
Figures 11, 12:
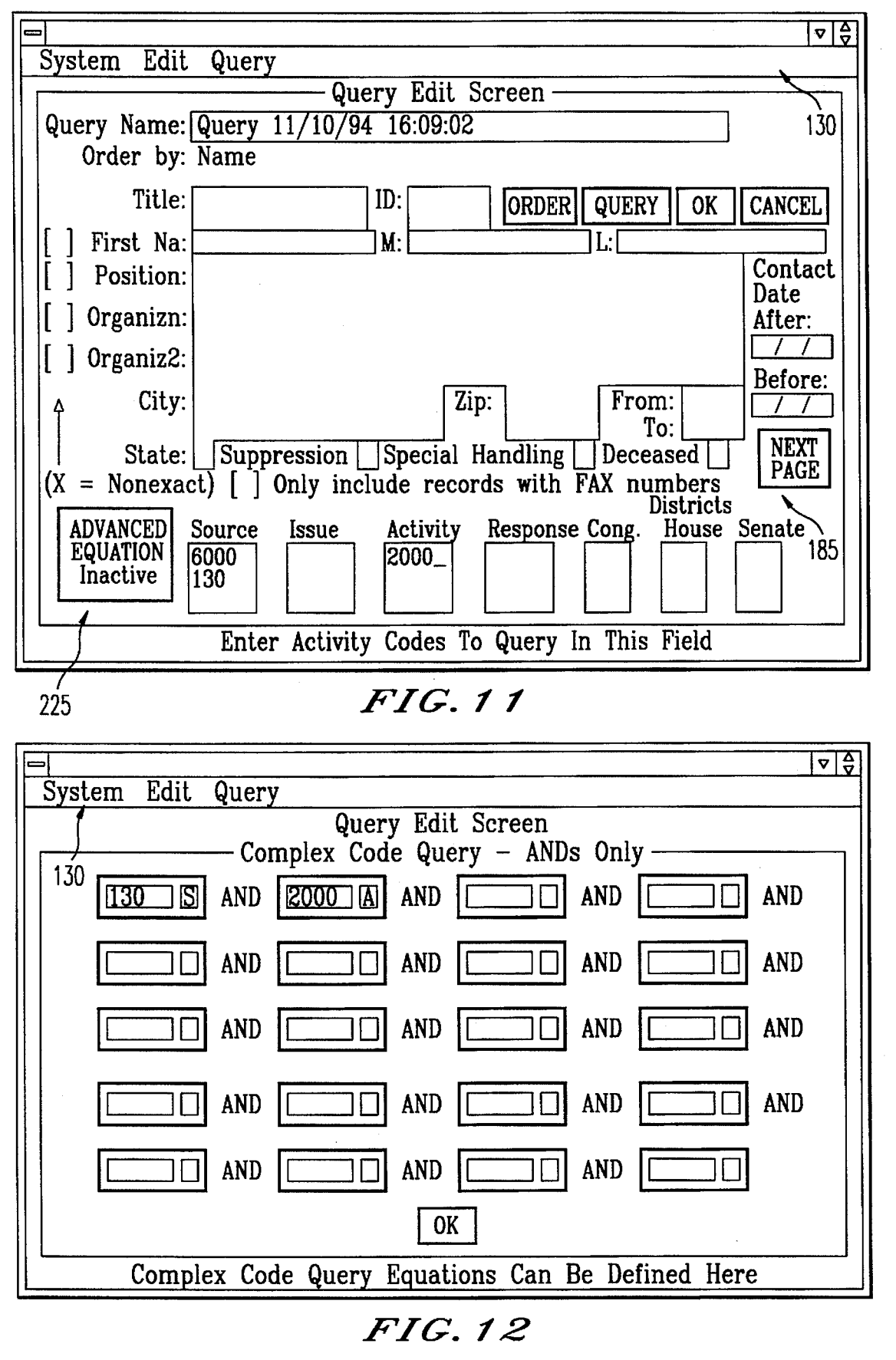
Figure 15A:
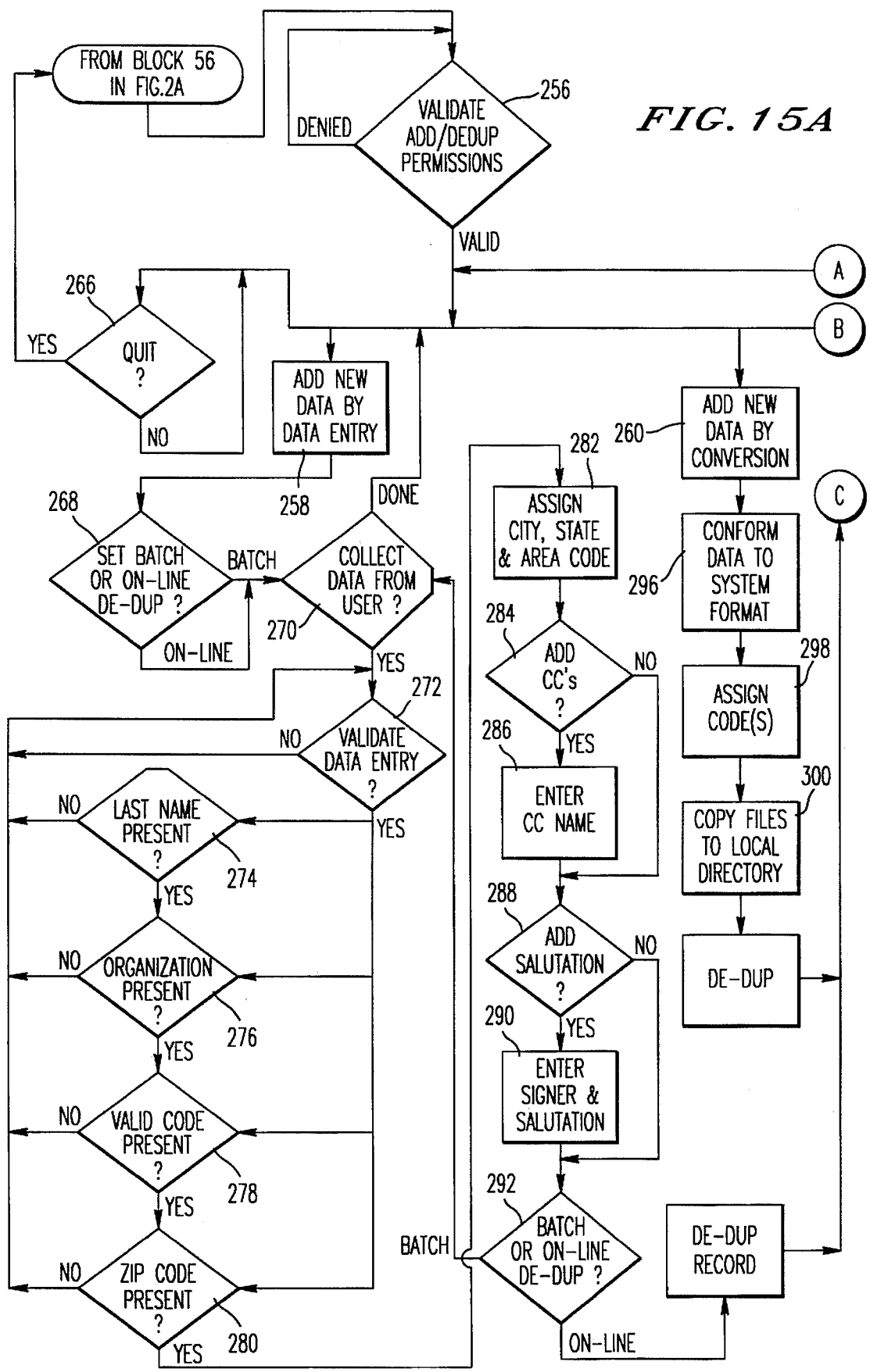

The manner in which records are retrieved from the database 14 will now be described in connection with the Query option from the menu pad 130, as indicated in FIGS. 9A and 9B. As indicated by the screen in FIG. 10, a user can create a new query or can open a file to access a previously used query that was saved for future use. With reference to FIG. 11, name, address and coding information is displayed when browsing a query. A button, e.g., the NEXT PAGE button 185, indicates the presence of any other more detailed information in the records being browsed so that the user can review it when appropriate.

With reference to FIGS. 9A and 9B, the computer is programmed to determine if the user is permitted to run and/or modify queries by examining account control data (FIG. 6) in the database 14 relating to that particular user (block 184). The computer is programmed to generate a menu pop-up comprising a menu of query options when the Query option is selected from the menu pad 130. The Query options in the menu pop-up include creating a new query (block 186), modifying a previously saved query (block 188), executing or running a saved query (block 190), deleting a previously saved query (block 192), and accessing a multi-user query library (block 194) or otherwise quit, as indicated by the decision block 196.

If the new query option (block 186) is selected from the menu pop-up, the computer is programmed to generate an Edit Query screen (FIG. 11) which prompts the user to enter query criteria, as indicated in block 198. The computer 12 prompts the user to select from a number of query options (block 200) such as sorting retrieved records in accordance with selected fields and arranging the fields in a particular order on a display screen or in a printed report (block 202). Other options include retrieving the secondary address of selected records (block 204), retrieving records having similar but not exactly matching data in selected fields (block 206), formulating a query by ANDing and ORing selected group codes (block 210), saving new or modified queries (block 214), executing queries (block 208), and canceling the select query option (block 216) to return to the previous options (blocks 186, 188, 190, 192 and 194).

Figure 32:
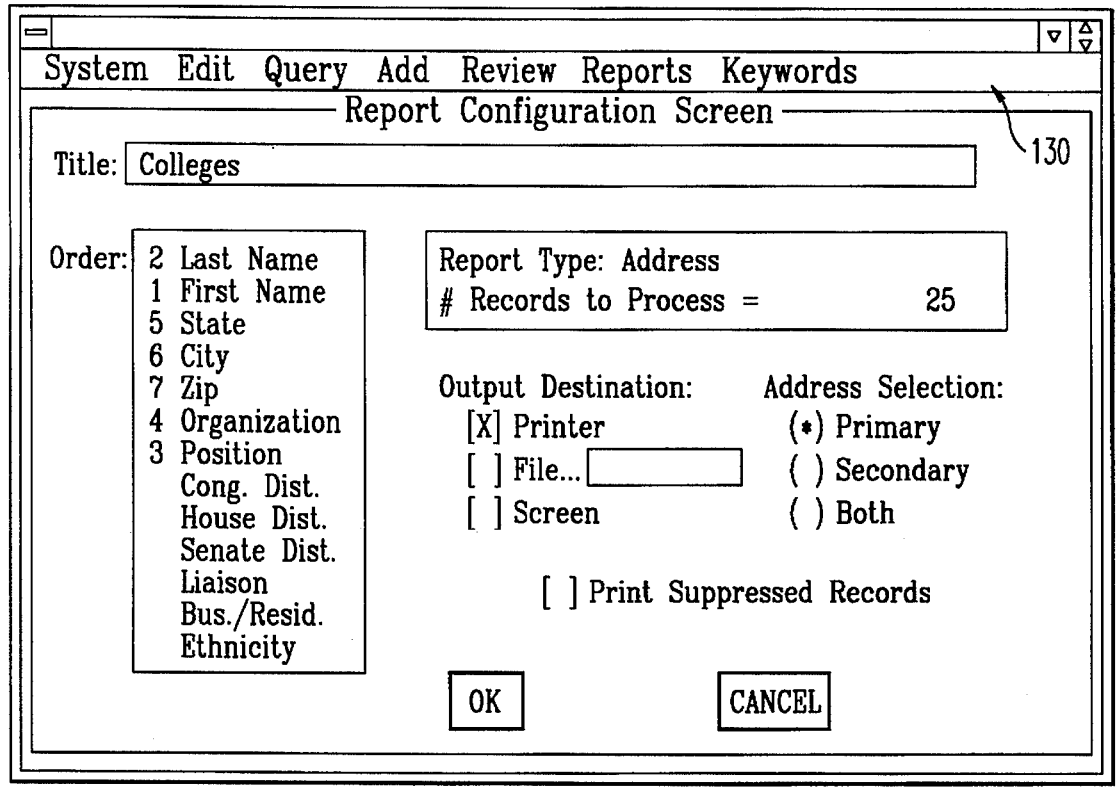
FIG. 32 depicts a report configuration screen, in accordance with a preferred embodiment of the present invention.
Figure 35:
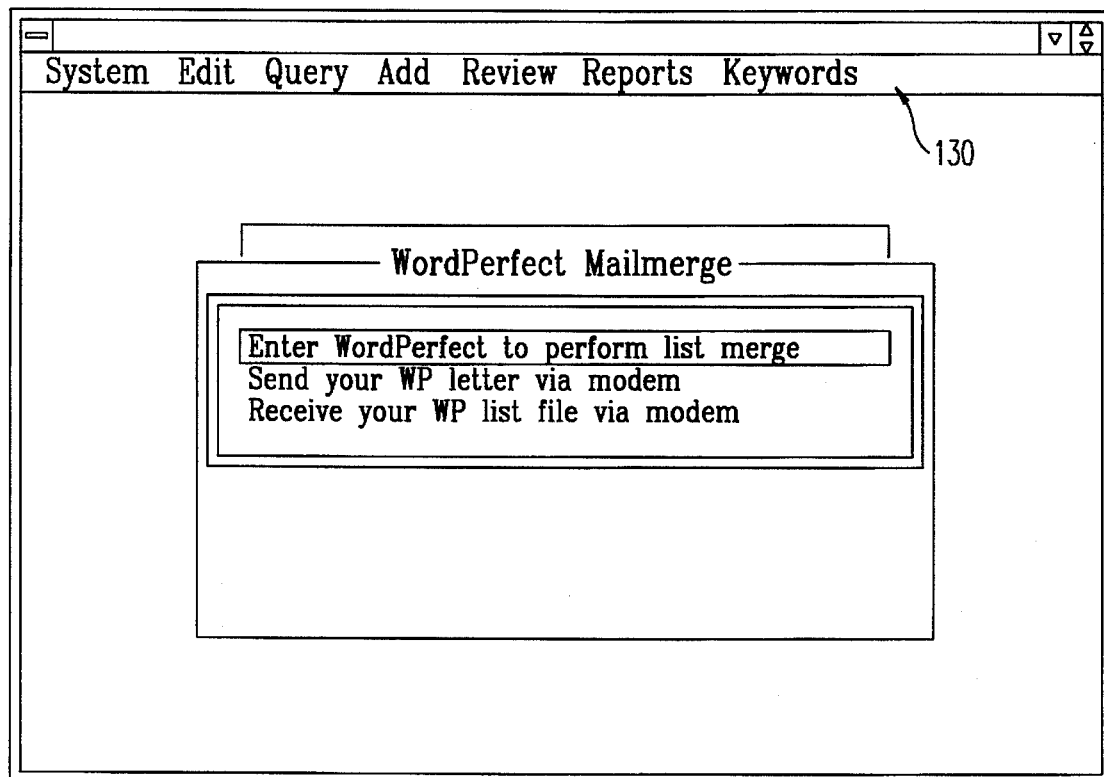
FIG. 35 depicts a mail merge screen, in accordance with a preferred embodiment of the present invention.

If the sort order option (block 202) is selected, the computer prompts the user to select field(s) (block 218) by generating a screen similar to the screen depicted in FIG. 32. The screen, however, comprises only a partial list of record fields since it does not make sense to sort in accordance with certain fields such as street address. Secondary address data (block 220) such as legislators' home offices are oftentimes useful. The user can also instruct the computer to retrieve records which do not exactly match the query criteria (block 222). The user can specify how much of a field can be used for comparison purposes when locating a match. For example, the user can elect to retrieve records of recipients whose last names begin with "G", "GO", and so on.

As will be described below in connection with the Add screen, each new record added to the database comprises a person's name, title, organization, position within the organization and address. The congressional and state legislative districting information for that person is provided, along with a number of codes. Source codes, of which there can be an unlimited number, are used to keep track of the origin of the record. For example, names and related data of communication recipients can be obtained from membership rosters of different organizations, government and private business offices, and universities. Issue codes indicate reasons for contacting the person in the record that are of special interest to that person. For example, recipients can be contacted regarding access, price controls and/or vaccine issues in health care reform. Activity codes are used to indicate participation in an event or program such as a mail effort. Response codes monitor the reaction of the person in the record to a particular activity. For example, a recipient in a record can be notified of a particular event or program and asked to telephone or write a personal letter to their congressional representatives, or to attend a meeting. Response codes indicate, for example, whether the letter was responded to or whether that recipient attended the meeting. This information is useful at a later time to determine the names of persons who can be relied on in the future to help with a lobbying effort.

The source, issue, activity and response codes, as well as the congressional state house and state senate district codes can be used to retrieve selected records from the database that correspond to persons the user wishes to contact, for example, on a particular political issue. Complex queries are generated by using combinations of fields and/or codes. As shown in FIG. 11, the Advanced Equation button 225 can be depressed using the input device 15 to activate this option (block 224).

With reference to block 226 of FIGS. 9A and 9B, complex code query allows testing for the presence of one or more code types that are ANDed together in a group (FIG. 12). The group in turn can be optionally ORed (block 228) with as many as eleven other groups (FIG. 13). A database file comprising the issue, activity, source and response codes is used which allows ANDing.

A query can be a zip code range query, as well as a query to retrieve records of persons who can be located in specified multiple zip code areas, in a particular state or city, or in one or more legislative districts. A query can also be formulated to output a list of persons having similar titles and of records having specified identification numbers or combinations of codes. Queries can also be performed on secondary address fields.

When the execute query option (block 208) is selected, the computer is programmed to interpret the field selections of the user into a Structured Query Language request (block 230) and to optimize the request for the fastest possible access to the database using available indexes within the database. These indexes include special indexes for deleted records, empty fields and combinations of fields. Individual key fields are examined immediately after the user enters a query to prevent needless execution of an erroneous or empty complex query. With reference to FIG. 14, the computer is programmed to display query results (block 232) during the processing of a particular query. No matter what type of query is formulated, the user can elect to execute the query option, and the computer is programmed to execute a SQL query command. Further, once the SQL query command is processed and records are retrieved, the computer is programmed to present query result counts on the screen. The user is then given the option to save the query for future use (block 234). A new query or changes to a previously stored query are recorded (block 236). The user is then prompted to begin the review process on the retrieved records (block 238).

Figure 7:
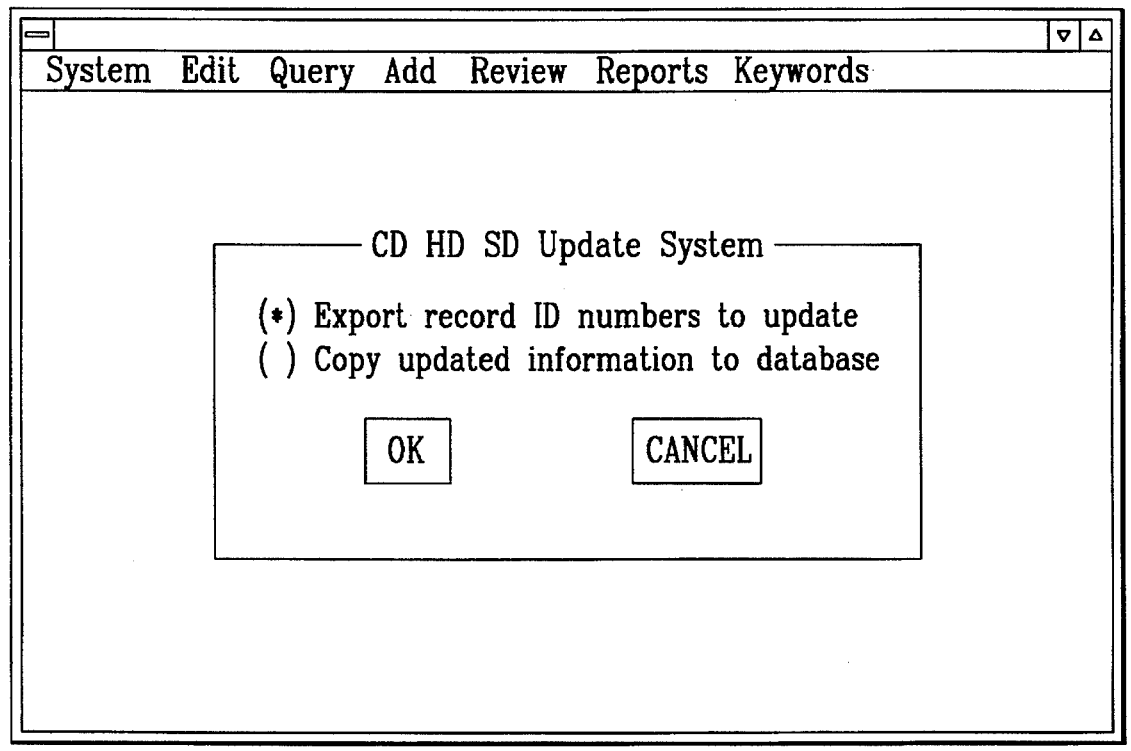
FIG. 7 depicts a screen for updating legislative districting data in the database, in accordance with a preferred embodiment of the present invention.

In contrast with standard database management software such as FoxPro, which is record oriented only, the database 14 operates on query results as sets and allows data to be updated at the individual record level or at the whole set level using retrieved record ID numbers. Thus, query results can be saved using search criteria in lieu of retrieved record ID numbers and updated periodically. As indicated in FIG. 11, a particular query can be referenced by name, date and session time. As indicated by the screen in FIG. 7, the computer 12 is programmed to prompt a user to export record ID numbers from a saved query to, for example, an external data processing system for updating the records as a set, and to store the updated records to the database 14.

In addition to formulating a brand new query, a previously stored query can be selected from a list when the modified saved query option is selected (block 188 of FIG. 9A). Accordingly, the computer is programmed to provide the user with an Edit Query screen (block 242) containing information pertaining to the selected query in its respective fields. Whether it is a new or a modified and previously stored query, the user has the option to save (block 240) the changes to the query criteria or to cancel (block 216) any changes made on the edit screen.

As mentioned previously, queries can be stored in a file within the database 14. Thus, a user having a valid query permission to do so can select a query from a list of those stored in the query database file (block 244). Once the user selects one of these queries, the computer is programmed to prepare and execute a SQL query command. Similarly, the user can select a query from the list for deletion, as indicated in blocks 246 and 248.

The file for saving stored queries is a memory space organized to save queries on a per-account or per-user basis. Users, however, can share their queries with other users by storing them to a multi-user query library, as indicated in block 194. The user can copy a selected private query to the shared library (block 250), or access a shared library (block 252) if the multi-user query library option is selected. Once the user accesses the shared query library, the user can delete (block 254) a selected shared library query, or copy (block 255) one to their user or account-specific query library as desired (block 257).

Figure 19:
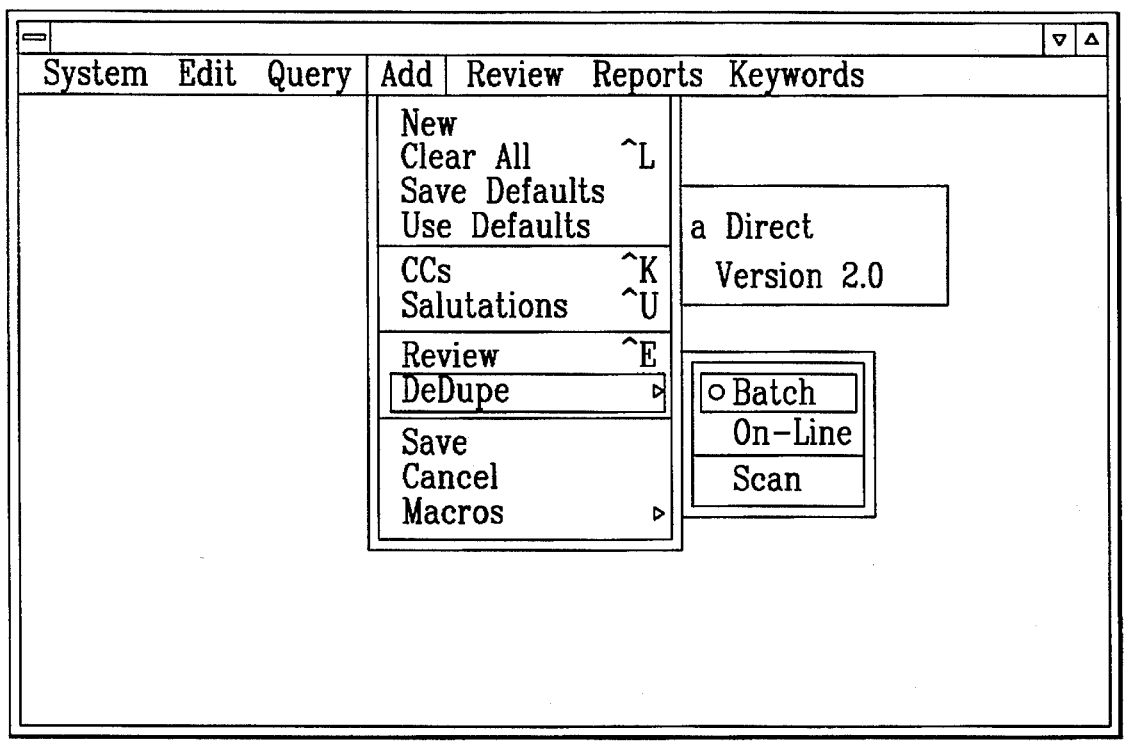
FIG. 19 depicts the screen of FIG. 17 having a menu pop-up for the batch or on-line deduplication option, in accordance with a preferred embodiment of the present invention.
Figure 20:
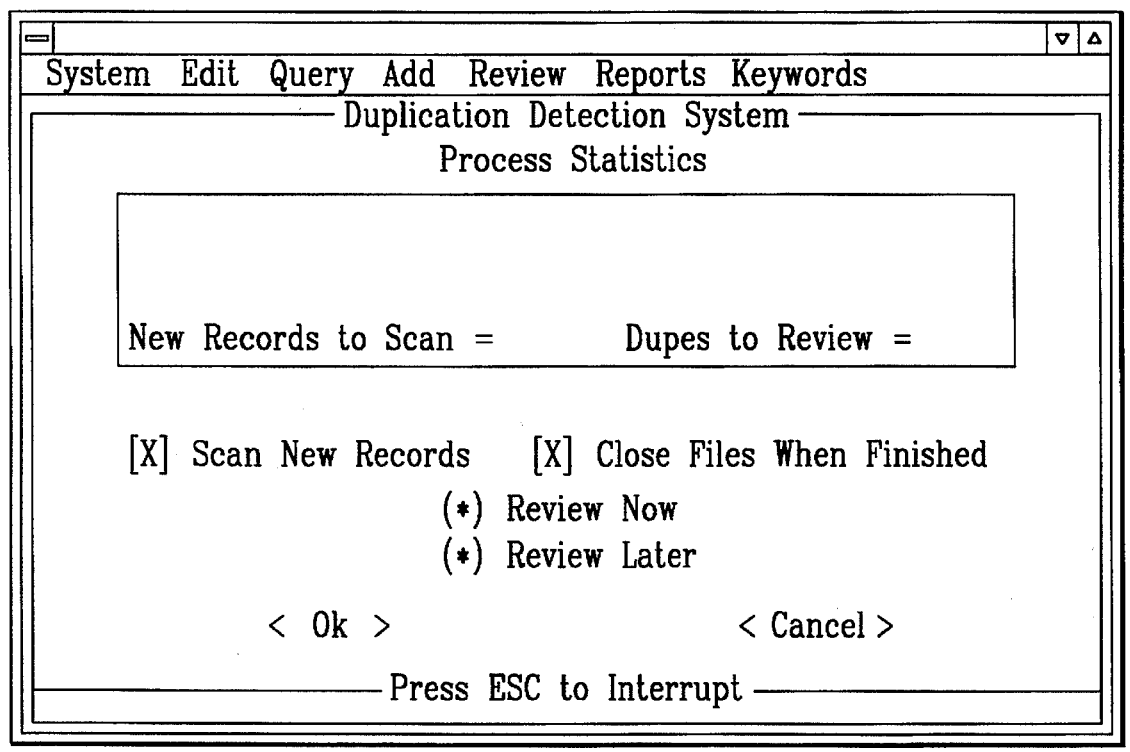
FIG. 20 depicts a deduplication process statistics and options screen, in accordance with a preferred embodiment of the present invention.
Figure 23:
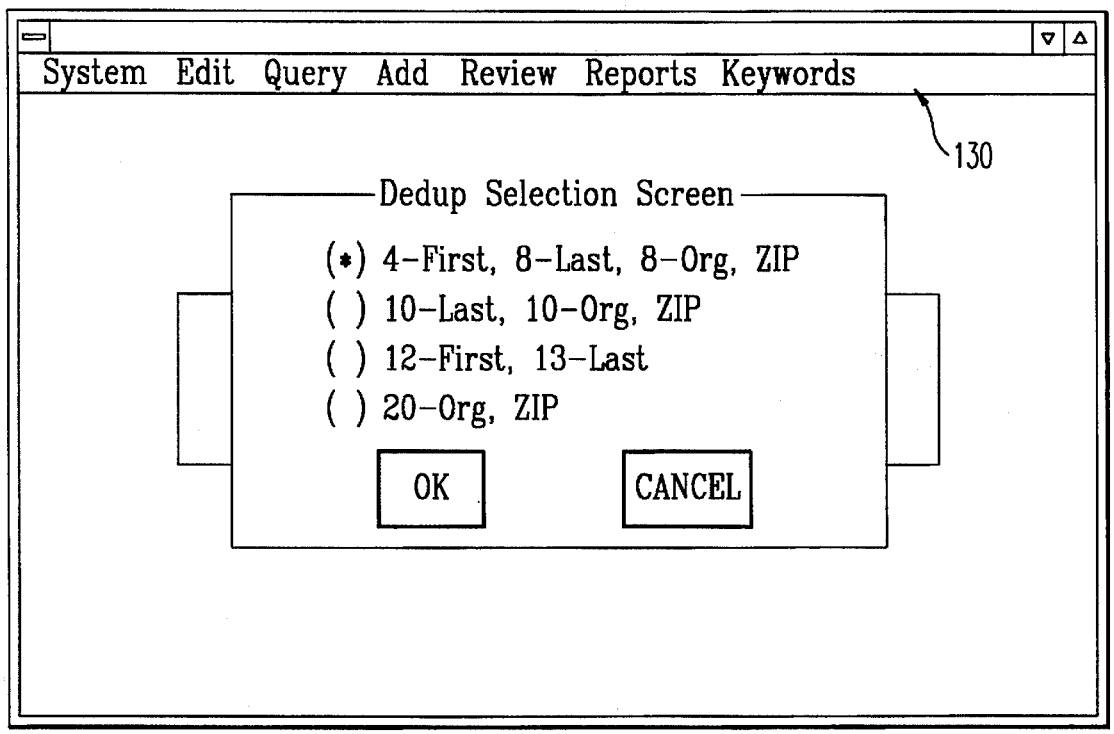
FIG. 23 depicts a deduplication selection screen, in accordance with a preferred embodiment of the present invention.

The process by which new data records are entered into the database 14 will now be described in connection with FIGS. 15 through 23. The computer 12 is programmed to determine from account information (FIG. 6) whether or not the user has permission to enter new data records into the database 14 (block 256). The record entry or add process involves adding and storing records (blocks 258 and 260) in 10 a pre-admission queue where they are then reviewed (block 262) and verified prior to appending them to the database 14. The records are deduplicated (block 264) during the appending process. As will be described in further detail below, the computer determines the similarity or likeness of the record to existing database records according to a variable algorithm, as well as other criteria. Any existing records that are likely to be duplicates are presented to the user for field level merging or discarding of either the existing record or new record where appropriate. As shown in blocks 268 and 270, a user can add and deduplicate records one at a time, or add records and then deduplicate them at a later time during a batch process (FIGS. 19 and 20).

With reference to FIG. 18, data can be entered manually by the user or downloaded from another data processing system. If the user enters the data, the data entry is validated (block 272). For example, the computer is programmed to detect the presence of an entry in the last name (block 274), organization (block 276), valid code (block 278) and zip code (block 280) fields of a new record. The data is not accepted into the pre-admission queue unless each of these fields is provided with data.

Figure 17:
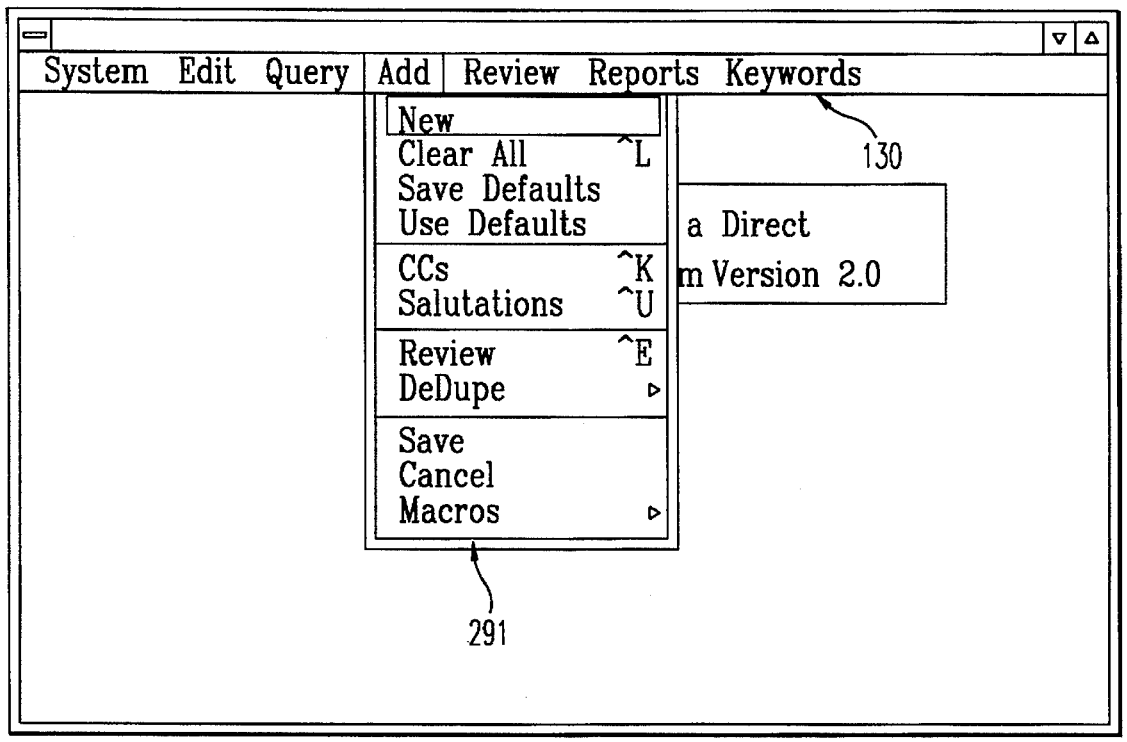
FIG. 17 depicts a screen for selecting from among a number of add record menu options, in accordance with a preferred embodiment of the present invention.

City, state, and area code data are stored by Zip code. Zip code entry allows city, state and area code to be retrieved via a table look-up by the computer 12. After city, state and area codes are assigned to the new record (block 282), the user can add a list of carbon copy recipients (blocks 284 and 286), and personal salutations (blocks 288 and 290) for a number of contact persons. These options are indicated in the Add screen menu pop-up 291 (FIG. 17). As shown in block 292, if on-line deduplication has been selected, the Add process continues onto the deduplication process (block 264). 10 If data is imported into the system, as opposed to being manually input by the user, the data is converted to a format which conforms with the data management system format (block 296). Codes are assigned (block 298), and files are copied (block 300) to a local directory, before the deduplication process begins for each of the new records provided batch deduplication processing has been selected. With regard to block 262, the computer 12 allows the user to review new records in the pre-admission queue by browsing the records (block 302), replacing old data (block 304), editing and updating carbon copy recipient names (blocks 306 and 308) and personal salutations (blocks 310 and 312) entered into the database, as well as editing name, address, and codes fields, among others (blocks 314 and 316).

During deduplication (block 264), new records entered manually, or received via the importation function (block 260), are scanned by the computer (blocks 318 and 320). A match key is generated for each new record (block 322). The computer examines records in the database for existing records having a similar match key (block 324). If a similar match key is found in the existing records, the suspect new record is stored in a temporary review database (block 326); otherwise, the new record is inserted into the database 14 (block 328).

With reference to block 330, records suspected of being duplicates and therefore stored in the temporary review database are reviewed. The computer 12 is programmed to display the existing record (block 332), as well as the new record (block 334). FIGS. 21 and 22 depict, respectively, exemplary existing and newly added records. The display of suspect original or existing records and new records aids the user in the process of determining whether an existing record should be replaced 10 with a new record, for example, in the situation where the existing record contains inaccuracies in the address information. The ability of the user to intervene and review both a suspect existing record and a new record allows the user the options of keeping the existing record and discarding the new record from the temporary review database (block 336), keeping the new record and discarding the existing record (block 338), keeping both records (block 340), or combining fields from both records to create another new record while keeping both records or to modify one of the records (block 342). These options are shown in the menu pop-up 341 in FIG. 22.

As stated previously, new records can be deduplicated on the basis of a variety of criteria. For example, set criteria can be used, as shown in the screen menu in FIG. 23. The criteria shown as being selected in FIG. 23 include examining the first four letters of the first name field, the first eight letters of the last name field, the first eight letters of the organization field, and the zip code field in each record. Further, user defined criteria and other algorithms can be used.

Figure 16A:
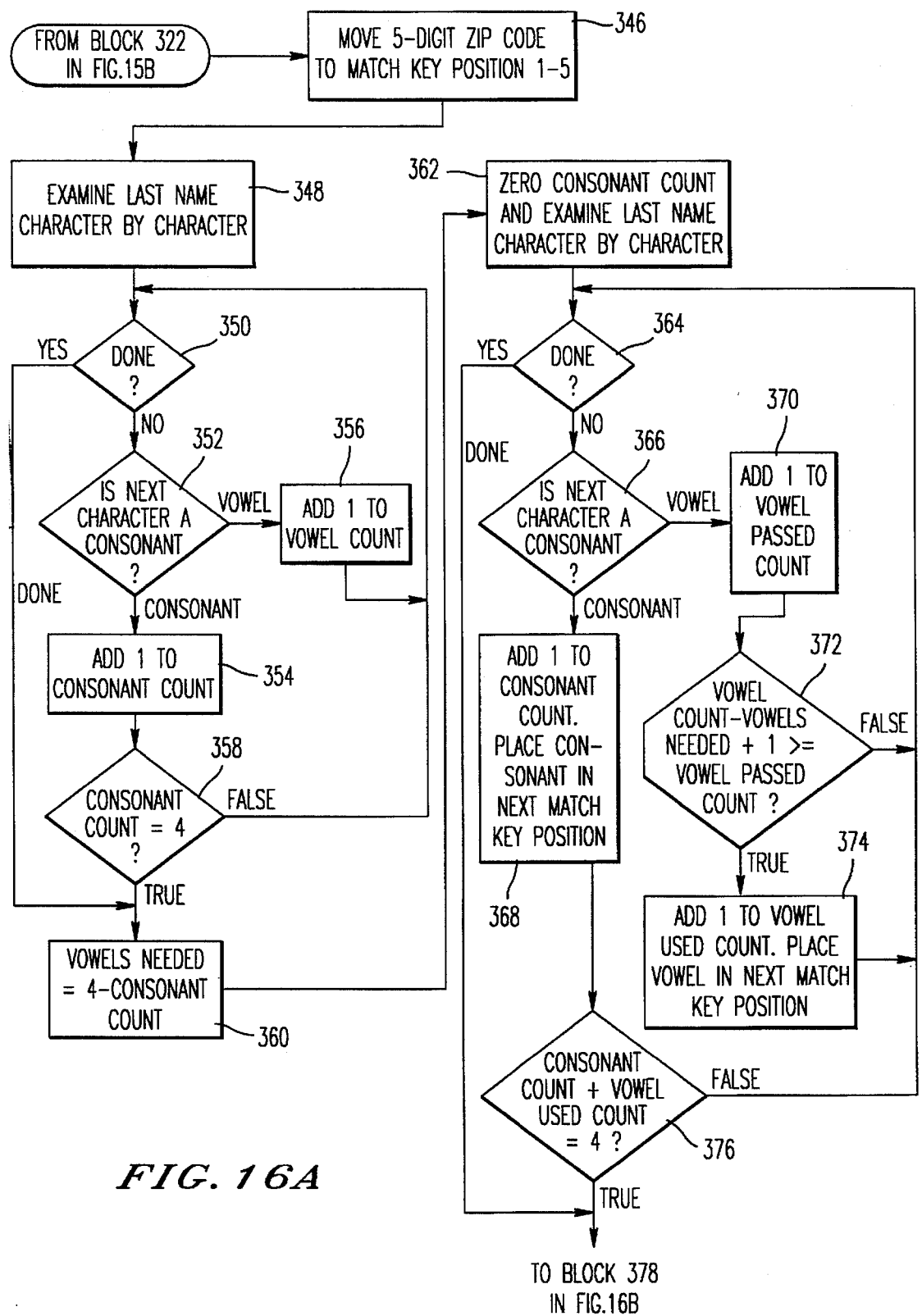
FIGS. 16A and 16B are a flow chart depicting the sequence of operations for creating a match key for deduplication purposes, in accordance with a preferred embodiment of the present invention.
Figure 16B:
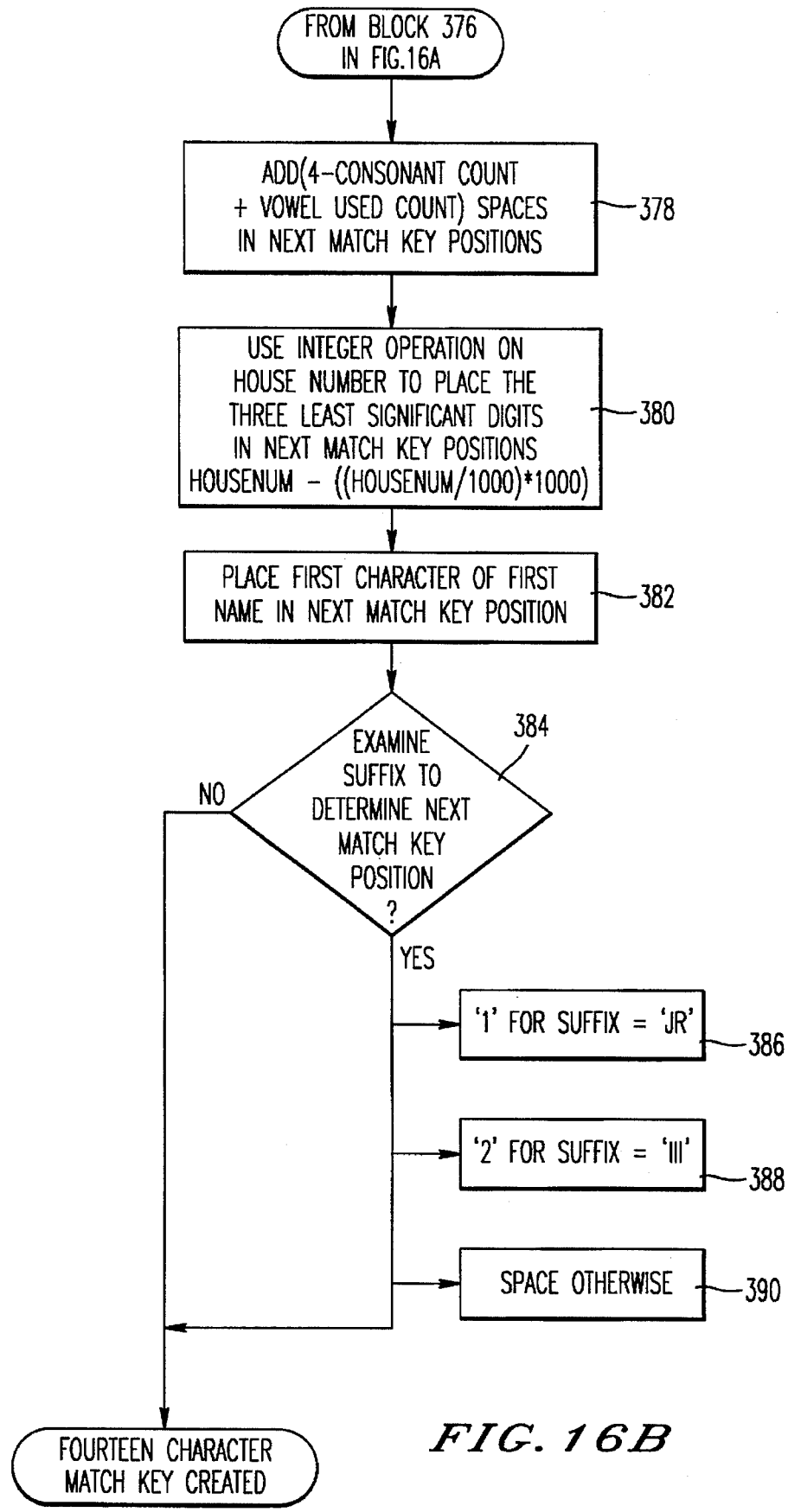

In accordance with an embodiment of the invention, an algorithm generates a match key for each new record which is later used for comparison (block 322) with the match keys of existing records. With reference to FIG. 16A, the information in the zip code field of a new record is entered into a storage location adapted to store a binary number comprising preferably fourteen (14) digit or match key positions (block 346). The name entered in the last name field is examined character-by-character (block 348). If the first character is a CONSONANT, a one is added to a consonant counter (blocks 352 and 354); otherwise, a one is added to a VOWEL counter by the computer 12 (block 356). The character-by-character examination of the last name continues until the CONSONANT counter achieves the value of four (4) (block 358) or the last letter of the last name is reached (block 350). A variable VOWELS NEEDED is calculated as an integer value, e.g., four (4) less the value of the CONSONANT counter (block 360).

The CONSONANT counter is provided with a zero value, and the last name is examined character-by-character once again (block 362). If the next character is a consonant, the CONSONANT counter is incremented by one, and the consonant is stored in the next match key position (blocks 366 and 368). If the next character is not a consonant, the VOWEL PASSED counter is incremented by one (block 370). If the sum of the value in a VOWEL USED counter less the value in the VOWELS NEEDED counter plus one is greater than, or equal to, the value in the VOWEL PASSED counter, the VOWELS USED counter is incremented by one, and a vowel is placed in the next match key position (blocks 372 and 374); otherwise, the next character is examined. The process is iterative until the sum of CONSONANT counter and VOWEL USED counter reaches an integer value, e.g., the value four (block 376) or the end of the last name is reached (block 364). When it does, a number of spaces corresponding to four less the CONSONANT count plus the VOWEL USED count is added in the next match key positions (block 378). The three least significant digits in the house number of the new record are placed in the next match key positions (block 380). The first character of the first name is then placed in the next match key position (block 382). The suffix of the person's name is examined to determine the next match key position (block 384). For example, a one, a two or a space is provided in the next match key position if the person named in the existing record is a junior (block 386), has the suffix III after his name (block 388), or has no suffix (block 390), respectively.

Figure 25:
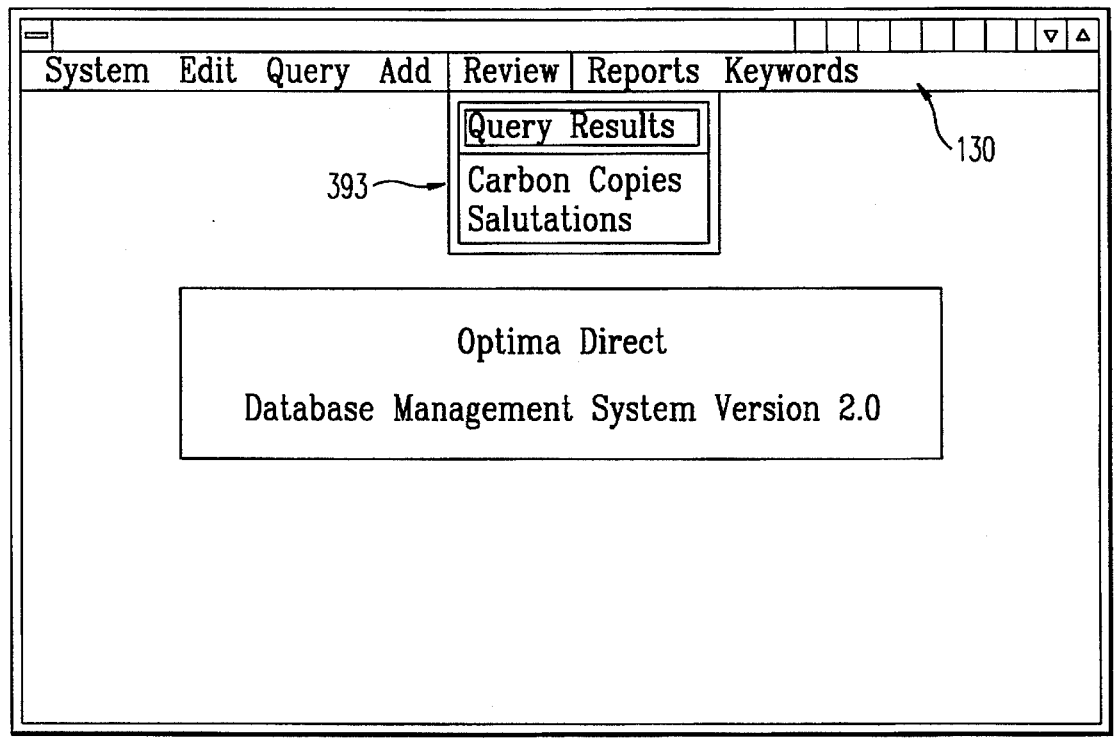
FIG. 25 depicts a review screen with a menu pop-up of review options, in accordance with a preferred embodiment of the present invention.
Figure 24:
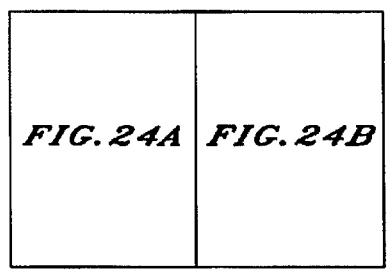
FIGS. 24A and 24B are a flow chart depicting the sequence of operations for reviewing records in the database in accordance with a preferred embodiment of the present invention.
Figure 24B:
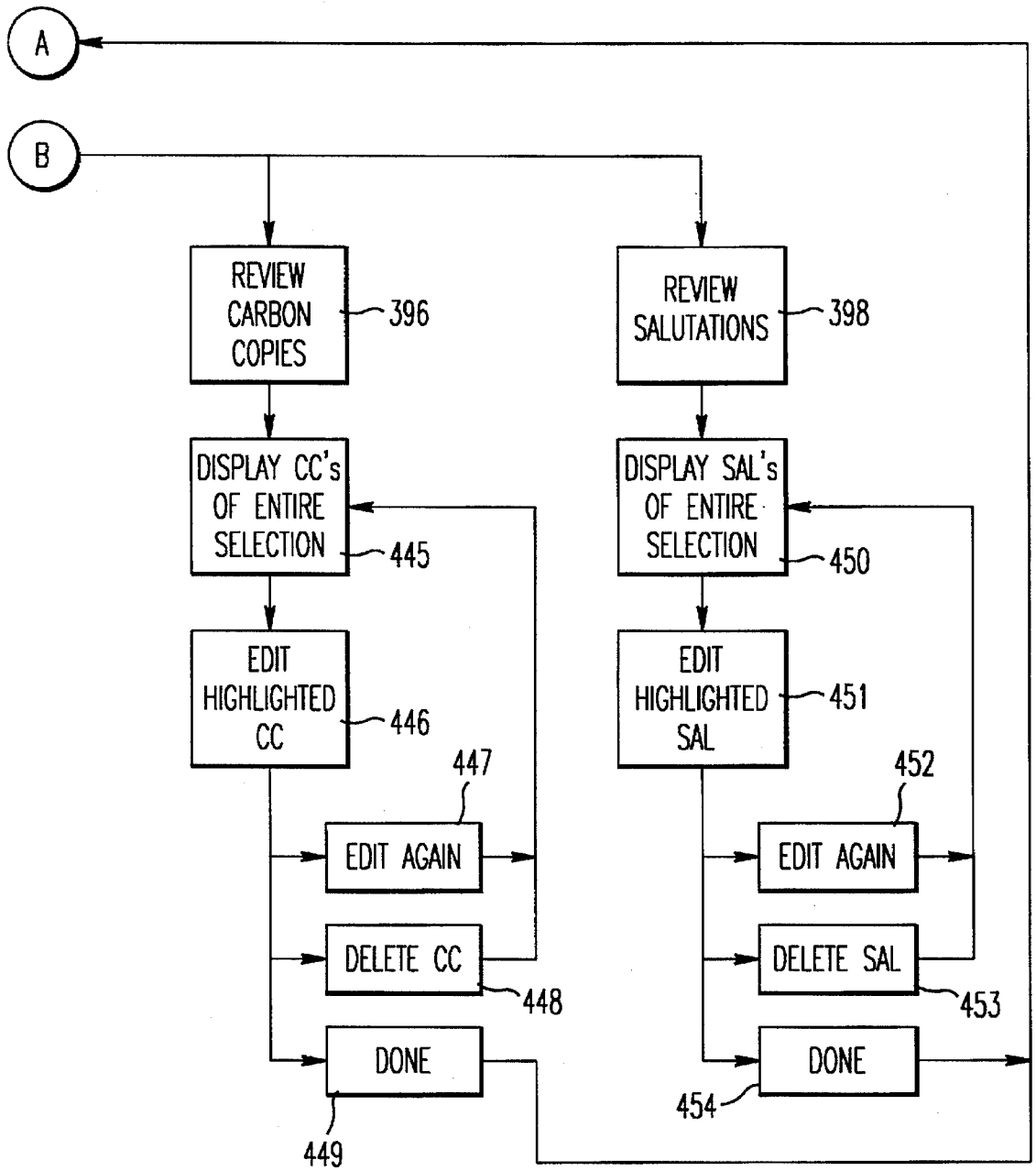
Figure 24A:
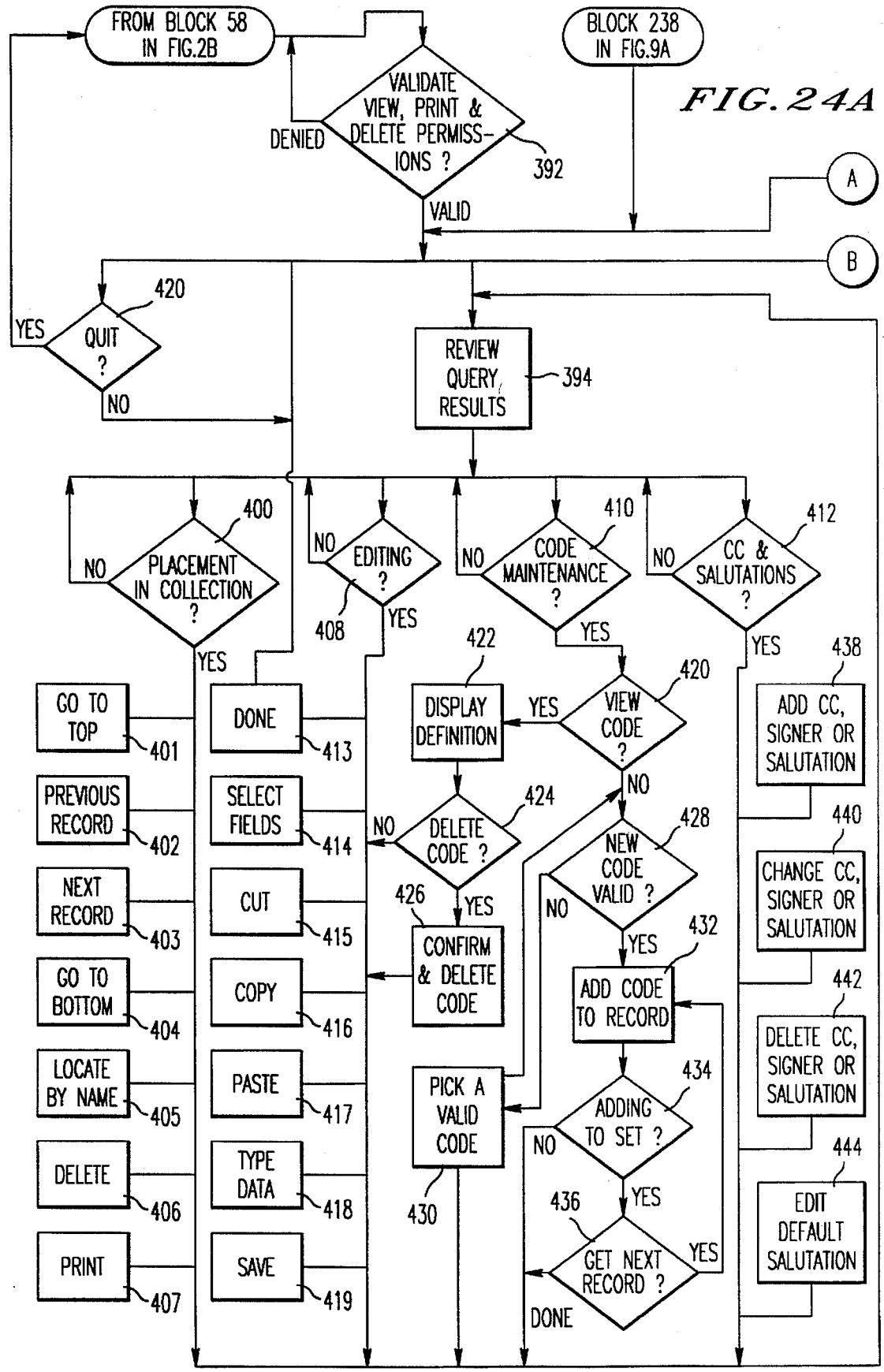

With reference to the flow chart in FIGS. 24A and 24B and FIG. 25, the user selects the Review option from the menu pad 130 when record editing is desired. For example, the user can retrieve records using the Query option from the menu pad 130 and then review and edit the retrieved records by selecting the Review option from the menu pad 130. The computer 12 is programmed to validate the user permissions (FIG. 6) to ensure the user is permitted to view, print and delete records (block 392). As shown in FIG. 25, a menu pop-up 393 corresponding to the Review option provides the user with further options comprising Query Results (block 394), Carbon Copies (block 396), and Salutations (block 398).

Figure 26:
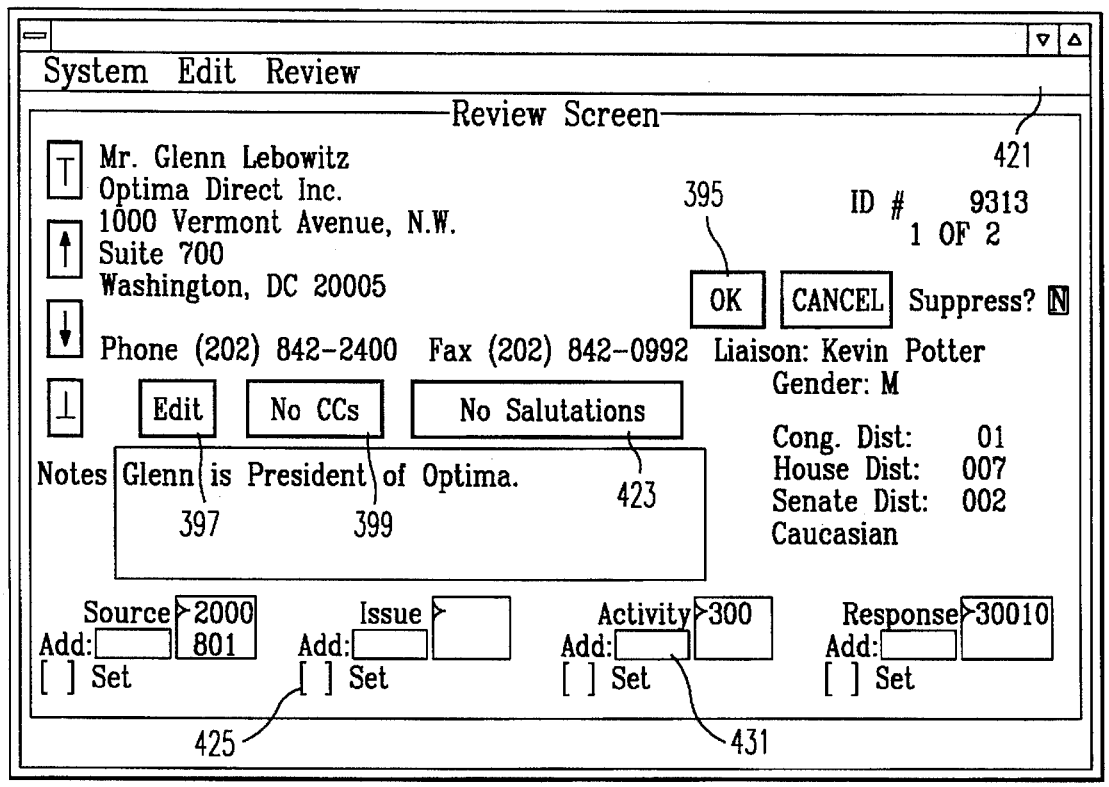
FIGS. 26 and 27 depict, respectively, a review screen and an edit screen, in accordance with a preferred embodiment of the present invention.

With reference to FIG. 26, the computer 12 generates a Review screen when the Query Results option is selected which allows the user to view a single record in a collection of records retrieved from the database as the result of a query (block 400). The screen initially comprises information corresponding to the first record in the collection. The user can view the remaining records in the collection by entering appropriate keys (e.g., Page Up, Page Down, and arrow keys) on a keyboard or clicking a mouse to go to the top (block 401) or bottom (block 404) of the list of records composing the collection, and to the previous and next records (blocks 402 and 403). The user can also jump to any one of the records by entering the name of the recipient (block 405). The user has the options of printing (block 407) or deleting (block 406) any of these records.

Figure 27:
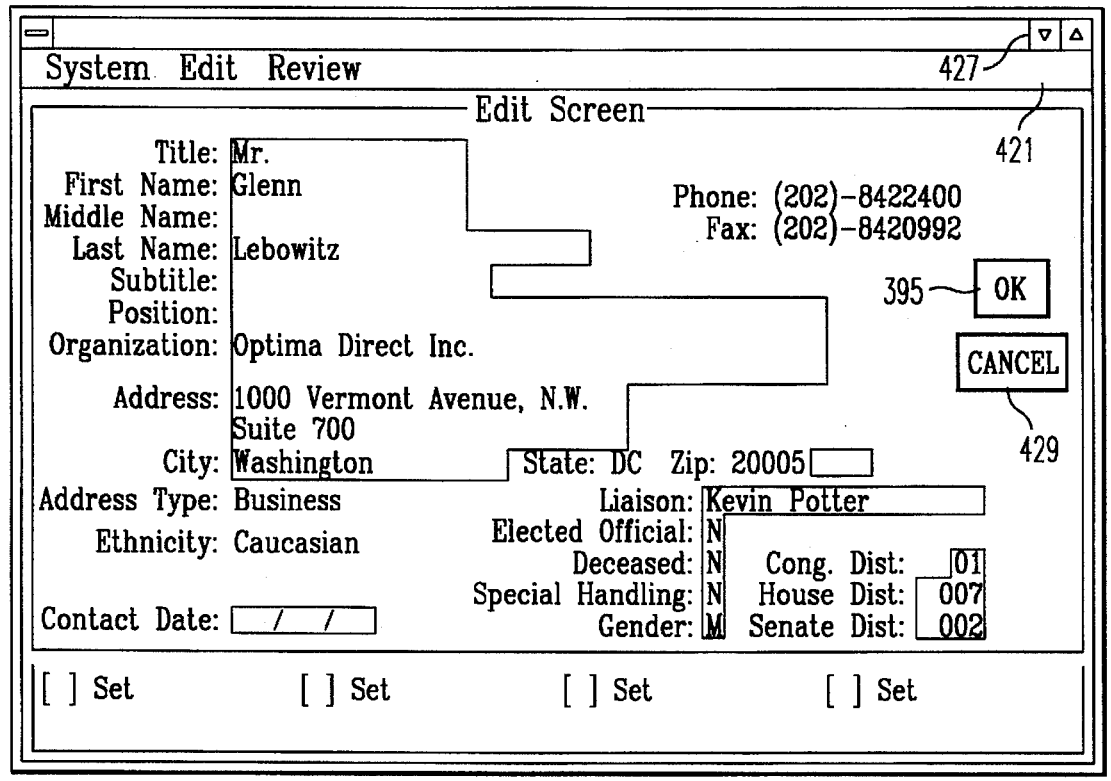

The Review screen comprises a button 397 labeled Edit for entering the Edit screen depicted in FIG. 27 (block 408). Buttons 399 and 423 are also available to enter into carbon copy and salutation editing screens (block 412), respectively, which are described below in connection with FIGS. 28 and 29. The Review screen also indicates the record ID number (e.g., 9313), whether or not the record has been suppressed (in this case, no), and various source, issue, activity and response codes. A note field of variable length is provided to enter additional information regarding, for example, the recipient or his or her organization. In addition, set buttons 425 are provided for adding a Source, Issue, Activity or Response code to each of a collection of records by simply entering an "x" within the brackets on the screen with the keyboard 15 and depressing the carriage return key (block 410).

The Edit screen (FIG. 27) comprises the contents of a record, that is, the title, the first, middle and last names of a potential communication recipient, the recipient's position, the organization to which the recipient belongs, address, telephone and facsimile numbers, and codes. In addition to personal information such as ethnicity, a record comprises a liaison field. The liaison field contains the name of a contact person within the same company or organization as the person listed in the name field. For example, this liaison person can field such questions as whether or not the named person will lobby for a particular issue. Other fields in the record include indices indicating whether the recipient is deceased, male or female, requires special handling or is an elected official.

In this example, the Edit screen contains the same record information as the Review screen on which the Edit button was depressed. Unlike the Review screen, however, the Edit screen permits the user to select (block 414) and type data into any one of the fields (block 418). The user can also cut, copy and paste selected fields from a record to another record (blocks 415, 416 and 417). Once the desired modifications are made to a record on the Edit screen, the "OK" button 395 can be activated using the keyboard or mouse to save the modified record in the database 14 (block 419). If the user enters changes to a record and subsequently decides not to keep them, the user can depress the "CANCEL" button 429, and the record remains unchanged in the database. When all of the desired modifications have been entered for the collection of records, the user can select "Review" from the menu pad 421 to return to the screen depicted in FIG. 25 (block 413).

With respect to decision block 410 of FIG. 24A, a user can modify the codes of a record using the Review screen depicted in FIG. 26. A user can review a code entered in the Source, Issue, Activity and Response fields by hitting the TAB key on the keypad until the number is highlighted and depressing the carriage return key, or by clicking a mouse (block 420). The computer 12 is programmed to generate an overlay screen on the Review screen which comprises the code, its definition, as will be described below in connection with FIG. 37, and a button for deleting the code (blocks 422 and 424). Thus, the user has the option of deleting the code from that particular code field (block 426). The user can add a code by typing a number into the add field 431 located to the left of each of the four code fields. The computer 12 is programmed to determine if the entered number is a valid code, that is, a code that has already been defined and stored in a database file containing code information, which is described in further detail below in connection with FIGS. 37-42. For example, if the user wishes to add the valid source code 2000 to the source code field, the user would type the number 2000 into the add field corresponding to the source code field and hit the carriage return on a keyboard. Since the code 2000 is a valid one, the code is 10 shown in the source code field in response to depressing the carriage return key (block 432). If the entered number is determined by the computer to be an invalid code, that is, a source code not yet defined, the computer operates a screen which allows the user to select a valid code (blocks 428 and 430). As stated previously, the set button 425 corresponding to the code field in which a code has been added can be depressed to automatically add the code to each of the records within the collection of records (blocks 434 and 436).

Figure 28:
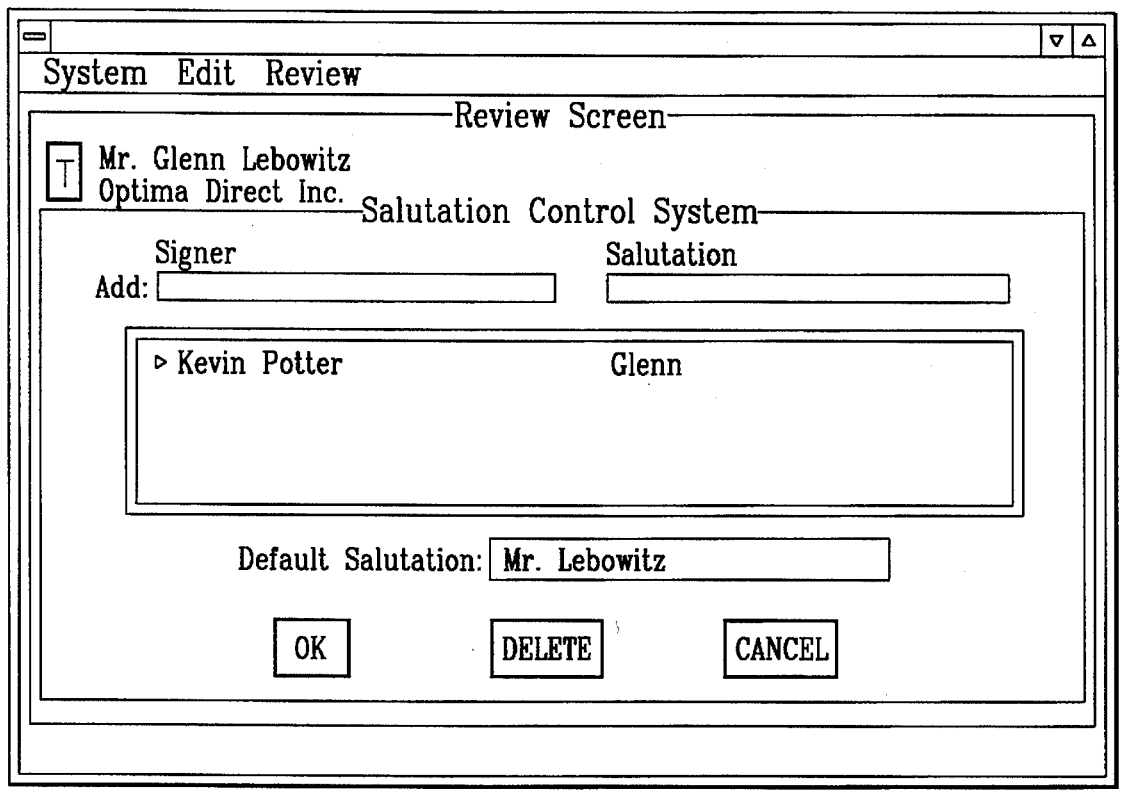
FIGS. 28 and 29 depict, respectively, salutation and carbon copy control screens, in accordance with a preferred embodiment of the present invention.

If the Salutation edit button 423 is depressed on the Review screen, a Salutation Control System screen is generated by the computer, as indicated in FIG. 28. The pop-up screen permits the user to add, change or delete the name of a signer of a communication to the recipient listed in the record and a personal salutation (blocks 438, 440 and 442). The screen also indicates for editing purposes (block 444) which default salutation has been automatically entered into the corresponding field based on the title, last name and subtitle fields of the record. Similarly, a Carbon Copy Control system screen (FIG. 29) is generated if the Carbon Copy button 399 is selected while from the Review screen. The carbon copy control system permits a user to modify a list of names for which copies of any communication to the recipient listed in the record will be generated. Once the information has been modified within the record and carbon copy and salutation fields have been modified, the record is stored in the database 14.

Figure 29:
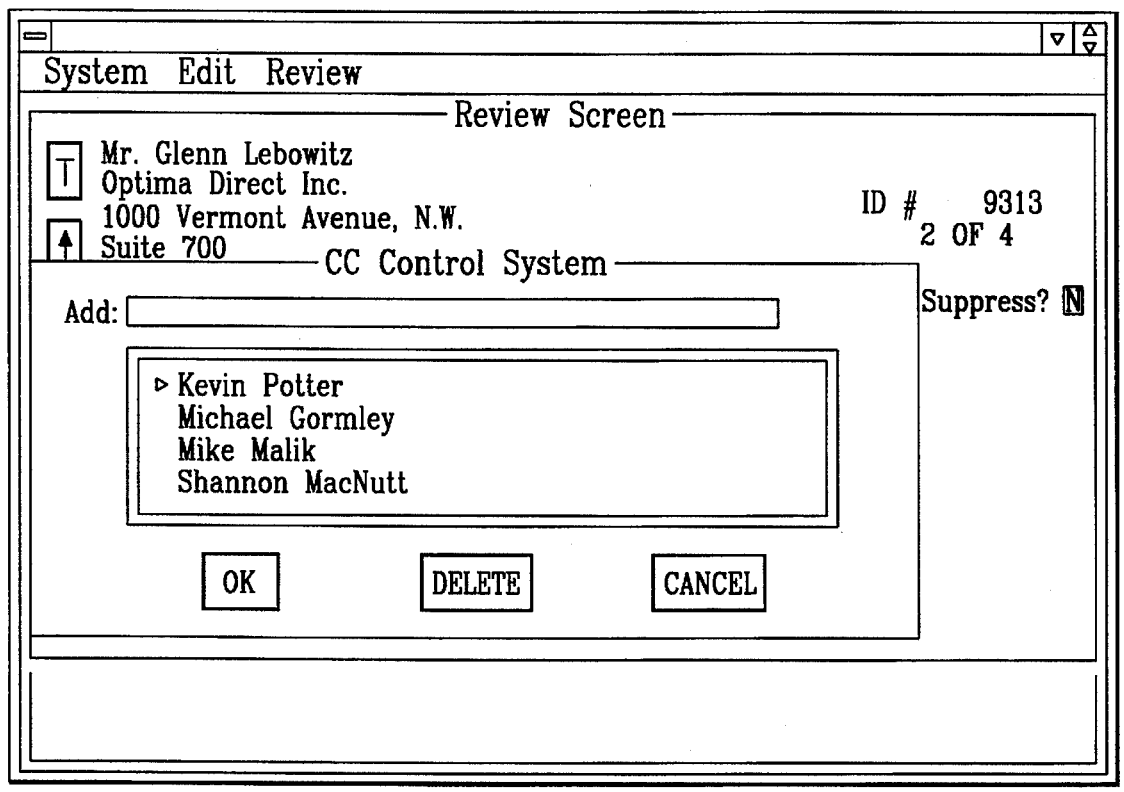

With reference to blocks 396 and 398 of FIG. 24A, the computer is programmed to generate a list of carbon copy recipients and personal salutations, respectively, for an entire collection of records retrieved as the result of a query unlike the overlay screens in FIGS. 28 and 29, which provide salutation and carbon copy information, respectively, for only that particular record. Accordingly, a user can highlight and edit, add or delete the names of carbon copy recipients for the entire collection of records (blocks 445, 446, 447, 448 and 449). Similarly, the user can review and edit all of the salutations used for a collection of records (blocks 450, 451, 452, 453 and 454). This function (block 398) is particularly useful in situations where, for example, the user does not wish to use any familiar or personal salutations for a mass mailing. The user can specify that formal default salutations be used for all of the records without having to review each record individually to change to the default salutation.

Figure 30:
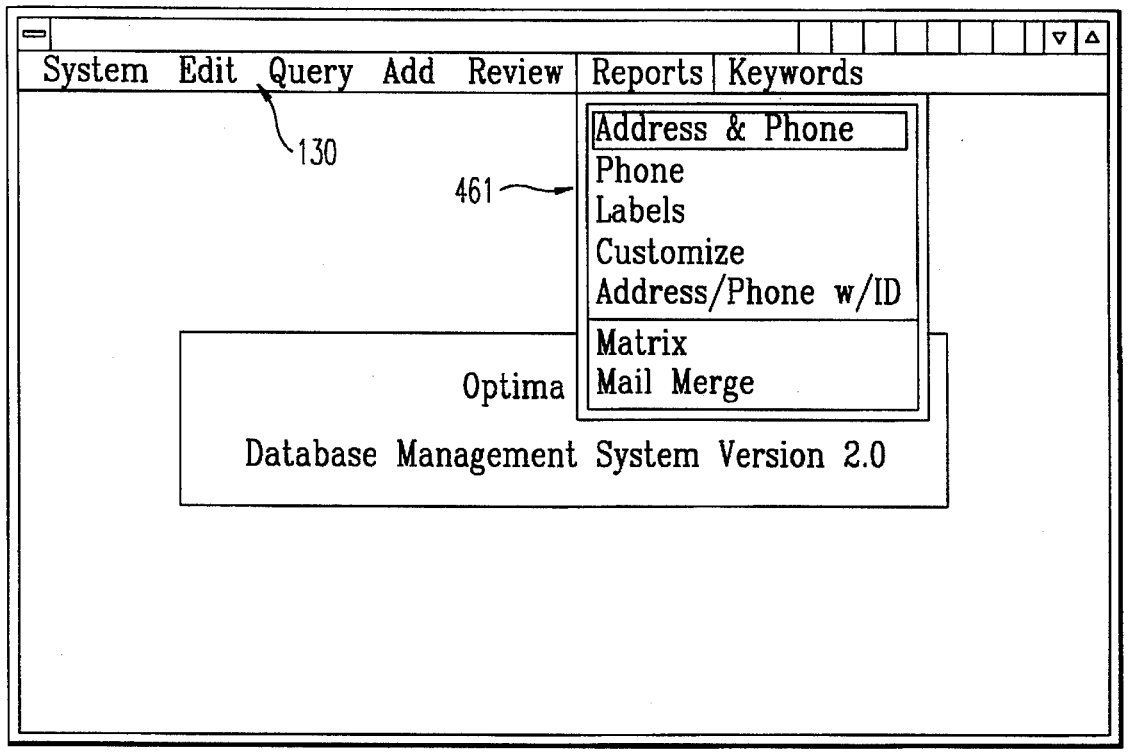
FIG. 30 depicts a reports screen with a menu pop-up illustrating reports options, in accordance with a preferred embodiment of the present invention.

If the user selects the Reports option from the menu pad 130, a menu pop-up 361 is generated by the computer 12 as shown in FIG. 30. The menu pop-up 361 provides the user with a number of options for generating different types of reports, as well as matrix and mail merge options, which are described in further detail below in connection with FIGS. 42 and FIGS. 34A(1), 34A(2), 34B(1) and 34B(2) respectively. If the Address and Phone option is selected, the address, telephone numbers and names in records retrieved, for example, as a result of a query, are printed. A user can also elect to have the name and telephone number, or the name and address, or the address, telephone number and record ID from retrieved records printed by selecting the Phone, Labels and Address/Phone with ID options, respectively.

Figure 31:
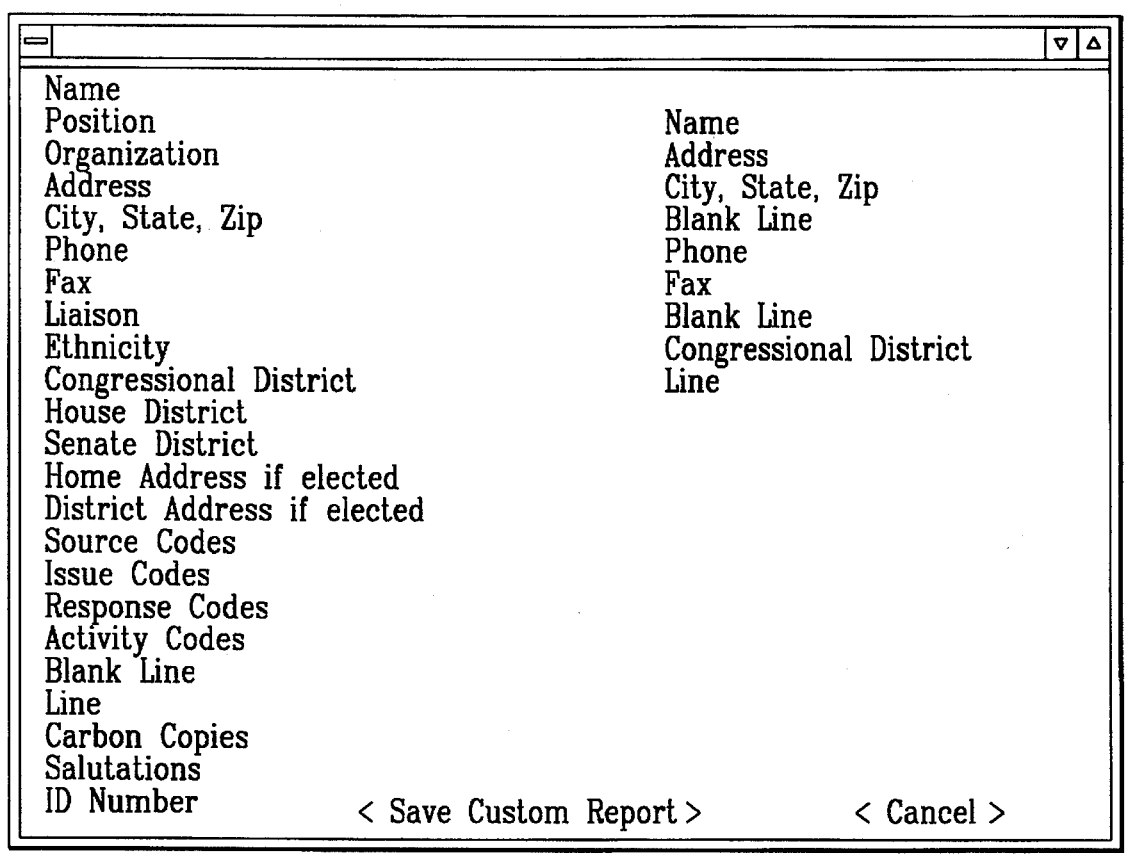
FIG. 31 depicts a screen listing record fields, of which one or more can be selected for generating a custom report, in accordance with a preferred embodiment of the present invention.
Figure 33B:
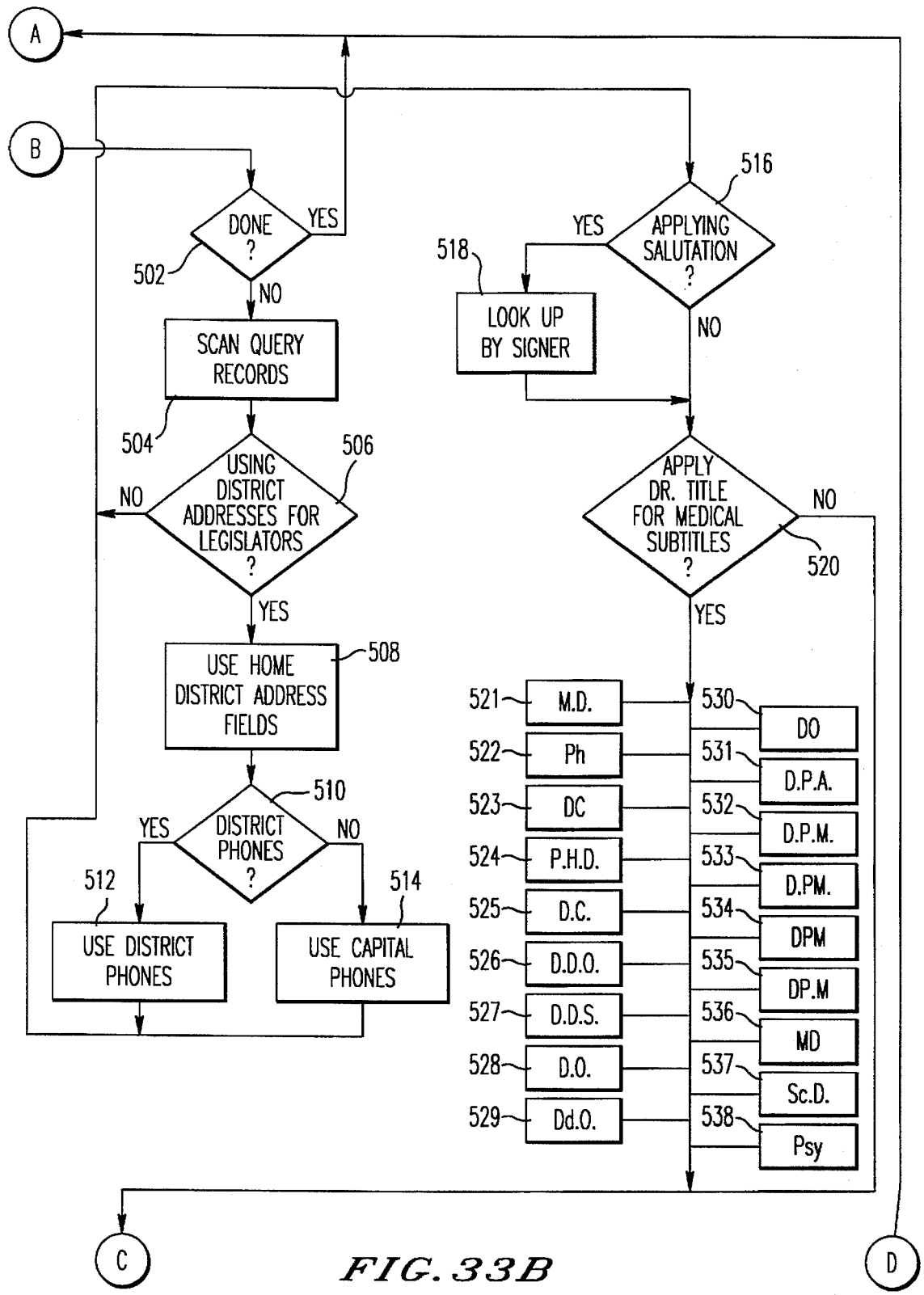
Figure 33C:
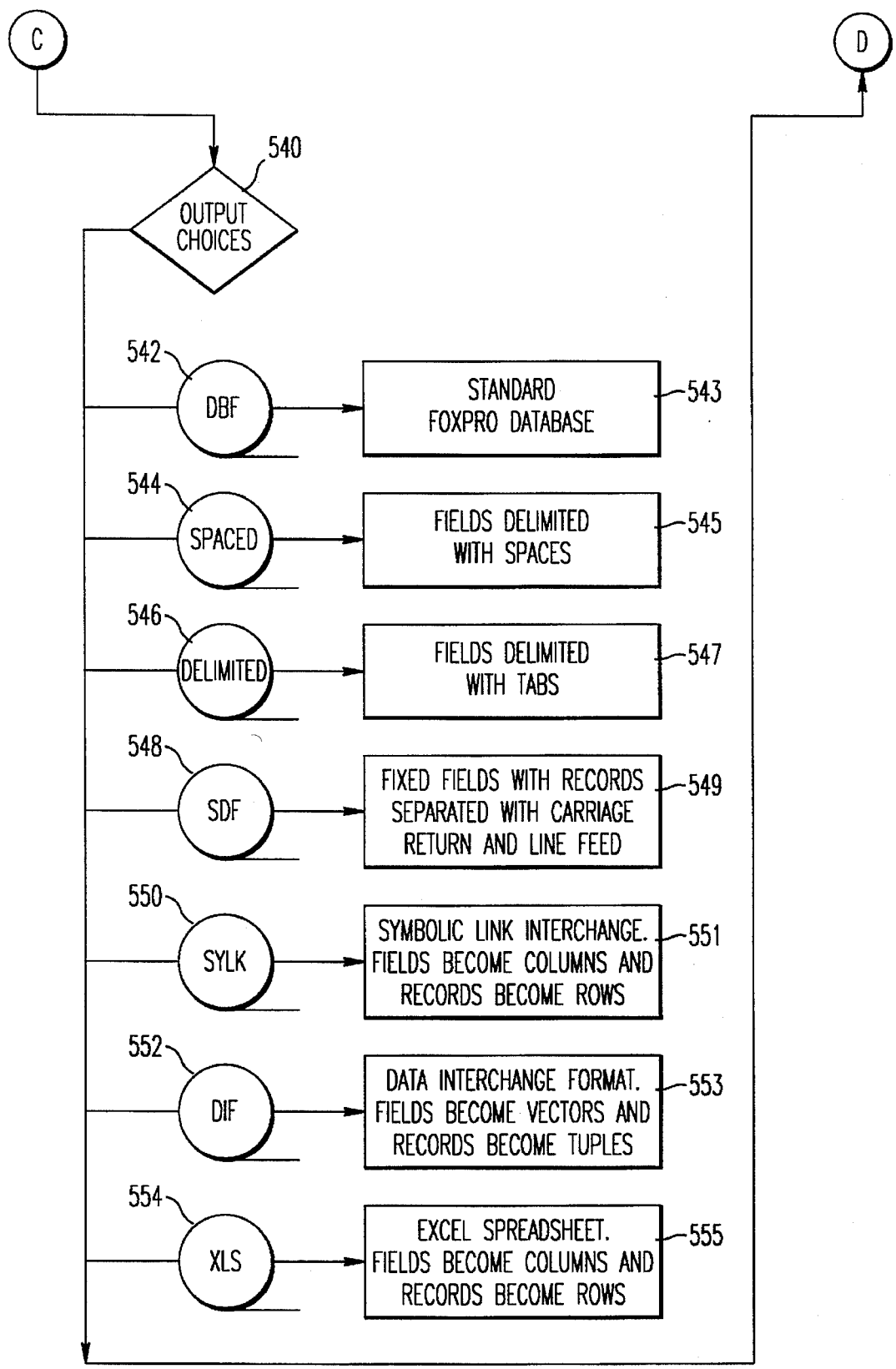

With reference to FIG. 31, customized reports can be created using any combination of fields. The user highlights the desired fields listed in the left-hand column. The selected fields are shown in the right-hand column to ensure accuracy. With reference to FIGS. 33A, 33B and 33C, the user can configure the report and sort the information therein using a variety of options. For example, the user 10 can enter a report title in the title field, and specify the order in which selected information is to be printed in the report. As shown in FIG. 32 and the exemplary report entitled "Colleges" in Appendix A, the name of a recipient, his or her position, the name of the college and the address and telephone information is printed in the order indicated. The user can also specify an output destination, i.e., a printer, a file in a memory device or a display screen. The user also has the option of printing out primary or secondary addresses or both.

In addition to generating various types of reports using, for example, the Reports options listed in menu pop-up 461 in FIG. 30, a user can export data from the database 14 to another data processing device via a modem or to one or more facsimile machines via a fax server 26. In accordance with one embodiment of the invention, the user must be a system administrator to export data from the database 14 (block 70 in FIG. 2). In accordance with an alternative embodiment of the present invention, user permissions in the account control system (FIG. 6) can be modified to allow other types of users to export data from the database.

With reference to block 464 of FIG. 33A, the system administrator enters a target file name corresponding to the database file into which data from various record fields is to be stored. The administrator also enters any desired mail codes, that is, source, issue, activity and/or response codes which are appended to the exported data records for reconciliation purposes. For example, fields exported from a particular record can include a particular type of activity code. Thus, if the data is used for a mass mailing requesting recipients to attend a particular meeting, response mail indicating that a recipient actually attended the meeting can be more readily appended to the existing record for that recipient.

With continued reference to FIG. 33A, the system administrator selects fields to be exported from a collection of records, as indicated in block 466. The fields are preferably as follows: a salutation and a signer name (block 467 and 468); a record ID (block 469); a special handling code (block 470) to indicate, for example, that the recipient is hostile; a suppression code (block 471); a liaison name (block 472); a recipient's title (block 473); a recipient's first, middle and last names (blocks 474, 475 and 476); a recipient's subtitle (block 478); a recipients's position (block 479) within an organization and the organization name and address (blocks 480 and 482); a second organization name and address (blocks 481 and 483); an address type code (block 471)

indicating, for example, home, office or district address; a recipient's city, state, zip code and four digit zip code extension (blocks 484, 485, 500 and 499); a recipient's telephone and facsimile numbers (blocks 498, 497, 496 and 495); codes indicating ethnicity (block 489), whether or not a recipient is an elected official code (block 488), gender (block 494), and whether a recipient is deceased (block 490); a match key (block 487); legislative districting codes (blocks 492, 493 and 477); and finally a default salutation (block 486).

Once the fields to be exported from data records are selected (block 502), query records are scanned (block 504). If the export data relates to legislators, the system administrator can select to use the legislator's home district address as opposed to his or her capital address (blocks 506 and 508). Similarly, the system administrator can elect to export the legislator's home district telephone number as opposed to a capital telephone number (blocks 510, 512 and 514).

If a salutation is needed, the computer 12 is programmed to look up a personal salutation on the basis of a signer's name which has been selected by the system administrator from among a list of signers and their corresponding personal salutations contained in the database (blocks 516 and 518). If the recipient's subtitle indicates that the recipient is a doctor, the computer 12 is programmed to generate a salutation containing "Doctor", as indicated in blocks 521–538.

With reference to block 540 of FIG. 33C, the computer 12 is programmed to provide the selected data to a modem 34 via, for example, a remote application server 32 in one of a number of different formats. For example, the system administrator has the option of exporting data formatted for a standard FoxPro database (blocks 542 and 543). Data can also be exported in a spaced format (blocks 544 and 545) in which record fields are delimited with spaces, or in a delimited format (blocks 546 and 547) in which the record fields are delimited with tabs. Other export formats include fixed fields with records being separated by a carriage return and line feed (blocks 548 and 549), symbolic link interchange (blocks 550 and 551), in which fields become columns and records become rows, data interchange formats (blocks 542 and 543) in which fields become vectors and records become tuples, and an excel spread sheet format (blocks 554 and 555) in which fields become columns and records become rows.

The Mail Merge option in the menu pop-up of FIG. 30 will now be described with reference to FIGS. 34A(1), 34A(2), 34B(1) and 34B(2) and 35. The Mail Merge process involves providing data from records, which were retrieved from the database using a query (block 558), to an external word processing system for generating mass mailing letters, for example, and corresponding copies for carbon copy recipients. These letters can then be printed for mailing or transmitted via broadcast facsimile. Once a user name and password have been validated, the microprocessor is programmed to determine if that user is permitted to generate and print database output (block 560). The validation of user permissions, as stated previously, is accomplished by reviewing the various permissions listed in an account file created when an account was set up for that particular user. For example, the Account Control System screen in FIG. 6 illustrates that the user, Holly, is able to print reports.

With continued reference to FIGS. 34A(1), 34A(2), 34B (1) and 34B(2), the mail merge process will be explained using an exemplary communication, e.g., a letter, which is to be sent to each of a number of recipients whose records were retrieved from the database as a result of the query. With reference to the letter in Appendix A, the letter comprises recipient name and address information, a salutation, a signer name and the names of carbon copy recipients. All of this information is generated automatically using database records. This data is combined with two paragraphs of text during the mail merge process to create a letter to each of the recipients, to generate copies of the letter for each of the listed carbon copy recipients, to create a salutation corresponding to the signer, and to suppress the creation of a carbon copy for the signer if the signer was listed in the record as a carbon copy recipient. As shown in block 562, a user enters the signer's name and the name of a merge list output file. With reference to the decision block 564, the user has the option of scanning query results to obtain the list of recipients or quitting.

If the user elects to scan query results, the computer proceeds to examine the first record of a number of records retrieved as a result of a query. If the first record 10 contains information indicating that the named recipient is dead or that the record is suppressed (block 516), the computer proceeds to examine the next record. A record that has not been suppressed or directed to a dead recipient is subsequently formatted to embed field codes in memory (block 568). For example, the computer generates the first line of text "Mr. Glenn Lebowitz" by retrieving the title "Mr." (block 570), storing it in memory and then adding a space followed by a delimiter to denote that the title field is complete. The delimiter is a non-printable character to signify to the word processing system when a field is complete. The computer then retrieves the first name (block 572) and stores this so as to be printed directly after the title field and its corresponding space. The computer follows the first name with a space and another delimiter. The computer similarly retrieves the last name "Lebowitz" (block 576) and optionally a middle initial (block 574) and ends the line with a code for a carriage return. Thus, the first line of text is stored in memory with the proper field codes (e.g., Mr. [SPACE] [DELIMITER] first name [SPACE] [DELIMITER] last name [CARRIAGE RETURN]). If the recipient has a subtitle (block 578), the computer places this before the carriage return. The computer proceeds to generate the second line indicating position (block 580), the third line indicating organization (block 582), the third and fourth lines indicating the street address (block 584), and the fifth lines indicating the city, state and zip code, (blocks 586, 588 and 590) in a similar manner, that is, by storing the data associated with a particular field followed by a space or delimiter or carriage return, as needed. Further, the user can opt to have the facsimile number field data formatted in the address and coded (block 592).

The computer is programmed to generate the seventh line of text, e.g., the salutation "Dear Glenn:". The computer stores the word "Dear" and a space in memory. The computer then retrieves the proper salutation "Glenn" depending upon who is the signer, e.g., Kevin Potter. The Salutation Control screen described above indicates that Kevin Potter wishes to address his letters to Mr. Lebowitz using Mr. Lebowitz's first name "Glenn" (blocks 594 and 595). If the signer did not have a personal salutation, as would be indicated in the Salutation Control screen for that particular record, the computer searches to see if a default salutation has been entered for this particular record (blocks 596 and 597). If no default salutation is entered, the computer examines the record to determine if the recipient, Mr. Lebowitz, is a doctor (blocks 598 and 599) or has a particular title such as "Congressman" (blocks 600 and 601). If there is no such subtitle or title, the computer determines the gender of the recipient by looking at the gender field (block 602). If the recipient is a woman, the salutation line of the letter begins with "Ms." (block 604). Alternatively, the first line will begin with "Mr." (block 606). The "Ms." or "Mr." in the salutation line is then followed by the first name and last name of the recipient (block 608).

The computer is then programmed to look to the carbon copy control screen for that particular record to determine the number of carbon copy recipients (block 610). If the carbon copy recipient list contains the signer's name, the signer's name is suppressed from the carbon copy list (block 612). If the carbon copy recipient is not the author of the letter, the carbon copy field is then embedded with field codes as described above (block 614). For example, the computer will tell the word processing system that after the text of the letter, and particularly the name of the author of the letter, the word processing system is to print "cc:", a [TAB], the name of the first carbon copy recipient, Michael Gormley, and then a carriage return. The computer is programmed to formulate the second and third carbon copy recipient lines in a similar fashion, that is, a tab and then the name of the second carbon copy recipient, Mike Malick, and then a carriage return.

Once the carbon copy recipients have been encoded in memory, the field codes stored in memory (block 614) are output to disk storage (blocks 616 and 618). This process is iterated until a disk storage record is generated for the recipient and each carbon copy recipient appearing on the letter. The next record for the next letter recipient is subsequently scanned (block 564).

If no other query results are scanned, the user is given the option to commence outputting the data (block 620). To output data, the computer is programmed to provide an external data processing system such as a personal computer with Word Perfect software with programmed code or instructions to receive imported merge data files and text or graphics files (blocks 622, 624 and 626). The computer 12 is programmed to also provide instructions for an external data processing system to compose the text of, for example, a letter in a separate file. The word processing system is subsequently instructed to begin selecting the fields which were embedded with field codes and to begin arranging them with spaces and carriage returns as described above (blocks 628 through 642). The word processing system merges the field data with the text of a letter (block 644) in order to send the same letter to a number of different recipients whose records were scanned in block 564.

Once the letters are generated with the mergeable data, i.e., the name and addresses of the recipients, as well as the signer and carbon copy recipients (block 646), 10 the word processing system is instructed by the computer 12 to send the letter to the fax server 26 (block 648) or to one or more of the printers 24 (block 650). If a letter is being sent to a number of recipients via a broadcast facsimile process, the word processing system is instructed by the computer 12 to continue merging the mail mergeable data with the letter text (block 652) in an iterative process until all the records have been merged with the letter text. The computer 12 instructs the word processing system to parse the facsimile numbers contained in each of the retrieved records and to format commands for the fax server 26 (block 654). Each of the facsimile letters is then queued for broadcast transmission (block 656).

In accordance with an embodiment of the invention, the Query option in the menu 130 is enhanced by the use of keywords. Keywords can be assigned to a single record or to a set of records. Keywords and their corresponding codes are created and maintained in the database using the Keywords option in the menu pad 130. Once codes are defined, they can be added to the bottom of each new record, as shown above in FIG. 18. Thus, when a query is formulated using a particular code, that new record will be retrieved, along with other records having the same code.

Figure 36:
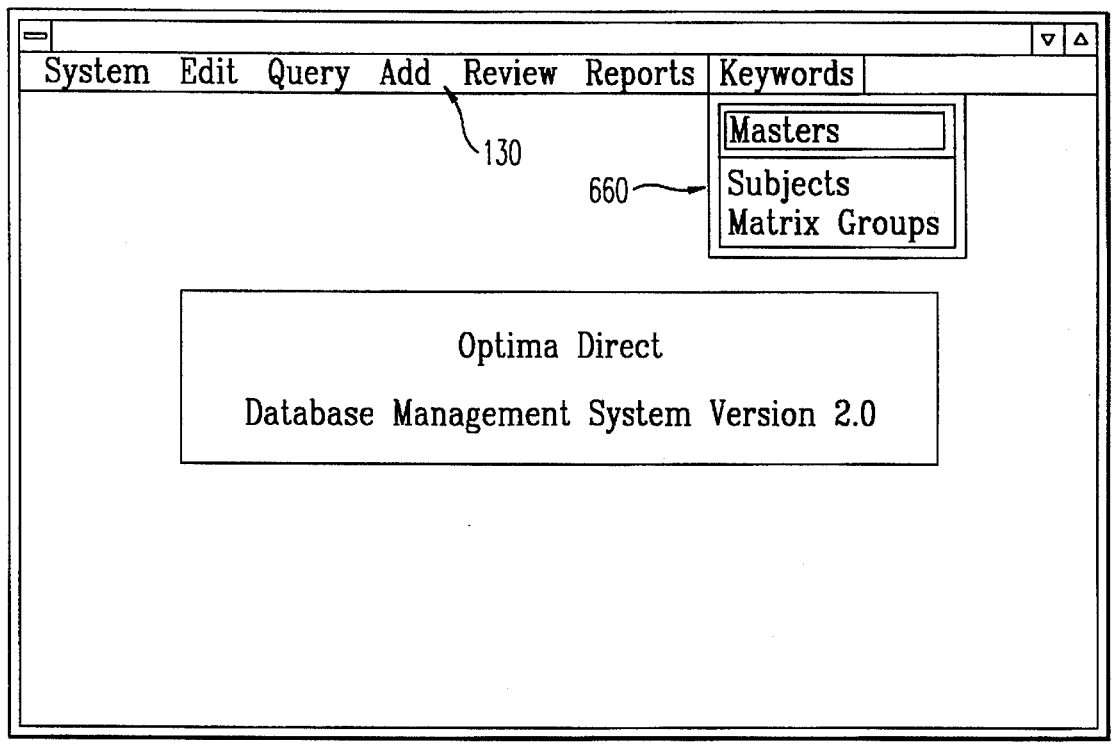
FIG. 36 depicts a keywords menu screen with a menu pop-up listing keywords options, in accordance with a preferred embodiment of the present invention.
Figure 37:
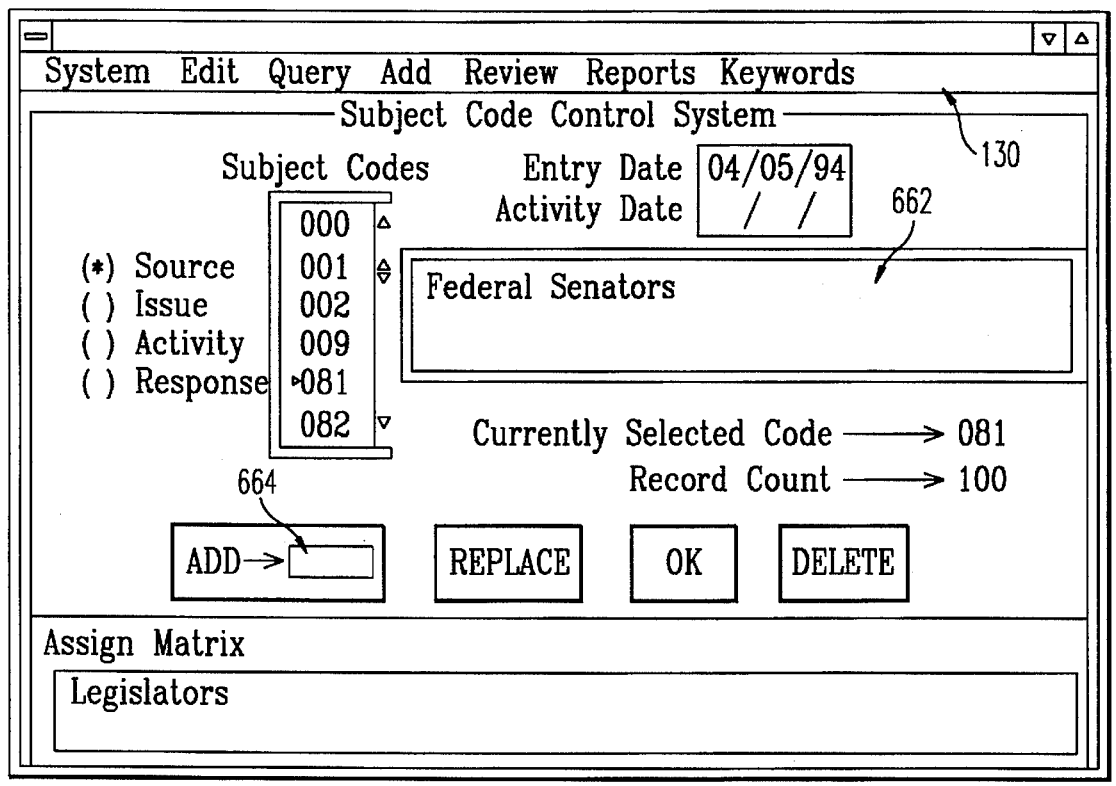
FIG. 37 depicts a subject code control screen, in accordance with a preferred embodiment of the present invention.

With reference to the screen depicted in FIG. 36, the computer prompts the user to select from Master Keywords, Subject Keywords and Matrix Groups from a menu pop-up 660. With reference to FIG. 37, the subject keywords organize lists of codes by source, issue, activity and response. For example, the subject keywords "Federal Senators" is assigned to the subject source code 081. Other source codes include 001, 002, 003 and 082. The entry date for the new subject code 081 is shown, along with the number of records, e.g., 100, in which the recipient listed in the name field is a federal Senator. The subject code control screen in FIG. 37 allows the user to scroll through the existing subject codes listed in the menu pop-up 661 to find an available code which can be added using the menu pop-up 664. Currently used subject codes can be replaced, i.e., given a new subject keyword definition, or deleted. As indicated at the bottom of the screen in FIG. 37, a subject code can be defined as part of a larger group of codes given a matrix name, e.g., legislators. Matrix headings are described in further detail below.

Figure 38:
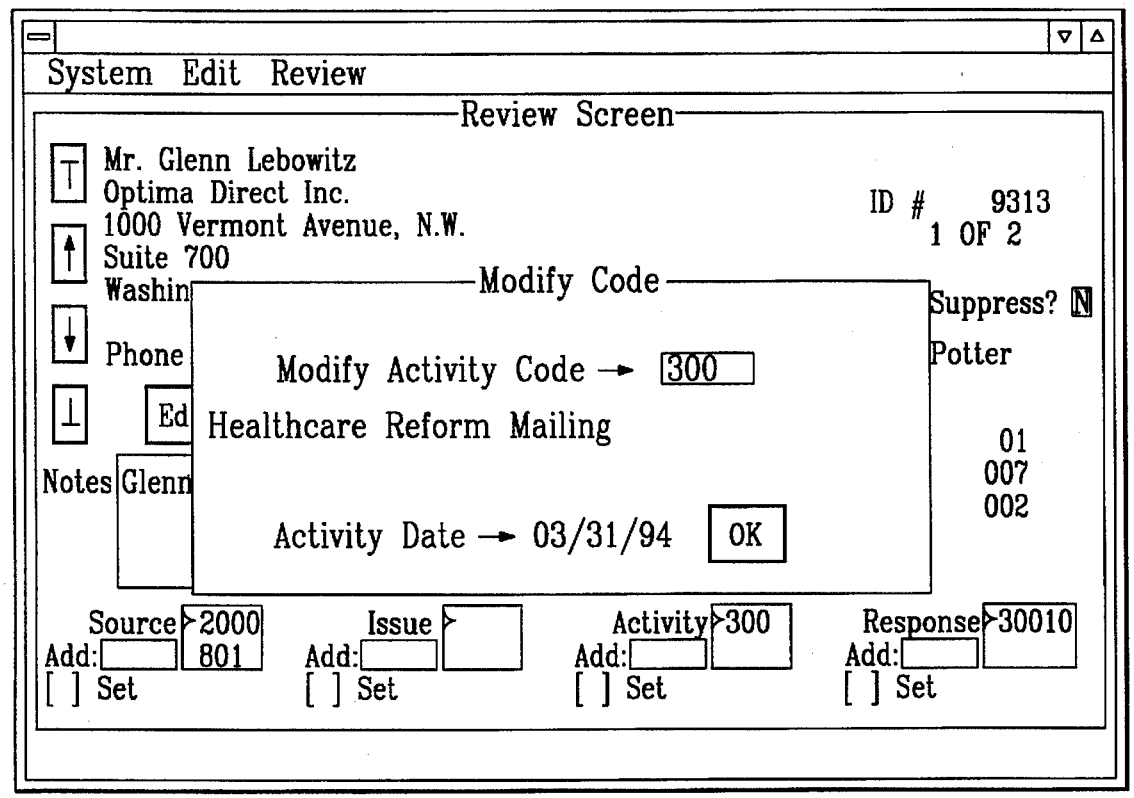
FIG. 38 depicts a screen for modifying codes, in accordance with a preferred embodiment of the present invention.

With continued reference to the keyword maintenance option on menu pad 130, activity codes can be modified to change the type of action taken on a group of individuals, as well as the date of activity, as shown in FIG. 38. For example, an activity code 300 can be defined to represent a mailing to recipients involved in health care reform. Once created, the activity date of the mailing code 300 can be changed as needed. As shown in FIG. 38, response codes can be set up to indicate that the recipient of the health care reform mailing contacted his or her representative as requested. For example, the numeral ten (10) can be attached to the activity code 300 to formulate a response code which reveals that the recipient has contacted his or her representative by telephone in response to the health care reform mailing. Another response code, e.g., 30015, can be defined to indicate that the recipient had a meeting with his or her representative. Responses to various activities are generally reported to the user and input into the response button on the Review screen (FIG. 27) of the responding recipient's record. This information is useful at a later time to identify those recipients who have acted as requested.

Figure 39:
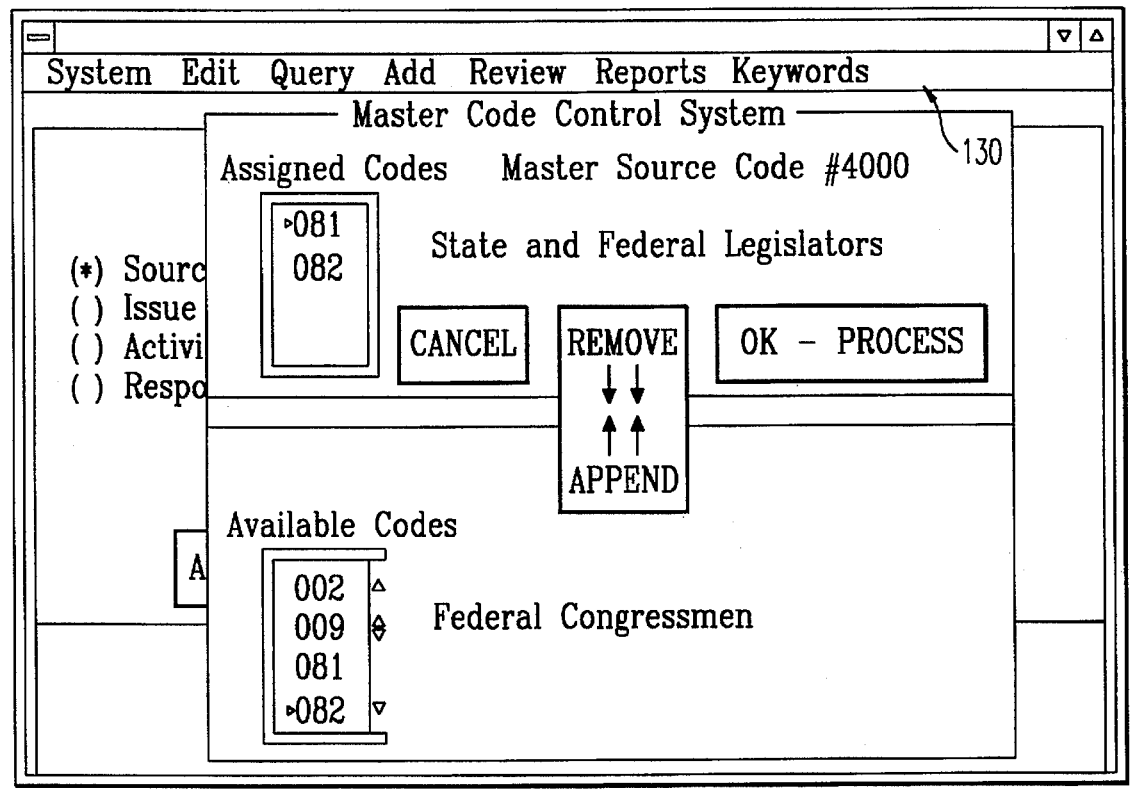
FIG. 39 depicts a master code control screen, in accordance with a preferred embodiment of the present invention.
Figure 40:
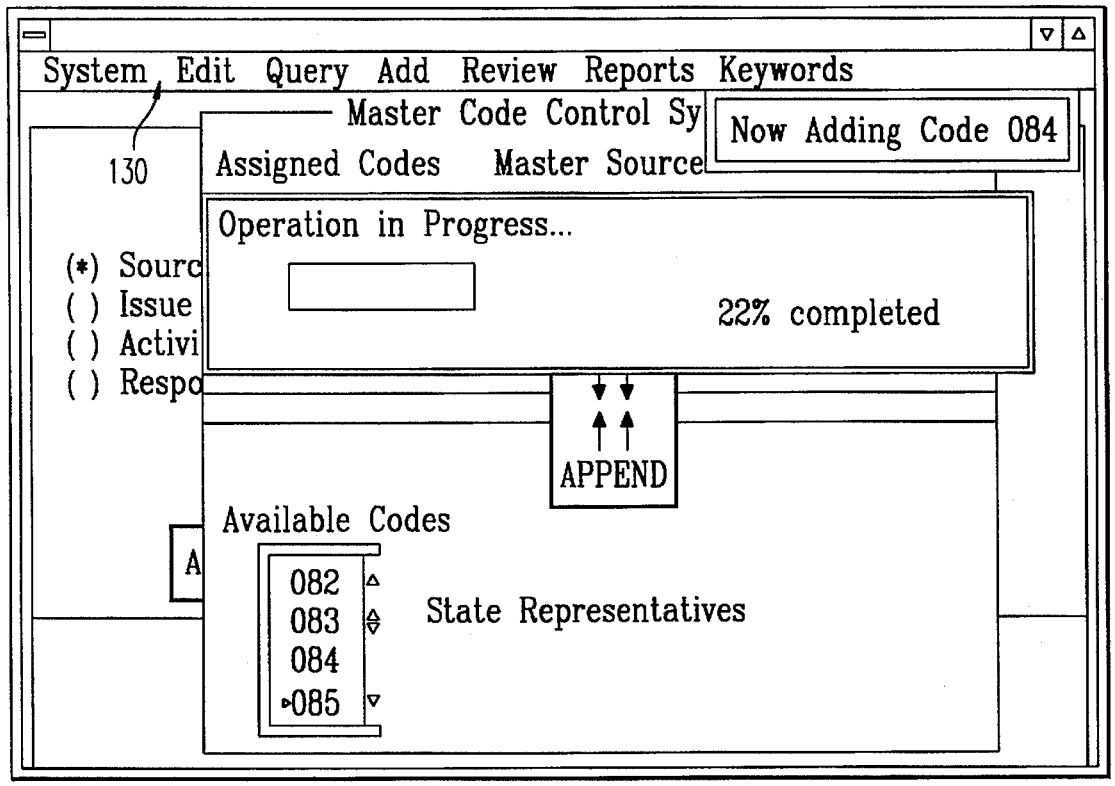
FIG. 40 depicts a status screen overlaid on the master code control screen of FIG. 39, in accordance with a preferred embodiment of the present invention.

With reference to FIG. 39, master keywords and codes can be used to define groups of lists. For example, a master code 4000 can be defined to represent state and federal legislators. As shown in the master code control screen shown in FIG. 39, source codes 081 and 082 have been combined under the master source code 4000. In addition to appending codes, the available codes being shown in the menu pop-up at the bottom of the control screen, codes can also be removed. When the "OK" process button has been selected, the master source code list in the database is modified in accordance with the Remove and Append commands of the user. For example, the code 084 representing records listing state representatives is shown in FIG. 40 being appended to the master source code 4000.

Figure 41:
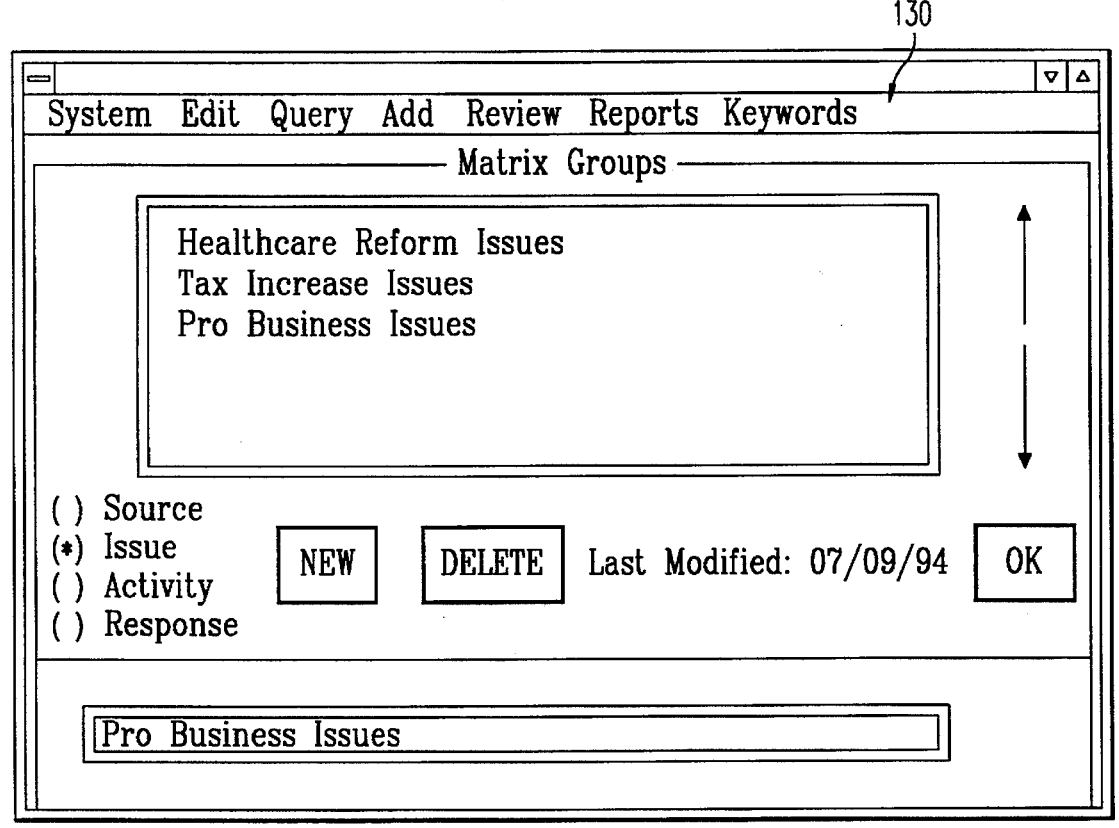
FIG. 41 depicts a matrix groups screen, in accordance with a preferred embodiment of the present invention.

The computer is programmed to generate the screen shown in FIG. 41 in response to a user selecting the Matrix Groups option from the keywords maintenance pop-up 660. Groups of related subject and master keywords can be assigned a matrix name. For example, issue codes corresponding to health care reform, tax increase and pro-business issues, each of which can be assigned under various master keywords, can be given a matrix group name such as "Pro-Business Issues". Matrix groupings are useful to identify a target group of individuals prior to a communication such as a mass mailing. The matrix group is organized by codes and reveals the number of potential communication recipients listed in each of the codes grouped within the matrix. Thus, concentrations of recipients such as those concerned with the particular issue can be identified within the matrix group.

Figure 42:
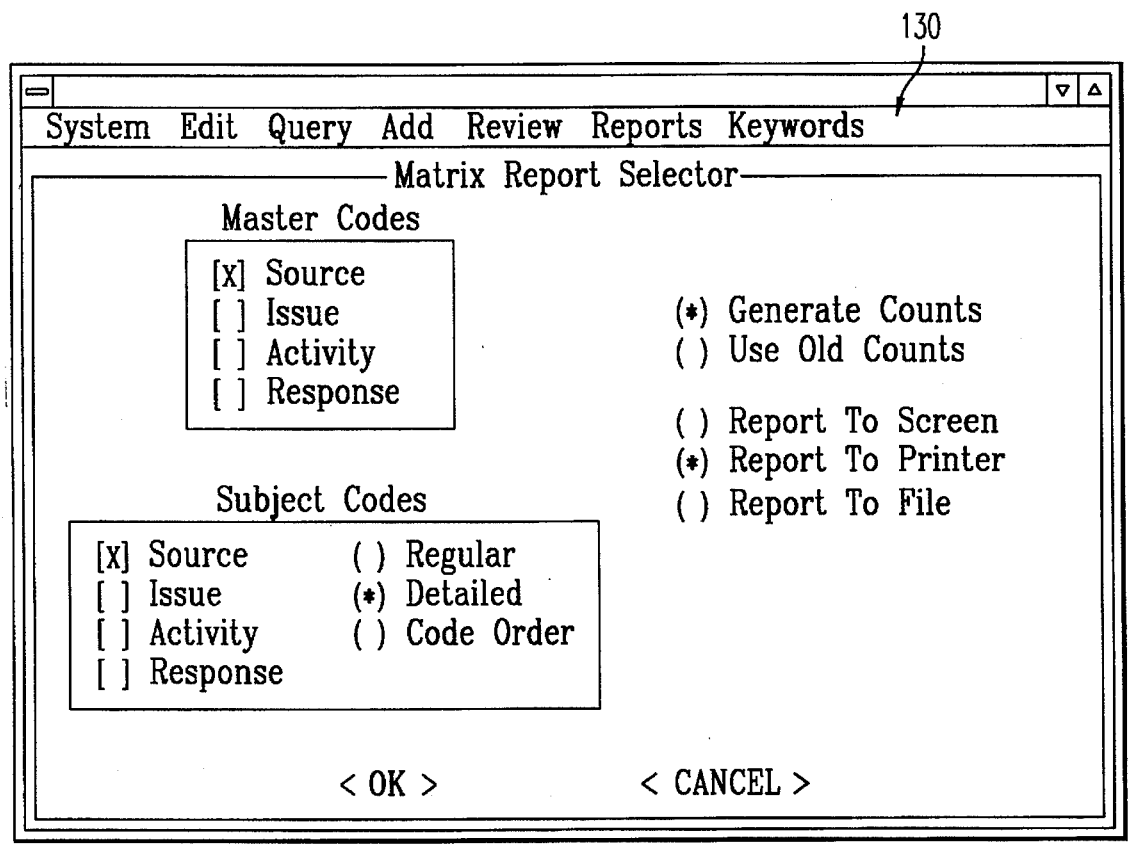
FIG. 42 depicts a matrix report selection screen, in accordance with a preferred embodiment of the present invention.

In addition to assigning matrix group headings, a user can create a disk file or generate a matrix report to appear on the screen or be printed by selecting a particular master code and subject code (FIG. 42). The number of counts in each of these codes is visually reproduced. Appendix C is an exemplary subject code matrix listing source codes and their definitions. Exemplary subject code matrices are also provided for issue, activity and response codes. The computer is programmed to print any code in the system in a matrix report. The codes are further organized by matrix group heading within a code type (i.e., source, issue, activity, response) to group codes together in the matrix report. For example, in Appendix C, "Voluntary Health Agencies—Organizations" is a matrix group heading. When a subject code is defined, a matrix group heading is defined. Thus, the computer places the subject code in the proper location on a matrix report. Matrix group headings are useful to organize codes and descriptions on a matrix report. Since a matrix report provides totals, a user can identify the precise number of recipients prior to generating letters, for example, for a mass mailing.

Master codes are a collection of subject codes. By assigning several subject codes to a master code, a user can query the database on one code as opposed to each code individually. Thus, master codes are useful for retrieving records of mass mailing recipients. A matrix report, such as the exemplary report in Appendix D, can also be produced for master codes. The master code 1000 and the title "Voluntary Health Agencies" appears at the top of the master code matrix report. In the appendices provided, matrix headings and master code definitions correspond, although they do not have to. In addition to master code matrices for subject codes, master code matrices can be produced from issue, activity or response master codes.

While certain advantageous embodiments have been chosen to illustrate the invention, it will be understood by those skilled in the art that various changes and modifications can be made therein without departing from the scope of the invention as defined in the appended claims.

APPENDIX A
COLLEGES

| | |
|---|---|
| Marla Boulter | Claire Fiore |
| Marketing Director | Director of Public Relations |
| Strayer College | Georgetown University Medical |
| 1025 15th Street, NW | Center |
| Washington, DC 20005 | 2115 Wisconsin Avenue, |
| Phone: (202) 892-5100 | NW, #6 |
| Fax: (202) 769-2640 | Washington, DC 20007 |
| John Britton | Phone: (202) 687-5100 |
| Director of Public Affairs | Fax: (202) 687-5718 |
| University of the District | Michael Freedman |
| of Columbia | Director of Public Information |
| 4200 Connecticut Avenue, | George Washington University |
| NW | 2121 I Street, NW |
| Washington, DC 20008 | Washington, DC 20052 |
| Phone: (202) 274-5182 | Phone: (202) 994-6468 |
| Fax: (202) 274-5327 | Fax: (202) 994-9025 |
| Richard Carater | Brian Gray |
| Vice President University | Director of Public Information |
| Relations | U.S.D.A. Graduate School |
| American University | 14th & Independence |
| 4400 Massachusetts | Avenue, SW, #1025-S |
| Avenue, NW | Washington, DC 20250 |
| Washington, DC 20016 | Phone: (202) 720-2077 |
| Phone: (202) 885-5990 | Fax: (202) 382-8632 |
| Fax: (202) 885-8026 | Al Hermesch |
| Frankie Coates-Crosby | Manager of Media Relations |
| Director of Public Relations | Howard University |
| Southeastern University | 2400 16th Street, NW |
| 501 I Street, SW | Washington, DC 20059 |
| Washington, DC 20024 | Phone: (202) 806-0970 |
| Phone: (202) 488-8162 | Fax: (202) 806-4577 |
| Fax: (202) 488-8096 | |

APPENDIX B

Mr. Glenn Lebowitz
President
Optima Direct, Inc.
1000 Vermont Avenue, N.W.
Suite 700
Washington, DC 20005
Dear Glenn:
    It was a pleasure meeting you last week at your office and discussing our next business opportunity. The tour of your offices and meeting with your staff was very helpful in assessing the resources we will need in order to complete our next project on time.
    If I can be of any further assistance please do not hesitate to call. I look forward to working with you.
                                Sincerely,
                                Kevin Potter
cc:    Michael Gormley
       Mike Malik
       Shannon MacNutt

APPENDIX C

| Code | Description | Counts |
|---|---|---|

Source Code Listing

| Code | Description | Counts |
|---|---|---|
| 117 | Foreign Addresses | 0 |
| 172 | Foreign Addresses | 12 |
| | Total records in this group = | 12 |

Voluntary Health Agencies - Organizations

| Code | Description | Counts |
|---|---|---|
| 714 | AIDS Organizations | 53 |
| 715 | Allergy and Asthma Organizations | 21 |
| 716 | Alliance for the Mentally Ill | 34 |
| 719 | Alzheimer's Association\Organizations | 34 |
| 709 | American Cancer Society | 115 |
| 704 | American Diabetes Association | 98 |
| 710 | American Heart Association | 90 |
| 721 | American Liver Foundation | 2 |
| 703 | Turner's Syndrome Society Board of Directors | 11 |
| 734 | United Cerebral Palsy Association | 24 |
| 736 | Visually Impaired Organizations | 41 |
| | Total records in this group = | 523 |

Physicians - Organizations

| Code | Description | Counts |
|---|---|---|
| 521 | American Academy of Allergy and Immunology | 3 |
| 544 | American Academy of Child and Adolescent Psychiatry | 2 |
| 533 | American Academy of Dermatology | 4 |
| 522 | American Academy of Family Physicians | 260 |
| 52201 | American Academy of Family Physicians - Board of Directors | 19 |
| 576 | American Academy of Neurology | 4 |
| 549 | American Academy of Pain Medicine | 1 |
| 023 | Renal Physicians Association | 1 |
| 537 | Society of Critical Care Medicine | 1 |
| 516 | State Medical Societies | 178 |
| 564 | The Endocrine Society | 2 |
| 565 | United Ostomy Association | 6 |
| | Total records in this group = | 481 |

Issue Code Listing

Issues

| Code | Description | Counts |
|---|---|---|
| 900 W | Access | 204 |
| 400 W | Generally with the industry | 76 |
| 600 W | Global Budgets | 17 |
| 500 A | Healthcare Reform | 2 |
| 800 W | Price Controls | 23 |
| 800 A | Price Controls | 1 |
| 700 W | Vaccines | 18 |
| | Total records in this group = | 341 |

Activity Code Listing

Broadcast Fax

| Code | Description | Counts |
|---|---|---|
| 066 | ALEC Meeting FAX - New Orleans, LA | 90 |
| 052 | Abilene, Texas ALEC Meeting | 33 |
| 063 | Baton Roughe, LA town meeting fax | 78 |
| 038 | Dallas, Fort Worth, TX-ALEC Meeting | 36 |
| 051 | Dodge City, Garden City, TX-ALEC Meeting | 0 |
| 064 | Hickman ALEC FAX | 116 |
| 119 | Kansas Health Care Reform Invitation-ALEC | 190 |
| 033 | Oklahoma City, OK-ALEC Meeting | 11 |
| 039 | Tulsa, Oklahoma-ALEC Meeting | 82 |
| 08600 | We Care Fax | 120 |
| 081 | We Care Fax | 126 |
| 037 | Wichita, Kansas-ALEC Meeting | 143 |
| 0723 | pa072-Follow up to Recruit II 100 faxed & phoned | 94 |
| 0721 | pa072-Follow up to Recruit II-Broadcast FAX | 851 |
| | Total records in this group = | 1,970 |

Mailings

| Code | Description | Counts |
|---|---|---|
| 035 | 800# Fulfillment - The hope & the promise 2/94 | 23,489 |
| 117 | Advance Notification of PMA Advertising Program. | 672 |
| 0711 | African American Legislator Mailing NPC | 503 |
| 302 | CC's for A 030 - Healthcare Reform mailing | 92 |

APPENDIX C

| Code | Description | Counts |
|---|---|---|
| 056 | Unitary Pricing Mail (anti-discount) | 9,498 |
| 054 | VHA's in Ways and Means Districts | 183 |
| 188 | pa088 - Mailing of Infectious Disease chart to 1994 Ad | 10,691 |
| 087 | Pryor Petition Federal Express | 623 |
| | Total records in this group = | 45,751 |

Phone Programs

| Code | Description | Counts |
|---|---|---|
| 0722 | pa072 - Follow up to recruit II - 400 phone calls | 299 |
| 0720 | pa072 - Follow up to recruit II - additional names | 296 |
| | Total records in this group = | 595 |

PMA Regional Meetings

| Code | Description | Counts |
|---|---|---|
| 475 | Austin, TX | 10 |
| 476 | Dallas, TX | 26 |
| 105 | Health System Reform Conference - Philadelphia, PA | 477 |
| 107 | Health System Reform Coiifereiice - Atlanta, GA | 439 |
| 477 | Houston, TX | 11 |
| | Total records in this group = | 963 |

Response Code Listing

Broadcast Fax

| Code | Description | Counts |
|---|---|---|
| 03916 | Positive - Attended | 1 |
| 03816 | Positive - Attended | 1 |
| 03716 | Positive - Attended | 143 |
| | Total records in this group = | 145 |

Mailings

| Code | Description | Counts |
|---|---|---|
| 1000 | | 5,332 |
| 03019 | Positive - Will Contribute/Super Volunteer | 3 |
| 30200 | Checked all options | 3 |
| 30312 | Conservative Statement | 11 |
| 08411 | Did not sign Pryor Petition | 368 |
| 03529 | For Labels from 8/23/94–09/02/94 | 105 |
| 03528 | From labels 8/04/94–8/16/94 | 64 |
| 30213 | Making a personal visit to members of Congress in Washington | 9 |
| 30214 | Making a personal visit to members of Congress in home | 12 |
| 07512 | PA075 8/23/94 - | 237 |
| 07511 | PA075--Aug. 5–Aug. 16 | 118 |
| 30216 | Please send additional information on the issue of price | 28 |
| 08410 | Pryor Petition signers | 333 |
| | Total records in this group = | 7,749 |

PMA Regional Meetings

| Code | Description | Counts |
|---|---|---|
| 10732 | Not Interested - Action | 321 |
| 10710 | Positive - Undefined | 3 |
| 10716 | Positive - Attended | 116 |
| 10516 | Positive - Attended | 67 |
| 10616 | Positive - Attended | 18 |
| 46016 | Positive - Attended | 10 |
| 47016 | Positive - Attended | 4 |
| 47616 | Positive - Attended | 26 |
| 47816 | Positive - Attended | 13 |
| 47716 | Positive - Attended | 11 |
| 40211 | Attendee-Healthcare Seminar Greeley | 31 |
| 40212 | Attendee-Healthcare Seminar Westminster | 21 |
| 40210 | Attendee-Healthcare seminar Colorado Springs | 46 |
| | Total records in this group = | 687 |

APPENDIX D
Source Master Code Listing

| Code | Description | Counts |
|---|---|---|
| 1000 | Voluntary Health Agencies - Orgs. | |
| 714 | AIDS Organizations | 53 |
| 715 | Allergy and Asthma Organizations | 21 |
| 716 | Alliance for the Mentally Ill | 34 |
| 719 | Alzheimer's Association\Organizations | 34 |
| 709 | American Cancer Society | 115 |
| 704 | American Diabetes Association | 98 |

-continued

| | | |
|---|---|---|
| 710 | American Heart Association | 90 |
| 721 | American Liver Foundation | 2 |
| 703 | Turner's Syndrome Society Board of Directors | 11 |
| 734 | United Cerebral Palsy Association | 24 |
| 736 | Visually Impaired Organizations | 41 |
| | Total records in this group = | 523 |
| 1001 | Physicians - Organizations | |
| 521 | American Academy of Allergy and Immunology | 3 |
| 544 | American Academy of Child and Adolescent Psychiatry | 2 |
| 533 | American Academy of Dermatology | 4 |
| 522 | American Academy of Family Physicians | 260 |
| 52201 | American Academy of Family Physicians - Board of Directors | 19 |
| 576 | American Academy of Neurology | 4 |
| 549 | American Academy of Pain Medicine | 1 |
| 023 | Renal Physicians Association | 1 |
| 537 | Society of Critical Care Medicine | 1 |
| 516 | State Medical Societies | 178 |
| 564 | The Endocrine Society | 2 |
| 565 | United Ostomy Association | 6 |
| | Total records in this group = | 481 |

What is claimed is:

1. A database management system for storing and manipulating data relating to recipients of a communication from one or more different contact persons, comprising:

a memory device for storing data records relating to said recipients; and a data processing device configured to receive new data records relating to said recipients and to store said records in said memory device, said records each comprising a recipient field for entering the name of one of said recipients and an address field for entering the address of said recipient therein, said data processing device being programmed to review existing records stored in said memory device and identify those of said existing records that are similar to said new record, and to prompt a user to select from a plurality of options comprising keeping said existing record in said memory device in lieu of said new record, keeping said new record in said memory device in lieu of said existing record, and storing both said new record and said existing record in said memory device.

2. A database management system as claimed in claim 1, wherein said data processing device is configured to provide said user with an option of combining fields of both said new record and said existing record to create another record.

3. A database management system as claimed in claim 2, wherein said data processing device is configured to display both said existing record and said new record to permit said user to review both of said records and select one of said options.

4. A database management system as claimed in claim 1, wherein said data processing device is programmed to review said existing records after each said new record is received.

5. A database management system as claimed in claim 1, wherein said data processing device is programmed to review said existing records after a plurality of said new record are received.

6. A database management system as claimed in claim 1, wherein said data processing device is programmed to review said existing records using a match key derived from said new record.

7. A database management system as claimed in claim 6, wherein said match key comprises data relating to said name field and said address field.

8. A database management system as claimed in claim 7, wherein said match key is derived from data within said address field corresponding to a zip code for said recipient and data corresponding to the number of at least one of consonants and vowels in said name field.

9. A database management system as claimed in claim 6, wherein each of said records further comprises a suppress field for entering data to indicate that particular ones of said records are to be suppressed from being retrieved for purposes of creating a communication but maintained in said database for deduplicating new records.

10. A method of storing and manipulating data relating to recipients of a communication from one or more different contact persons, comprising:

entering a new record into a temporary file in a memory device using a data processing device;

creating a match key for said new record;

searching a database in said memory device for existing records previously entered therein and assigned corresponding match keys which are similar to said new record; and storing said new record in said database if none of said match keys corresponding to said existing records are similar to said new record match key, and storing said new record in a temporary database file if one of said match keys of said existing records is similar to said new record match key.

11. A method as claimed in claim 10, further comprising the step of displaying one of said existing records on a display device if said match key is similar to said new record match key, and displaying said new record.

12. A method as claimed in claim 11, wherein a user can control said data processing device to alternately display said existing record and said new record to compare them.

13. A method as claimed in claim 10, further comprising the steps of:

prompting said user on said display device to choose one of a plurality of options comprising replacing said matched existing record with said new record, storing said new record while maintaining said matched existing record in said database, and integrating at least one portion of said new record and said matched existing record to modify one of said new record and said existing record.

14. A method as claimed in claim 10, wherein a match key comprises a plurality of slots and said creating step operates to fill said slots, said creating step comprising the steps of:

examining a first letter stored in said name field;

incrementing a consonant counter stored in said memory device by an integer value if said letter is a consonant, and incrementing a vowel counter stored in said memory device by an integer value if said letter is a vowel;

repeating said examining step and said incrementing step for each of the remaining letters in said name field until the first of two events occurs, said events comprising reaching the end of said name field, and said consonant counter reaching a predetermined integer value;

setting a VOWELS NEEDED variable to an integer value greater than said value stored in said consonant counter and restoring said consonant counter to an initial value; and repeating said examining step and said incrementing step for each of the letters in said name field until the sum of the value of said consonant counter and a VOWEL USED counter is a predetermined value, said incrementing step further comprising the step of incrementing a VOWEL PASSED counter by an integer value when said letter is a vowel, and incrementing said VOWEL USED counter and placing said vowel in one of said match key slots if the value of said VOWEL USED counter less said VOWELS NEEDED counter plus one is at least equal to, if not greater than, said VOWEL PASSED counter.

15. A method as claimed in claim 14, further comprising the step of filling a plurality of said match key slots with at least a portion of said address.

16. A method as claimed in claim 14, further comprising the step of filling at least one of said match key slots with a character representing an appropriate one of a plurality of name suffixes comprising junior, senior, III, and IV.

\* \* \* \* \*